US008189793B2

(12) United States Patent
Ito et al.

(10) Patent No.: US 8,189,793 B2
(45) Date of Patent: May 29, 2012

(54) KEY TERMINAL APPARATUS, CRYPTO-PROCESSING LSI, UNIQUE KEY GENERATION METHOD, AND CONTENT SYSTEM

(75) Inventors: Yoshikatsu Ito, Osaka (JP); Kouichi Kanemura, Osaka (JP)

(73) Assignee: Panasonic Corporation, Osaka (JP)

(*) Notice: Subject to any disclaimer, the term of this patent is extended or adjusted under 35 U.S.C. 154(b) by 755 days.

(21) Appl. No.: 12/376,700

(22) PCT Filed: Aug. 7, 2008

(86) PCT No.: PCT/JP2008/002142
§ 371 (c)(1),
(2), (4) Date: Mar. 5, 2009

(87) PCT Pub. No.: WO2009/028137
PCT Pub. Date: Mar. 5, 2009

(65) Prior Publication Data
US 2010/0189265 A1    Jul. 29, 2010

(30) Foreign Application Priority Data
Aug. 28, 2007  (JP) ................................. 2007-220564

(51) Int. Cl.
*H04L 9/08* (2006.01)
(52) U.S. Cl. ............ 380/285; 380/277; 380/59; 726/26; 713/192
(58) Field of Classification Search .................. None
See application file for complete search history.

(56) References Cited

U.S. PATENT DOCUMENTS

| | | | | |
|---|---|---|---|---|
| 7,958,353 | B2* | 6/2011 | Matsuzaki et al. ............ | 713/170 |
| 2004/0105548 | A1 | 6/2004 | Fujiwara et al. | |
| 2004/0107167 | A1* | 6/2004 | Maari .............................. | 705/57 |
| 2004/0151312 | A1 | 8/2004 | Yanagisawa | |
| 2005/0027994 | A1* | 2/2005 | Sai .................................. | 713/189 |
| 2006/0188099 | A1 | 8/2006 | Kondo et al. | |
| 2006/0280297 | A1* | 12/2006 | Fukaya ........................... | 380/28 |

FOREIGN PATENT DOCUMENTS

| | | |
|---|---|---|
| EP | 1 143 655 | 10/2001 |
| JP | 2001-211171 | 8/2001 |
| JP | 2004-139242 | 5/2004 |
| JP | 2004-164491 | 6/2004 |
| JP | 2004-208088 | 7/2004 |
| JP | 2006-229881 | 8/2006 |
| WO | 01/30019 | 4/2001 |

OTHER PUBLICATIONS

Roy et al. "EPIC: Ending Piracy of INtegrated Circuits", E-ISBN: 978-3-9810801-4-8, Mar. 2008.*

(Continued)

*Primary Examiner* — Peter Poltorak
(74) *Attorney, Agent, or Firm* — Wenderoth, Lind & Ponack, L.L.P.

(57) ABSTRACT

A key terminal apparatus includes a crypto-processing LSI that performs predetermined crypto-processing. Unique information identifying the crypto-processing LSI is embedded in the crypto-processing LSI. A predetermined master key corresponding to a predetermined key is embedded in the crypto-processing LSI. The crypto-processing LSI (a) receives an encrypted manufacturer key from the manufacturer key storage unit, (b) decrypts the encrypted manufacturer key using the predetermined master key to generate a manufacturer key, (c) generates a unique manufacturer key identical to the predetermined unique manufacturer key, based on the unique information embedded in the crypto-processing LSI and the generated manufacturer key, and (d) decrypts the received encrypted device key using the generated identical unique manufacturer key to generate a predetermined device key.

18 Claims, 36 Drawing Sheets

OTHER PUBLICATIONS

"Open Mobile Alliance Digital Right Management Short Paper", Open Mobile Alliance Right Ltd., Dec. 2003.

"CMLA Client Adopter Agreement", CMLA Founders-Contact Information, 2007.

* cited by examiner

KEY TERMINAL APPARATUS, CRYPTO-PROCESSING LSI, UNIQUE KEY GENERATION METHOD, AND CONTENT SYSTEM

TECHNICAL FIELD

The present invention relates to a technique used in a terminal that receives a service via a network.

BACKGROUND ART

Services that provide digital content such as music and movies via a network have commenced in recent years. Since digital content can be copied without a deterioration in quality in the copy, a DRM (Digital Rights Management) technique recited in Non-Patent Document 1 is used as a way of protecting the copyrights of digital content. A terminal that uses such a service is packaged with a terminal-use secret key (device key) provided by a DRM licenser. To prevent prevention of malicious usage of content, the content is encrypted in a manner that the linchpin of secrecy is the device key packaged in the terminal. The content is then distributed to the terminal via a network in this encrypted form.

The manufacturer of the terminal is provided with the device key on the basis of a contract with the DRM licenser. Since there is a possibility that devices capable of using the service maliciously (such as clone devices implemented in a PC) will be manufactured if the device key is exposed, the DRM licenser requires the terminal manufacturer to keep the device key secret, and to package the device key in the terminal in a manner that the device key will not be easily exposed or tampered with. This is recited in Non-Patent Document 2. There is also a form of contract whereby, as a requirement for license management, the DRM licenser requires the terminal manufacturer to use a different device key in each terminal. In such a case, the terminal manufacturer must package device keys in a manner that a same device key cannot be used in multiple terminals, even if the terminals are the same type of terminal.

Patent Document 1 discloses a method for securely packaging device keys in terminals in this way. According to Patent Document 1, to encrypt the device key, the device key is encrypted with a key generated by a key generation unit that receives input of unique information (a device unique value) and information unique to the device (device unique infatuation). This creates an encrypted device key. The device includes an LSI in which the device unique value is embedded, and a memory that stores the device unique information and the encrypted device key. When encrypted content is to be decrypted in this device, first the device unique information and the encrypted device key are input into the LSI, then the LSI generates a key from the device unique value and the device unique information. The encrypted device key is decrypted using the generated key, and then the device key generated as a result of the decryption is used to decrypt an encrypted content key.

Patent Document 2 discloses a method of packaging, in an IC card, an application authentication encryption key for authenticating the legitimacy of an application via a network. In Patent Document 2, an application authentication encryption key reception unit and an application authentication encryption key storage unit are provided in the IC. When setting the application authentication encryption key in the IC card, the application authentication encryption key is received from a certificate authority, and written to the application authentication encryption key storage unit. The non-volatile memory of an IC chip packaged in the IC card stores a manufacturing number which is unique to that IC chip, and an issue-use encryption key corresponding to the manufacturing number. The set of the IC chip manufacturing number and the corresponding issue-use encryption key is administered by the certificate authority. The certificate authority encrypts an application authentication encryption key with use of an issued encryption key, which is unique to the IC card, and sends the encrypted application authentication encryption key to the IC card via a network. The method disclosed in Patent Document 2 enables a different device key to be set in each of a plurality of terminals via a network.

Patent Document 3 discloses a method for authenticating the legitimacy of a device when updating software in the device. According to Patent Document 3, a server includes a software encryption unit that encrypts uses a serial number received from a device using the received serial number as a public key, and an encrypted data transmission unit that transmits the encrypted serial number. The device includes an encrypted serial number decryption unit that decrypts the encrypted serial number with use of a private key corresponding to the serial number that is the public key. The method disclosed in Patent Document 3 enables a device to be authenticated with use of information sent from the server and unique to that terminal.

Non-Patent Document 1: "Open Mobile Alliance Digital Rights Management Short Paper", Open Mobile Alliance Ltd., 2003

Non-Patent Document 2: "Client Adopter Agreement", pages 59-68, CMLA Founders-Contract Information, 2007

Patent Document 1: Japanese Unexamined Patent Application Publication No. 2004-208088

Patent Document 2: Japanese Unexamined Patent Application Publication No. 2004-139242

Patent Document 3: Japanese Unexamined Patent Application Publication No. 2001-211171

DISCLOSURE OF THE INVENTION

Problem to be Solved by the Invention

When terminals are manufactured by a process that requires mass production on an assembly line, the work required to set information unique to each individual terminal in that terminal causes problems of reduction in manufacturing efficiency and increase in manufacturing cost of the terminals. Setting information such as a device key is particularly problematic because of the increased management costs involved for the measures necessary to prevent a same key being set in multiple terminals or leaking of information when the manufacturer of the terminals has terminal manufacturing operations based in multiple locations.

As such, the cost of manufacturing terminals can be reduced if, rather than setting the device key in the terminal during the manufacturing process, the device key is set in each terminal when that terminal is connected to a network after being shipped to the marketplace. In order to prevent a same device key being set a multiple terminals in this case, it is necessary to prevent terminal masquerading. However, setting individual information in each terminal at the time of manufacturing in order to prevent terminal masquerading means that the manufacturing cost cannot be reduced. Furthermore, if the individual information of the terminal is to be administered in a server that distributes the device keys, increased costs are incurred for administrating the individual information in the server.

As has been described, it is necessary to set device keys for use in a network service in terminals in a manner that the device keys will not be exposed, tampered with or misused, and conventional techniques do not allow device keys to be set in terminals in a cost-effective way.

In view of the described problems, the present invention has an object of providing a key terminal apparatus, a crypto-processing LSI, a unique key generation method, and a content system that enable a different device key to be set in each of a plurality of terminals in a cost-effective manner.

Means to Solve the Problem

In order to achieve the stated objected, one aspect of the present invention is a key terminal apparatus, including: a crypto-processing LSI operable to perform predetermined crypto-processing, unique information identifying the crypto-processing LSI being embedded in the crypto-processing LSI; a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined key; an interface unit connected to a device key encryption server, the device key encryption server generating an encrypted device key by encrypting a predetermined device key using a predetermined unique manufacturer key, the predetermined unique manufacturer key being generated based on the unique information and the manufacturer key; and a control unit operable to transmit the unique information to the device key encryption server, and to receive the encrypted device key corresponding to the unique information from the device key encryption server, wherein a predetermined master key corresponding to the predetermined key is embedded in the crypto-processing LSI, wherein the crypto-processing LSI (a) receives the encrypted manufacturer key from the manufacturer key storage unit, (b) decrypts the encrypted manufacturer key using the predetermined master key to generate a manufacturer key, (c) generates a unique manufacturer key identical to the predetermined unique manufacturer key, based on the unique information embedded in the crypto-processing LSI and the generated manufacturer key, and (d) decrypts the received encrypted device key using the generated identical unique manufacturer key to generate the predetermined device key.

EFFECTS OF THE INVENTION

According to the present aspect, the confidentiality of the keys lies in the encrypted manufacturer key due to the manufacturer key being encrypted, while the inherency of the keys is placed in the unique information that is unique to the crypto-processing LSI. By generating a unique manufacturer key based on both the manufacturer key and the unique information, a unique manufacturer key having both properties, namely confidentiality and inherency, can be generated. Therefore, generation of a unique manufacturer key for decrypting the encrypted device key can be realized easily and at low cost, while also maintaining confidentiality.

Furthermore, the encrypted manufacturer key is stored in the key terminal apparatus by the manufacturer of the key terminal apparatus, whereas the unique information unique to the crypto-processing LSI is embedded in the crypto-processing LSI by the manufacturer of the crypto-processing LSI. As a result, a unique manufacturer key for encrypting the device key can be generated based on information sources having respectively different manufacturers. Therefore, leaking from information sources for generating the unique manufacturer key can be suppressed, and a unique manufacturer key high in confidentiality and inherency can be generated.

Furthermore, generating the unique manufacturer key using the unique information embedded in the crypto-processing LSI by the manufacturer of the crypto-processing LSI has the effect that the unique manufacturer key can be generated using the unique information embedded and already existing in the crypto-processing LSI so as to ensure the inherency of the unique manufacturer key, and, in combination with the unique information, the encrypted manufacturer key by which the confidentiality is ensured. This structure lightens the burden on the key terminal apparatus manufacturer that would otherwise have to store a different unique manufacturer key in each key terminal apparatus, since inherency is required in the unique manufacturer key. In addition, this structure makes it possible to generate unique manufacturer keys that have confidentiality and inherency across all apparatuses.

Use of the unique manufacturer key generated in this way enables the service user to perform setting of a device key that is different to device keys of other terminal over a network. This enables a different device key to be set in each terminal apparatus without the terminal manufacturer having to set different information in each terminal when manufacturing terminal.

DESCRIPTION OF NUMERICAL REFERENCES

Figure 1:
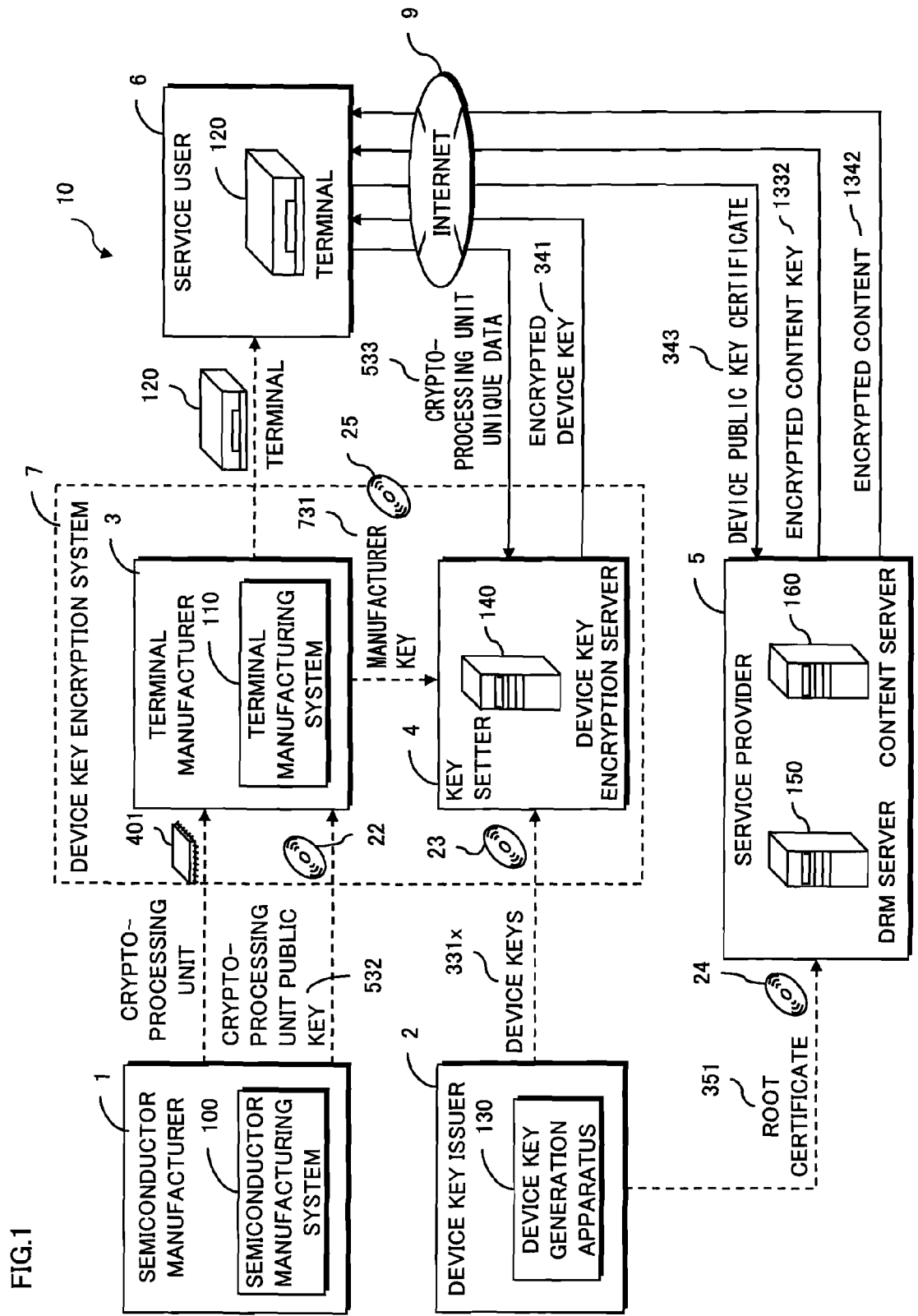
FIG. 1 is a structural diagram of a terminal data setting system 10 in a first embodiment overall.

10 Terminal data setting system
10a Terminal data setting system
10b Terminal data setting system
100 Semiconductor manufacturing system
110 Semiconductor manufacturing system
120 Terminal
130 Device key generation apparatus
140 Device key encryption server
150 DRM server
160 Content server
1500 Terminal
1800 Terminal manufacturing system
2010 Terminal
2020 DRM server
2030 Content server
2040 Web server

BEST MODE FOR CARRYING OUT THE INVENTION

In an aspect recited in claim 1, a key terminal apparatus includes: a crypto-processing LSI operable to perform predetermined crypto-processing, unique information identifying the crypto-processing LSI being embedded in the crypto-processing LSI; a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined key; an interface unit connected to a device key encryption server, the device key encryption server generating an encrypted device key by encrypting a predetermined device key using a predetermined unique manufacturer key, the predetermined unique manufacturer key being generated based on the unique information and the manufacturer key; and a control unit operable to transmit the unique information to the device key encryption server, and to receive the encrypted device key corresponding to the unique information from the device key encryption server, wherein a predetermined master key corresponding to the predetermined key is embedded in the crypto-processing LSI, wherein the crypto-processing LSI (a) receives the encrypted manufacturer key from the manufacturer key storage unit, (b) decrypts the encrypted manufacturer key using the predetermined master key-to generate a manufacturer key, (c) generates a unique manufacturer key identical to the predetermined unique manufacturer key, based on the unique information embedded in the crypto-processing LSI and the generated manufacturer key, and (d) decrypts the received encrypted device key using the generated identical unique manufacturer key to generate the predetermined device key.

In an aspect recited in claim 2, a key terminal apparatus includes: a crypto-processing LSI operable to perform predetermined crypto-processing, unique information identifying the crypto-processing LSI being embedded in the crypto-processing LSI; a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined first key; an interface unit connected to a service providing server and a device key encryption server, the service providing server providing (i) content encrypted using a predetermined content key, and (ii) an encrypted content key generated by encrypting the predetermined content key using a predetermined second key, and the device key encryption server generating an encrypted device key by encrypting a predetermined device key using a predetermined unique manufacturer key, the predetermined unique manufacturer key being generated based on the unique information and the manufacturer key; and a control unit operable to, when a setting is made at the key terminal apparatus for receiving the encrypted content from the service providing server, transmit the unique information to the device key encryption server, and receive the encrypted device key corresponding to the unique information from the device key encryption server, wherein a predetermined master key corresponding to the predetermined key is embedded in the crypto-processing LSI, wherein the crypto-processing LSI (a) receives the encrypted manufacturer key from the manufacturer key storage unit, (b) decrypts the encrypted manufacturer key using the predetermined master key to generate a manufacturer key, (c) generates a unique manufacturer key identical to the predetermined unique manufacturer key, based on the unique information embedded in the crypto-processing LSI and the generated manufacturer key, and (d) decrypts the received encrypted device key using the generated identical unique manufacturer key to generate the predetermined device key.

According to the present aspect, the confidentiality of the keys lies in the encrypted manufacturer key due to the manufacturer key being encrypted, while the inherency of the keys is placed in the unique information that is unique to the crypto-processing LSI. By generating a unique manufacturer key based on both the manufacturer key and the unique information, a unique manufacturer key having both properties, namely confidentiality and inherency, can be generated. Therefore, generation of a unique manufacturer key for decrypting the encrypted device key can be realized easily and at low cost, while also maintaining confidentiality.

Furthermore, the encrypted manufacturer key is stored in the key terminal apparatus by the manufacturer of the key terminal apparatus, whereas the unique information unique to the crypto-processing LSI is embedded in the crypto-processing LSI by the manufacturer of the crypto-processing LSI. As a result, a unique manufacturer key for encrypting the device key can be generated based on information sources having respectively different manufacturers. Therefore, leaking from information sources for generating the unique manufacturer key can be suppressed, and a unique manufacturer key high in confidentiality and inherency can be generated.

Furthermore, generating the unique manufacturer key using the unique information embedded in the crypto-processing LSI by the manufacturer of the crypto-processing LSI has the effect that the unique manufacturer key can be generated using the unique information embedded and already existing in the crypto-processing LSI so as to ensure the inherency of the unique manufacturer key, and, in combination with the unique information, the encrypted manufacturer key by which the confidentiality is ensured. This structure lightens the burden on the key terminal apparatus manufacturer that would otherwise have to store a different unique manufacturer key in each key terminal apparatus, since inherency is required in the unique manufacturer key. In addition, this structure makes it possible to generate unique manufacturer keys that have confidentiality and inherency across all apparatuses.

In a key terminal apparatus that is an aspect recited in claim 3, the predetermined key is a public key.

According to the present aspect, by making the predetermined key a public key, the master key itself embedded in the crypto-processing LSI and corresponding to the predetermined key does not have to be given to the manufacturer of the key terminal apparatus. This reduces the risk that the master key will be leaked outside.

In a key terminal apparatus that is an aspect recited in claim 4, the predetermined first key is a first public key.

According to the present aspect, by making the first predetermined key a first public key, the master key itself embedded in the crypto-processing LSI and corresponding to the first predetermined key does not have to be given to the manufacturer of the key terminal apparatus. This reduces the risk that the master key will be leaked outside.

In a key terminal apparatus that is an aspect recited in claim 5, the predetermined device key includes a device public key and a device private key, the control unit (a) obtains the predetermined device key from the crypto-processing LSI, (b) transmits the device public key included in the predetermined device key to the service providing server, (c) transmits information relating to the device private key included in the predetermined device key to the service providing server, and the control unit, (d) when the service providing server authenticates correspondence between the transmitted device public key and the device private key of the key terminal apparatus, shares a session key with the service providing server, and the predetermined second key is the session key, and the encrypted content key is generated by encrypting using the session key.

In a key terminal apparatus that is an aspect recited in claim 6, the service providing server includes (1) a content server and (2) a key management server, the content server providing the content encrypted using the predetermined content key, and the key management server providing the encrypted content key generated by encrypting the predetermined content key using the predetermined second key, the control unit (a) obtains the predetermined device key from the crypto-processing LSI, (b) transmits the device public key included in the predetermined device key to the key management server, (c) transmits information relating to the device private key included in the predetermined device key to the key management server, and the control unit, (d) when the service providing server authenticates correspondence between the transmitted device public key and the device private key of the key terminal apparatus, shares a session key with the key management server.

In a key terminal apparatus that is an aspect recited in claim 7, the control unit receives the encrypted content from the content server, and receives the encrypted content key from the key management server corresponding to the content server, and the crypto-processing LSI decrypts the encrypted content key using the session key, decrypts the encrypted content using the decrypted content key to obtain the content, and outputs the obtained content to the control unit.

In a key terminal apparatus that is an aspect recited in claim 8, the crypto-processing LSI has a program storage unit, the program storage unit storing a program for performing the predetermined crypto-processing, the program being encrypted using the manufacturer key, and the crypto-processing LSI decrypts, using the master key, the encrypted manufacturer key stored in the manufacturer key storage unit to obtain a manufacturer key, and decrypts the encrypted program using the obtained manufacturer key.

In a key terminal apparatus that is an aspect recited in claim 9, the unique information that identifies the crypto-processing LSI comprises a serial number of the crypto-processing LSI.

According to the present aspect, by using the serial number of the crypto-processing LSI as the unique information unique to the crypto-processing LSI, the serial number that already exists in crypto-processing LSI as the serial number assigned thereto is used. This simplifies the structure because it is unnecessary to store other, new information as the unique information unique to the LSI crypto-processing unit.

A crypto-processing LSI that is an aspect recited in claim 10 is a crypto-processing LSI included in a key terminal apparatus, the key terminal apparatus including: a manufacturer key storage unit provided external of the crypto-processing LSI, and storing an encrypted manufacturer key, the encrypted manufacturer key being generated by encrypting a manufacturer key unique to a manufacturer of the key terminal apparatus using a predetermined key; an interface unit connected to a device key encryption server, the device key encryption server generating an encrypted device key by encrypting a predetermined device key using a predetermined unique manufacturer key, the predetermined unique manufacturer key being generated based on unique information and the manufacturer key; and a control unit operable to transmit the unique information to the device key encryption server, and to receive an encrypted device key corresponding to the unique information from the device key encryption server, the crypto-processing LSI comprising: a first storage unit having unique information that identifies the crypto-processing LSI, the unique information being embedded in the crypto-processing LSI; a second storage unit having a predetermined master key corresponding to the predetermined key, within the crypto-processing LSI; a first decryption unit operable to input the encrypted manufacturer key from the manufacturer key storage unit of the key terminal apparatus, and decrypt the encrypted manufacturer key using the predetermined master key to generate a manufacturer key; a generation unit operable to generate a unique manufacturer key identical to the predetermined unique manufacturer key based on the unique information embedded in the crypto-processing LSI and the generated manufacturer key; and a second decryption unit operable to decrypt the received encrypted device key using the generated identical unique manufacturer key to obtain the predetermined device key.

A crypto-processing LSI that is an aspect recited in claim 11 further includes: a program storage unit operable to store a program for performing processing by the first decryption unit, the generation unit, and the second decryption unit, the program being encrypted using the manufacturer key; and a third decryption unit operable to decrypt, using the embedded master key, the encrypted manufacturer key stored in the manufacturer key storage unit to obtain a manufacturer key, and decrypt the program using the obtained manufacturer key.

Furthermore, in an aspect recited in claim 12, a unique key generation method used in a key terminal apparatus, the key terminal apparatus including: a crypto-processing LSI operable to perform predetermined crypto-processing, unique information identifying the crypto-processing LSI being embedded in the crypto-processing LSI; a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined key; an interface unit connected to a device key encryption server, the device key encryption server generating an encrypted device key by encrypting a predetermined device key using a predetermined unique manufacturer key, the predetermined unique manufacturer key being generated based on the unique information and the manufacturer key; and a control unit operable to transmit the unique information to the device key encryption server, and to receive the encrypted device key corresponding to the unique information from the device key encryption server, a predetermined master key corresponding to the predetermined key being embedded in the crypto-processing LSI, the unique key generation method comprising: receiving the encrypted manufacturer key from the manufacturer key storage unit; decrypting the encrypted manufacturer key using the predetermined master key to generate a manufacturer key; generating a unique manufacturer key identical to the predetermined unique manufacturer key, based on the unique information embedded in the crypto-processing LSI and the generated manufacturer key; decrypting the received encrypted device key using the generated identical manufacturer key to generate the predetermined device key.

Furthermore, in an aspect recited in claim 13, a content system including (1) a service providing server that provides (i) content encrypted using a predetermined content key, and (ii) an encrypted content key generated by encrypting the predetermined content key using a predetermined first key, (2) a device key encryption server that generates an encrypted device key by encrypting a device key corresponding to the predetermined first key, (3) a key terminal apparatus that decrypts the encrypted content key using the predetermined first key to obtain the predetermined content key, and decrypts the encrypted content using the obtained predetermined content key, the key terminal apparatus comprising: a crypto-processing LSI operable to perform predetermined crypto-processing, unique information identifying the crypto-processing LSI being embedded in the crypto-processing LSI; a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined key; an interface unit connected to the service providing server and the device key encryption server; and a control unit operable to, when a setting is made at the key terminal apparatus for receiving the encrypted content from the service providing server, transmit the unique information to the device key encryption server, the device key encryption server comprising: a reception unit operable to receive the unique information from the key terminal apparatus; a generation unit operable to generate a predetermined unique manufacturer key based on the received unique information and the manufacturer key; an encryption unit operable to encrypt a device key corresponding to the first predetermined key using the generated predetermined unique manufacturer key to generate an encrypted device key; and a transmission unit operable to transmit the encrypted device key to the key terminal apparatus, wherein a master key corresponding to the second predetermined key is embedded in the crypto-processing LSI of the key terminal apparatus, the crypto-processing LSI of the key terminal apparatus (a) receives the encrypted manufacturer key from the manufacturer key storage unit, (b) decrypts the encrypted manufacturer key using the predetermined master key to generate a manufacturer key, (c) generates a unique manufacturer key identical to the predetermined unique manufacturer key based on the unique information embedded in the crypto-processing LSI and the generated manufacturer key, and (d) decrypts, using the generated identical unique manufacturer key, the encrypted device key received from the device key encryption server to obtain the device key.

In a content distribution system that is an aspect recited in claim 14, the device key includes a device public key and a device private key, the control unit of the key terminal apparatus (a) obtains the predetermined device key from the crypto-processing LSI, (b) transmits the device public key included in the predetermined device key to the service providing server, (c) transmits information relating to the device private key included in the predetermined device key to the service providing server, and the control unit, (d) when the service providing server authenticates correspondence between the transmitted device public key and the device private key of the key terminal apparatus, shares a session key with the service providing server, and the predetermined second key is the session key, and the encrypted content key is generated by encrypting using the session key.

In a content distribution system that is an aspect recited in claim 15, the service providing server includes (1) a content server and (2) a key management server, the content server providing the content encrypted using the predetermined content key, and the key management server providing the encrypted content key generated by encrypting the predetermined content key using the predetermined second key, the control unit (a) obtains the predetermined device key from the crypto-processing LSI, (b) transmits the device public key included in the predetermined device key to the key management server, (c) transmits information relating to the device private key included in the predetermined device key to the key management server, and the control unit, (d) when the service providing server authenticates correspondence between the transmitted device public key and the device private key of the key terminal apparatus, shares a session key with the key management server.

In a content distribution system that is an aspect recited in claim 15, the control unit receives the encrypted content from the content server, and receives the encrypted content key from the key management server corresponding to the content server, and the crypto-processing LSI decrypts the encrypted content key using the session key, decrypts the encrypted content using the decrypted content key to obtain the content, and outputs the obtained content to the control unit.

1. First Embodiment

A terminal data setting system 10 is described as a first embodiment of the present invention with reference to the drawings.

1.1 Overview of Terminal Data Setting System 10

The terminal data setting system 10, as shown in FIG. 1, is composed of a semiconductor manufacturing system 100 administered by a semiconductor manufacturer 1, at least one terminal manufacturing system 110 administered by at least one terminal manufacturer 3, at least one terminal 120 used by at least one service user 6, a device key generation apparatus 130 administered by a device key issuer 2, a device key encryption server 140 administered by a key setter 4, and a DRM server 150 and a content server 160 administered by a service provider 5. The terminal 120 is connected via the Internet 9 to each of the device key encryption server 140, the DRM server 150, and the content server 160.

The semiconductor manufacturing system 100 manufactures a plurality of crypto-processing units 401 having identical specifications. Each of the crypto-processing units 401 is installed in a different terminal 120 by the terminal manufacturing system 110. The crypto-processing unit 401 is a device typically manufactured as an LSI, and performs encryption processing in the terminal 120 in a manner that is difficult to monitor from outside. A crypto-processing unit private key 531 that is known only to the semiconductor manufacturer 1 is installed in the crypto-processing unit 401. The crypto-processing unit private key 531 is common to crypto-processing units 401 manufactured with the identical specifications. Each crypto-processing unit 401 manufactured in the semiconductor manufacturing system 100 is shipped to the terminal manufacturer 3 together with a recording medium 22 on which is recorded a crypto-processing unit public key 532 corresponding to the crypto-processing unit private key 531. The crypto-processing unit 401 is installed in a terminal 120 manufactured by the terminal manufacturing system 110.

The terminal manufacturing system 110 receives the crypto-processing unit 401 and the recording medium 22 which stores the crypto-processing unit public key 532 from the semiconductor manufacturer 1, manufacturers a terminal 120 with use of the received crypto-processing unit 401 and recording medium 22, and sells the manufactured terminal 120 to the service user 6. In the terminal manufacturing system 110, each terminal manufacturer 3 generates a common manufacturer key 731 that is known only to that manufacturer 3 and the key setter 4. An encrypted manufacturer key 741 generated using the crypto-processing unit public key 532 is embedded in the terminal 120. The manufacturer key 731 is encrypted and sent from the terminal manufacturer 3 to the key setter 4 in a state in which secrecy can be administered, using a conventional method such as transmitting the encrypted manufacturer key 741 via a dedicated line, or handing over a recording medium 25 that stores the encrypted manufacturer key 741 thereon.

The terminal 120 is manufactured in the terminal manufacturing system 110, and sold to the service user 6. The service user 6 connects the terminal 120 to the Internet 9 and uses the terminal 120 connected to the Internet 9. When the service user 6 purchases the terminal 120, a device key 331 necessary for using services such as a content distribution service provided by the service provider 5 via the Internet 9 is not yet set in the terminal 120. For this reason, before using a service, the service user 6 connects the terminal 120 to the Internet 9, sends crypto-processing unit unique data 533 held by the terminal 120 to the device key encryption server 140 administered by the key setter 4, and sets an encryption device key 341 sent from the device encryption server 140 in the terminal 120. This enables the service to be used.

Figure 8:
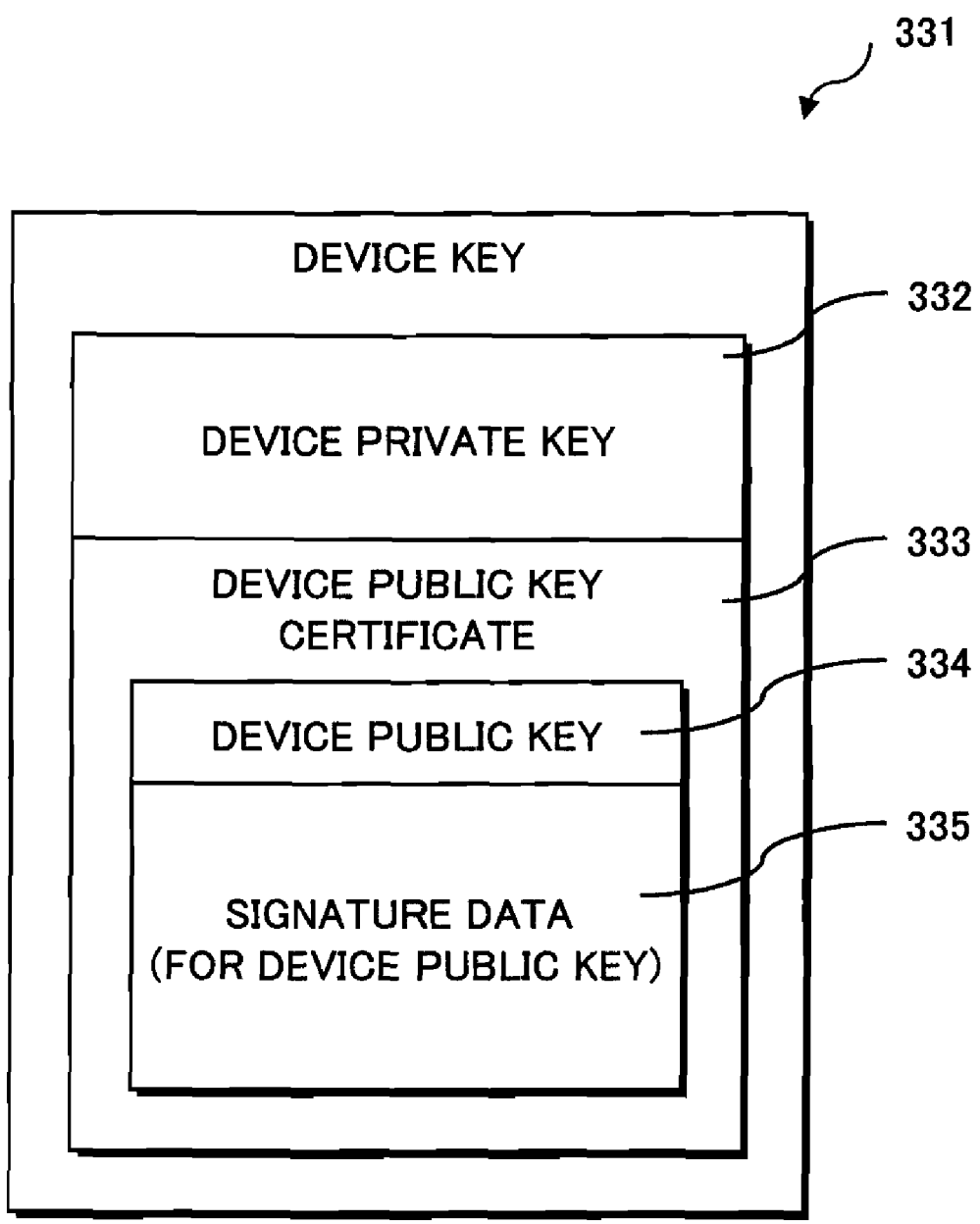
FIG. 8 shows the data structure of the device key 331 in the first embodiment.

The device key generation apparatus 130 generates a plurality of device keys 331x, a root certificate 351, an the like, that are required in a scheme to prevent malicious usage of the service provided via the network. One scheme to prevent malicious usage of a service is the DRM technique recited in Non-Patent document 1. A different device key is issued for each terminal used by a service user. The plurality of device keys 331x are sent from the device key issuer 2 to the key setter 4 in a state in which secrecy can be administered, using a conventional method such as transmitting encrypted device keys 341 via a dedicated line, or handing over a recording medium 23 that stores thereon the encrypted device keys 341. A terminal 120 that has a device key 331 set therein is treated as a legitimate terminal that is permitted to use the service. The root certificate 351 is issued to the DRM server 150 the service provider 5 uses when providing the service. The root certificate 351 is sent from the device key issuer 2 to the service provider 5 in a state in which secrecy can be administered, using a conventional method such as transmitting an encrypted root certificate 361 via a dedicated line, or handing over a recording medium 24 that stores thereon the encrypted root certificate 361. The DRM server 150 can check whether the device key set in a terminal 120 is legitimate or not by using the root certificate 351. It should be noted that the device key 331 is composed of a set of a device private key 332 and a device public key certificate 333 corresponding to the device private key 332, as shown in FIG. 8.

Figure 11:
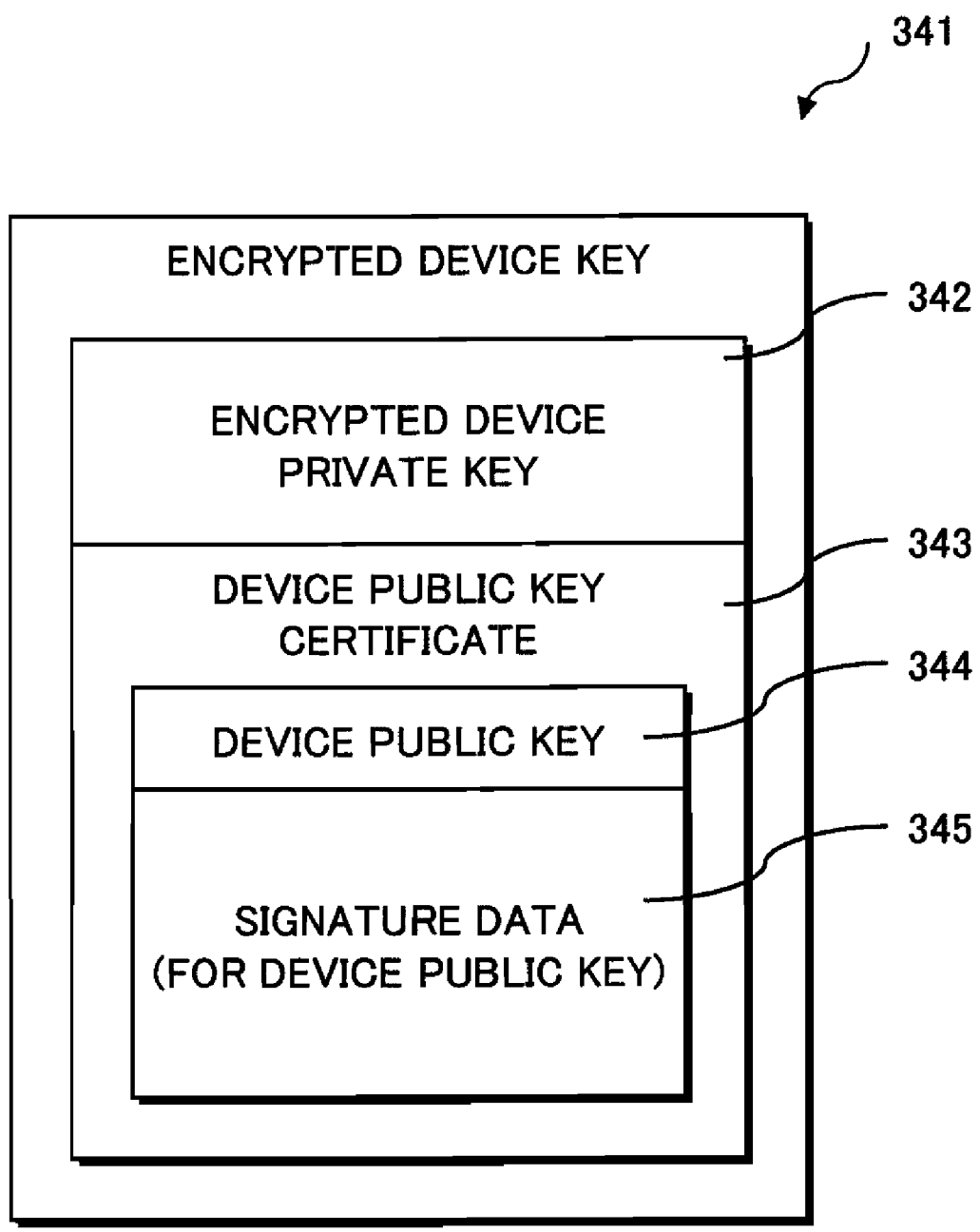
FIG. 11 shows the data structure of an encrypted device key 341 in the first embodiment.

In response to a device key send request from the terminal 120, the device key encryption server 140 encrypts the device key 331 received from the device key issuer 2, with use of the manufacturer key 731 received from the terminal manufacturer 3 and the crypto-processing unit unique data 533 sent from the terminal 120, thereby generating the encrypted device key 314, and sends the generated encrypted device key 341 to the terminal 120. It should be noted that the encrypted device key 341 is composed of a set of an encrypted device private key 342, and a device public key certificate 343 corresponding to the device private key 332, as shown in FIG. 11.

The DRM server 150 securely sends a content key 1331 to the terminal 120. The content key 1331 must be shared by the terminal 120 and the content server 160 in order for a service provider to provide a service such as content distribution service via the Internet 9. With use of the root certificate 351 issued by the device key issuer 2, the DRM server 150 checks the legitimacy of the device public key certificate 343 sent from the terminal 120. The DRM server 150 then encrypts the content key 1331 with use of the device public key 344 included in the device public key certificate 343, thereby generating an encrypted content key 1332, and sends the generated encrypted content key 1332 to the terminal 120.

The content server 160 sends encrypted content 1342 generated by encrypting content according to a publicly known algorithm with use of the content key 1331 to the terminal 120 via the Internet 9. Here, it is assumed that the content key 1331 has been shared by the DRM server 150 with the terminal 120.

1.2 Semiconductor Manufacturing System 100

Figure 2:
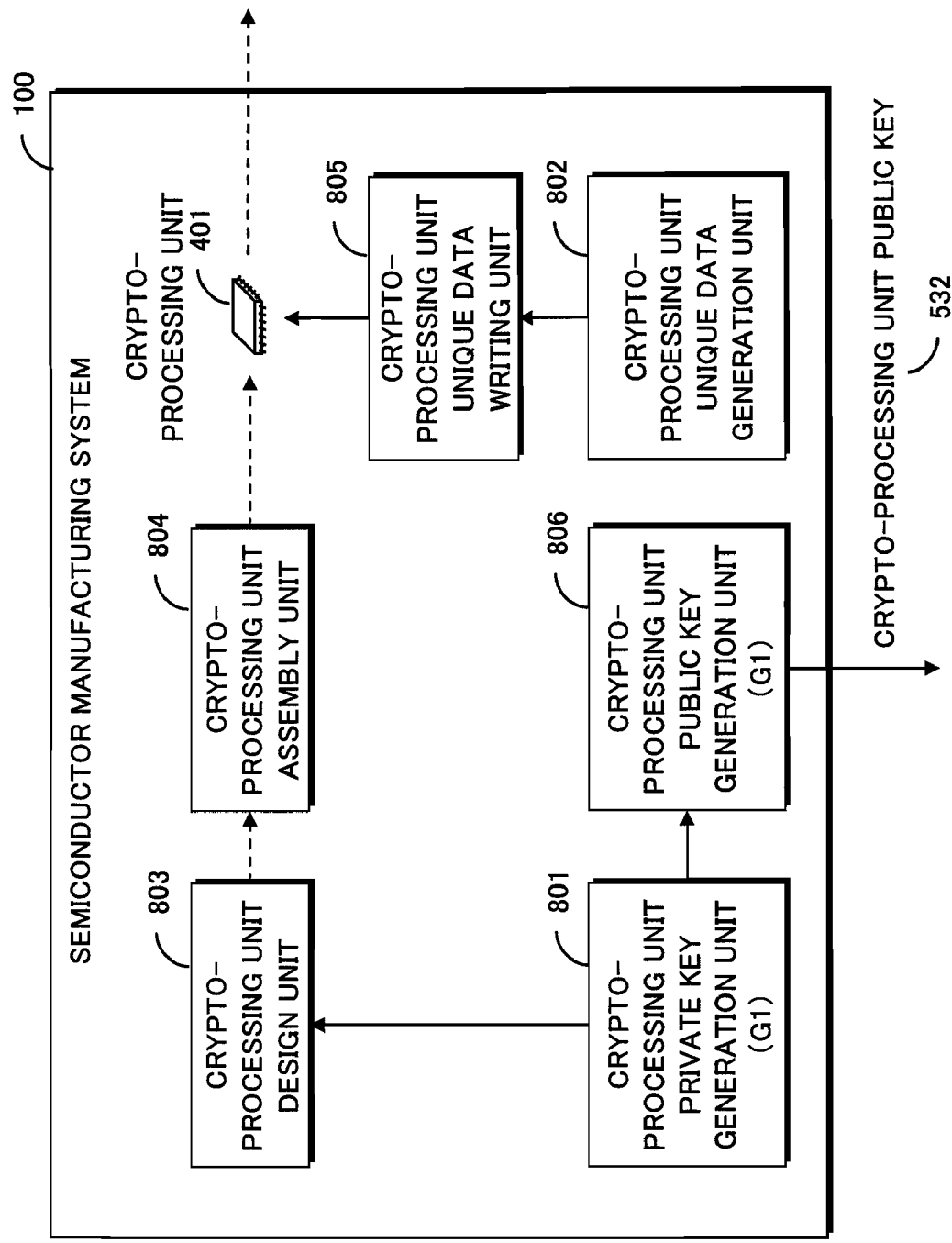
FIG. 2 is a structural diagram of a semiconductor manufacturing system 100 in the first embodiment.

FIG. 2 is a structural diagram of the semiconductor manufacturing system 100. The semiconductor manufacturing system 100 is composed of a crypto-processing unit private key generation unit 801, a crypto-processing unit unique data generation unit 802, a crypto-processing unit design unit 803, a crypto-processing unit assembly unit 804, a crypto-processing unit unique data writing unit 805, and a crypto-processing unit public key generation unit 806. Here, the crypto-processing unit private key generation unit 801, the crypto-processing unit design unit 803, and the crypto-processing unit public key generation unit 806 are connected to each other either directly or via a LAN or the like, and the crypto-processing unit unique data generation unit 802 and the crypto-processing unit unique data writing unit 805 are connected to each other either directly or via a LAN or the like. A plurality of crypto-processing units 401 having identical specifications are manufactured by the semiconductor manufacturing system 100.

The crypto-processing unit private key generation unit 801 generates a crypto-processing unit private key known only to the semiconductor manufacturer 1. Here, the crypto-processing unit private key is a private key generated according to a key generation algorithm G1 of a public key encryption scheme. The method used to generate the crypto-processing unit private key may be a publicly known method, such as generating a random number. An example of the public key encryption scheme is an ElGamal encryption scheme on a finite field, where the key generation algorithm G1 is a key generation algorithm in the ElGamal encryption on the finite field. The crypto-processing unit private key generation unit 801 outputs the generated crypto-processing unit private key to the crypto-processing unit public key generation unit 806 and the crypto-processing unit design unit 803.

The crypto-processing unit public key generation unit 806 receives the crypto-processing unit private key from the crypto-processing unit private key generation unit 801, and with use of the received crypto-processing unit private key, generates a crypto-processing unit public key in accordance using the key generation algorithm G1. The generated crypto-processing unit public key corresponds to the crypto-processing unit private key generated by the crypto-processing unit private key generation unit 801. The generated crypto-processing unit public key is recorded on the recording medium 22, which is then sent together with the crypto-processing unit 401 to the terminal maker 3. The crypto-processing unit public key generated by the encrypted processing unit public key generation unit 806 is common to the plurality of crypto-processing units 401.

The crypto-processing unit unique data generation unit 802) to the crypto-processing unit 401. The method used to generate the crypto-processing unit unique data may be generated by a commonly known method such as a method that uses a value of a counter that increases each time crypto-processing unit unique data is generated, or a method that uses information based on the date and time. The crypto-processing unit unique data does not have to be completely unique, but may be generated based on a physical individual difference of the crypto-processing unit 401 if the probability that identical crypto-processing unit unique data will be generated more than once is sufficiently low.

The crypto-processing unit design unit 803 receives the crypto-processing unit private key from the crypto-processing unit private key generation unit 801, reflects the crypto-processing unit private key generated by the crypto-processing unit private key generation unit 801 in design information, and creates design information pertaining to the crypto-processing unit 401.

The crypto-processing unit assembly unit 804 assembles the crypto-processing unit 401 based on the design information created by the crypto-processing unit design unit 803. The crypto-processing unit 401 is typically assembled as an LSI.

The crypto-processing unit unique data writing unit 805 writes the crypto-processing unit unique data generated by the crypto-processing unit unique data generation unit 802 to a crypto-processing unit unique data storage unit 504 in the crypto-processing unit 401.

1.3 Crypto-Processing Unit 401

Figure 3:
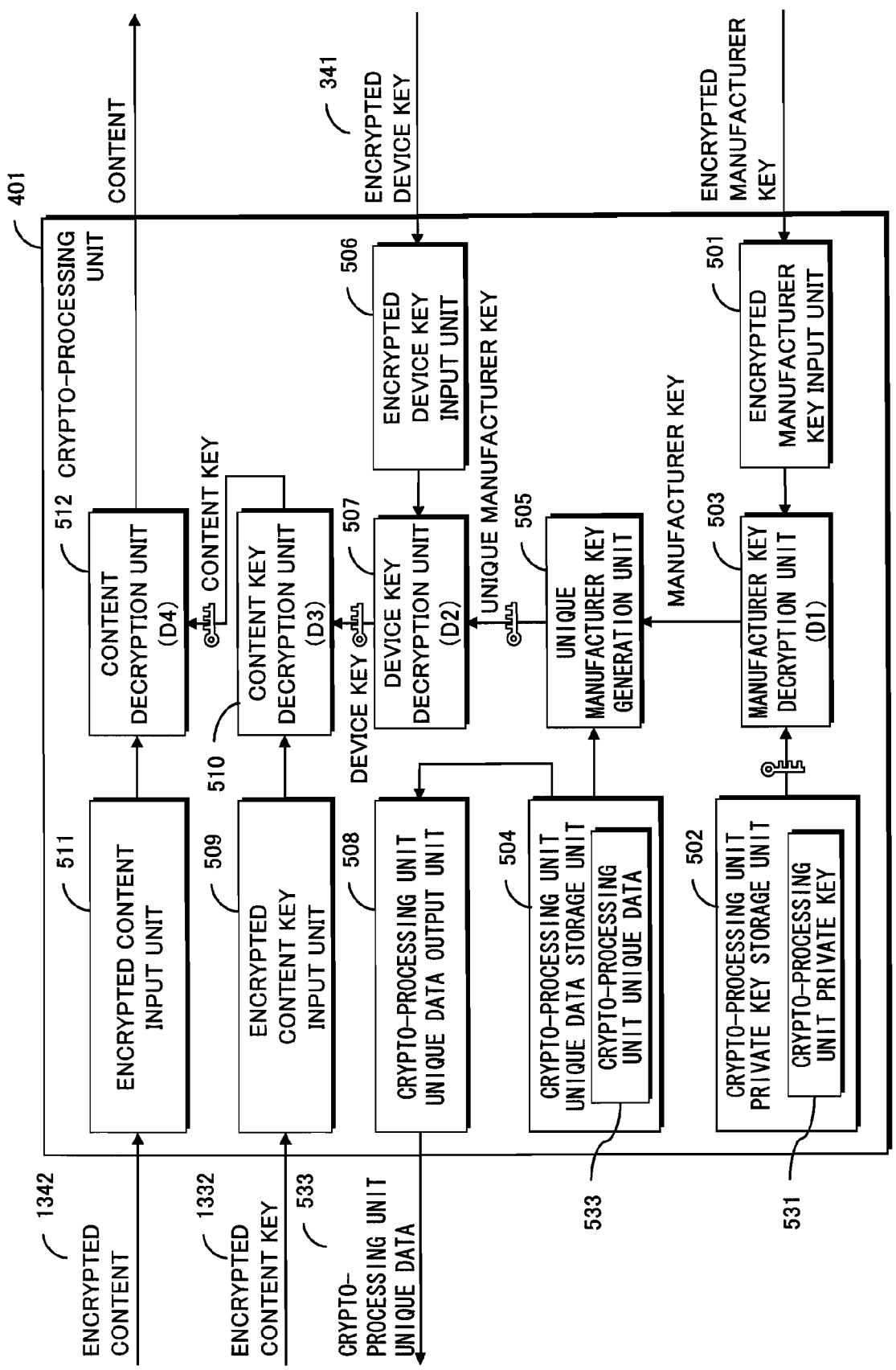
FIG. 3 is a structural diagram of a crypto-processing unit 401 in the first embodiment.

FIG. 3 is a structural diagram of the crypto-processing unit 401. The crypto-processing unit 401 is composed of an encrypted manufacturer key input unit 501, a crypto-processing unit private key storage unit 502, a manufacturer key decryption unit 503, the crypto-processing unit unique data storage unit 504, a unique manufacturer key generation unit 505, an encrypted device key input unit 506, a device key decryption unit 507, a crypto-processing unit unique data output unit 508, an encrypted content key input unit 509, a content key decryption unit 510, an encrypted content input unit 511, and a content decryption unit 512.

Note that each of the blocks showing the compositional units of the crypto-processing unit in FIG. 3 is, connected to another one or more of the blocks with one or more connection lines. Here, the connection lines represent paths along which a signal, information or the like is conveyed. Furthermore, the one of the connection lines connected to the block representing the content decryption unit 512 on which a key is illustrated represents a path along with information is conveyed to the content decryption unit 512. This applies similarly to the other blocks, and to the other drawings.

The encrypted manufacturer key input unit 501 receives an encrypted manufacturer key from an external apparatus. When the crypto-processing unit 401 is in the terminal 120, the encrypted manufacturer key input unit 501 receives the encrypted manufacturer key from a manufacturer key storage unit 402 (described later) in the terminal 120, and outputs the received encrypted manufacturer key to the manufacturer key decryption unit 503.

The crypto-processing unit private key storage unit 502 stores the crypto-processing unit private key known only to the semiconductor manufacturer 1, in a state in which it is difficult to observe the crypto-processing unit private key from outside. The crypto-processing unit private key is common to crypto-processing units 401 having identical specifications. Since the crypto-processing unit private key does not have to be changed and does not have to be unique, the crypto-processing unit private key is stored in a write-only ROM.

The manufacturer key decryption unit 503 receives the encrypted manufacturer key from the encrypted manufacturer key input unit 501, reads the crypto-processing unit private key from the crypto-processing unit private key storage unit 502, and with use of the read crypto-processing unit private key, decrypts the received encrypted manufacturer key using a public key decryption algorithm D1, thereby generating a manufacturer key. The public key decryption algorithm D1 is a public key decryption algorithm in the same public key encryption scheme that is the basis of the key generation algorithm G1. As one example, the public key decryption algorithm D1 is public key decryption algorithm in the described ELGamal encryption on the finite field.

Note that in the present Description, an encryption algorithm, a decryption algorithm, and a key generation algorithm in a cryptosystem are expressed for example as En, Dn, and Gn, respectively. The encryption algorithm En, the decryption algorithm Dn, and the key generation algorithm Gn are based on the same a cryptosystem n. As one example, the encryption algorithm En, the decryption algorithm Dn, and the key generation algorithm Gn are based on the same ElGamal encryption on the finite field.

The crypto-processing unit unique data storage unit 504 stores crypto-processing unit unique data that is unique to the crypto-processing unit 401, in a manner that the crypto-processing unit unique data is difficult to tamper with. As one example, the crypto-processing unit unique data is a manufacturing number (serial number) unique to the crypto-processing unit 401. The crypto-processing unit unique data is stored using a commonly known method, such as being written to a non-volatile storage area in the crypto-processing unit 401, or as a chip-ID automatically generated based on a physical individual difference. Alternatively, an ID or the like given to the crypto-processing unit 401 for the purpose of yield management in the semiconductor manufacturing process may be used to double as the crypto-processing unit unique data, as long as this ID or the like is unique to the crypto-processing unit 401.

The unique manufacturer key generation unit 505 receives the manufacturer key from the manufacturer key decryption unit 503, reads the crypto-processing unit unique data from the crypto-processing unit unique data storage unit 504, and composites (i) the manufacturer key obtained as a result of decryption by the manufacturer key decryption unit 503 and (ii) the crypto-processing unit unique data stored by the crypto-processing unit unique data storage unit 504, thereby generating a unique manufacturer key. The compositing of the manufacturer key and the crypto-processing unit unique data may be performed using a commonly known method such as a logical operation, an arithmetic operation or a combination of a logical operation and an arithmetic operation, or by encryption. The unique manufacturer key generation unit 505 outputs the generated unique manufacturer key to the device key decryption unit 507.

The encrypted device key input unit 506 receives the encrypted device key 341 from an external apparatus. When the crypto-processing unit 401 is in the terminal 120, the encrypted device key input unit 506 receives the encrypted device key 341 from a device key storage unit 403 (described later) of the terminal 120, and outputs the received encrypted device key 341 to the device key decryption unit 507.

The device key decryption unit 507 receives the encrypted device key 341 from the encrypted device key input unit 506, and receives the unique manufacturer key from the unique manufacturer key generation unit 505. Next, with use of use the received unique manufacturer key, the device key decryption unit 507 decrypts the received encrypted device key 341 according to a decryption algorithm D2 of a secret key cryptosystem, thereby generating a device key. Here, the decryption algorithm D2 of the secret key cryptosystem is, as one example, a decryption algorithm according to AES (Advanced Encryption Standard). The device key decryption unit 507 outputs the generated device key to the content key decryption unit 510.

The crypto-processing unit unique data output unit 508 reads the crypto-processing unit unique data from the crypto-processing unit unique data storage unit 504, and outputs the read crypto-processing unit unique data to a destination external to the crypto-processing unit 401.

The encrypted content key input unit 509 receives the encrypted content key 1332 from an external apparatus. When the crypto-processing unit 401 is in the terminal 120, the encrypted content key input unit 509 receives the encrypted content key 1332 from the encrypted content key reception unit 408 of the terminal 120, and outputs the received encrypted content key 1332 to the content key decryption unit 2510.

The content key decryption unit 510 receives a device key from the device key decryption unit 507, receives the encrypted content key 1332 from the encrypted content key input unit 509, and with use of the device private key included in the received device key, decrypts the received encrypted content key 1332 according to a decryption algorithm D3 of a public key encryption scheme, thereby generating a content key. Here, the decryption algorithm D3 is, as one example, a decryption algorithm in ElGamal encryption on a finite field. Next, the content key decryption unit 510 outputs the generated content key to the content decryption unit 512.

The encrypted content input unit 511 receives the encrypted content 1342 from an external apparatus. When the crypto-processing unit 401 is in the terminal 120, the encrypted content input unit 511 receives the encrypted content 1342 from an encrypted content reception unit 409 of the terminal 120, and outputs the received encrypted content 1342 to the content decryption unit 512.

The content decryption unit 512 receives the encrypted content from the encrypted content input unit 511, receives the content key from the content key decryption unit 510, and with use of the received content key, decrypts the received encrypted content 1342 according to a decryption algorithm D4 of a key cryptosystem. Here, the decryption algorithm D4 is, for example, a decryption algorithm in AES. Next, the content decryption unit 512 outputs the generated content to an external destination. When the crypto-processing unit 401 is in the terminal 120, the content decryption unit 512 outputs the generated content to a content display unit 410 of the terminal 120.

1.4 Terminal Manufacturing System 110

Figure 4:
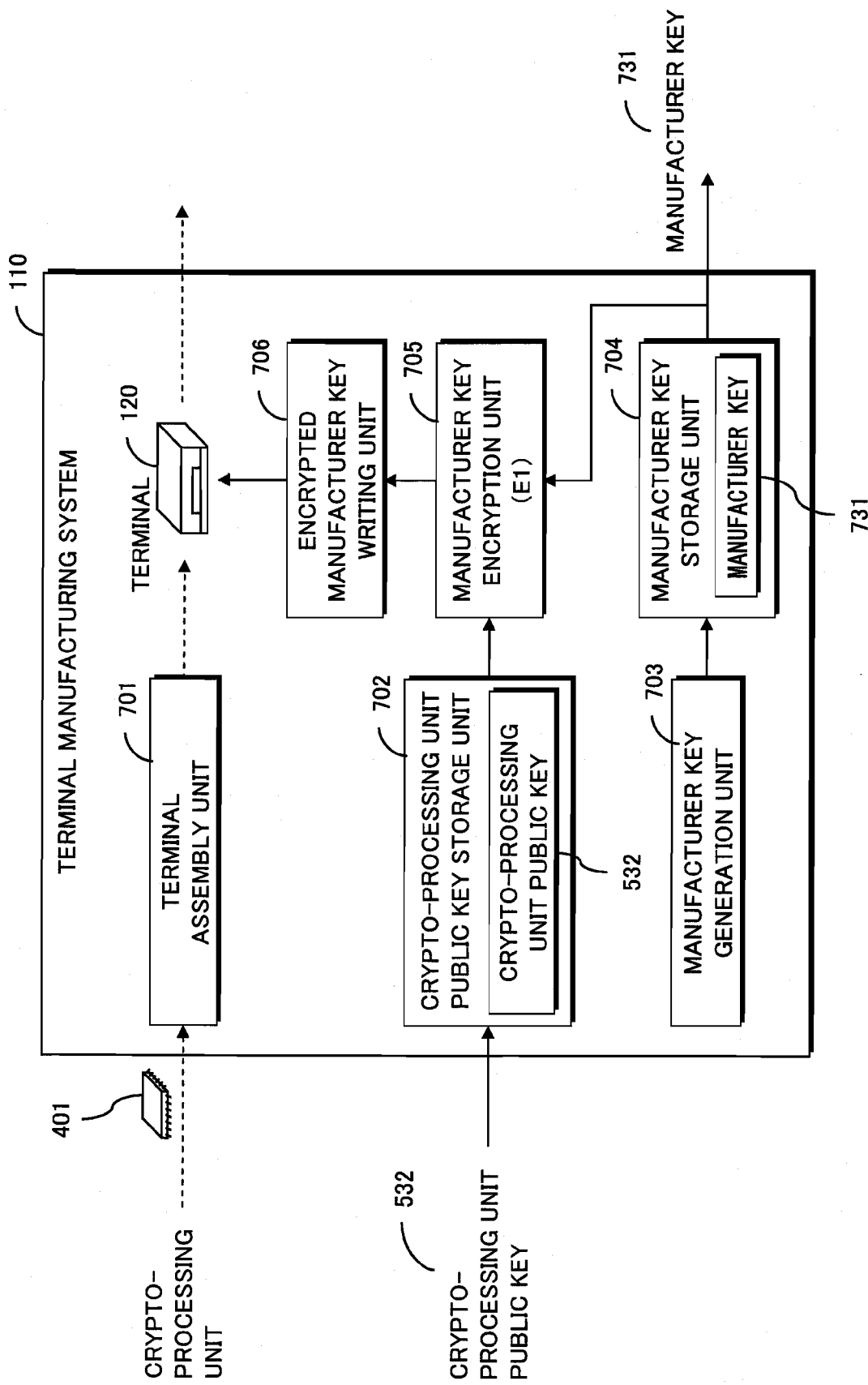
FIG. 4 is a structural diagram of a terminal manufacturing system 110 in the first embodiment.

FIG. 4 is a structural diagram of the terminal manufacturing system 110. The terminal manufacturing system 110 is composed of a terminal assembly unit 701, a crypto-processing unit public key storage unit 702, a manufacturer key generation unit 703, a manufacturer key storage unit 704, a manufacturer key encryption unit 705, and an encrypted manufacturer key writing unit 706.

The terminal assembly unit 701 installs the crypto-processing unit 401 acquired from the semiconductor manufacturer 1, to assemble the terminal 120.

The crypto-processing unit public key storage unit 702 acquires the crypto-processing unit public key 532 from the semiconductor manufacturer 1, and stores the acquired crypto-processing unit public key 532.

The manufacturer key generation unit 703 generates a manufacturer key that is known only to the terminal manufacturer 3 and the key setter. The method used to generate the manufacturer key may be a publicly known method, such as generating a random number. Next, the manufacturer key generation unit 703 writes the generated manufacturer key to the manufacturer key storage unit 704 as the manufacturer key 731.

The key storage unit 704 stores the manufacturer key 731 generated by the manufacturer key generation unit 703.

The manufacturer key 731 stored in the manufacturer key storage unit 704 is recorded on a recording medium 25, which is shipped to the key setter 4.

The manufacturer key encryption unit 705 reads the crypto-processing unit public key 532 from the crypto-processing unit public key storage unit 702, reads the manufacturer key 731 from the manufacturer key storage unit 704, and, with use of the read crypto-processing unit public key 532, encrypts the read manufacturer key 731 according to an encryption algorithm E1 of a public key cryptosystem, thereby generating an encrypted manufacturer key. Here, the encryption algorithm E1 is, for example, an encryption algorithm in the aforementioned ElGamal encryption on the finite field, and corresponds to the decryption algorithm D1. Next, the manufacturer key encryption unit 705 outputs the generated encrypted manufacturer key to the encrypted manufacturer key writing unit 706.

The encrypted manufacturer key writing unit 706 receives the encrypted manufacturer key generated by the manufacturer key encryption unit 705, and writes the received encrypted manufacturer key to the manufacturer key storage unit 402 (described later) of the terminal 120. It should be noted that since the encrypted manufacturer key is common to the plurality of terminals 120 assembled by the terminal assembly unit 701, it is suitable to prepare a plurality of manufacturer key storage units 402 in which the encrypted manufacturer key has been written in advance, and then the terminal assembly unit 701 may install a manufacturer key storage unit 402 to assemble each terminal 120.

1.5 Terminal 120

Figure 5:
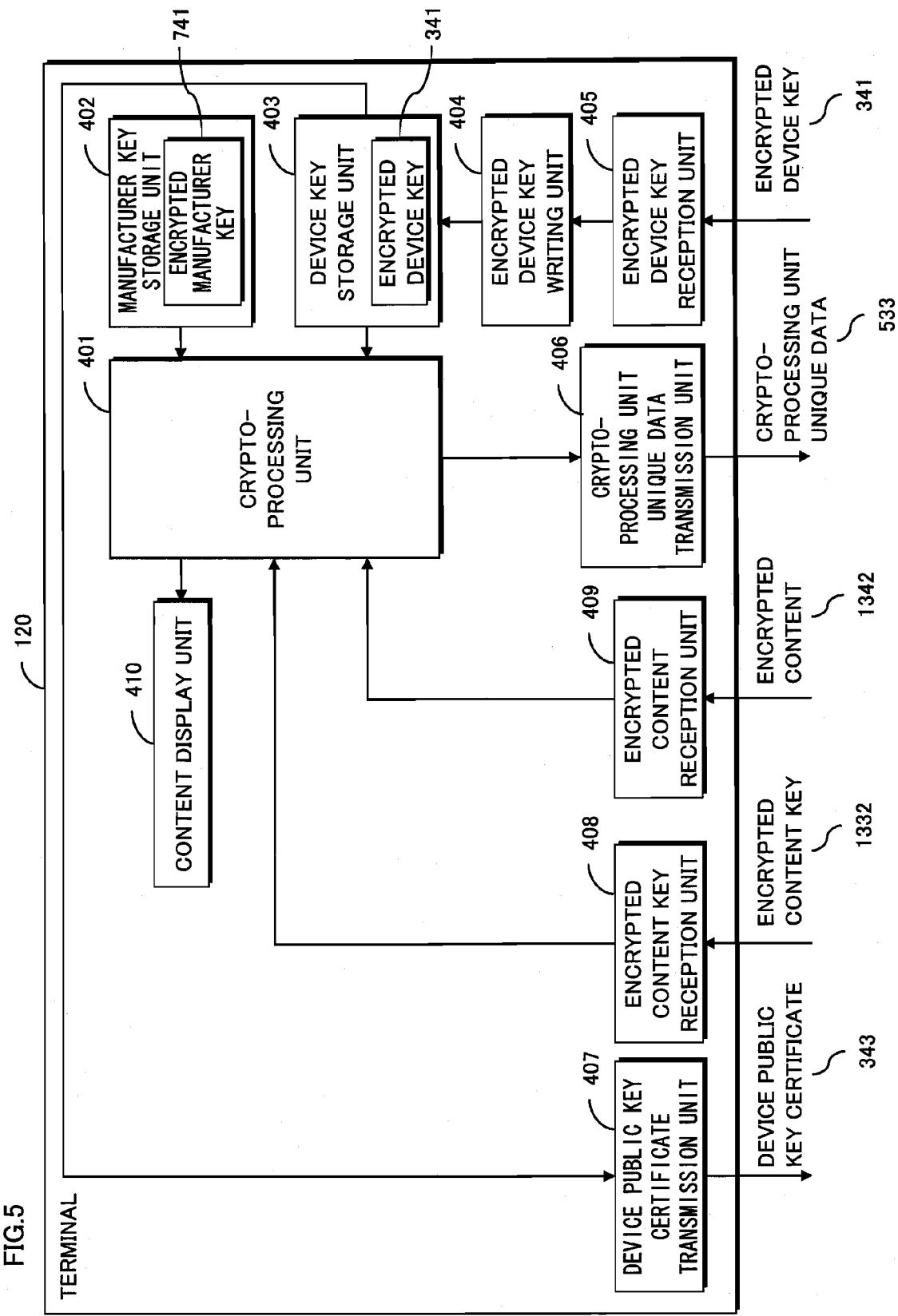
FIG. 5 is a structural diagram of a terminal 120 in the first embodiment.

FIG. 5 is a structural diagram of the terminal 120. The terminal 120 is composed of the crypto-processing unit 401, the manufacturer key storage unit 402, the device key storage unit 403, an encrypted device key writing unit 404, an encrypted device key reception unit 405, a crypto-processing unit unique data transmission unit 406, a device public key certificate transmission unit 407, the encrypted content key reception unit 408, the encrypted content reception unit 409, and the content display unit 410.

Figure 6:
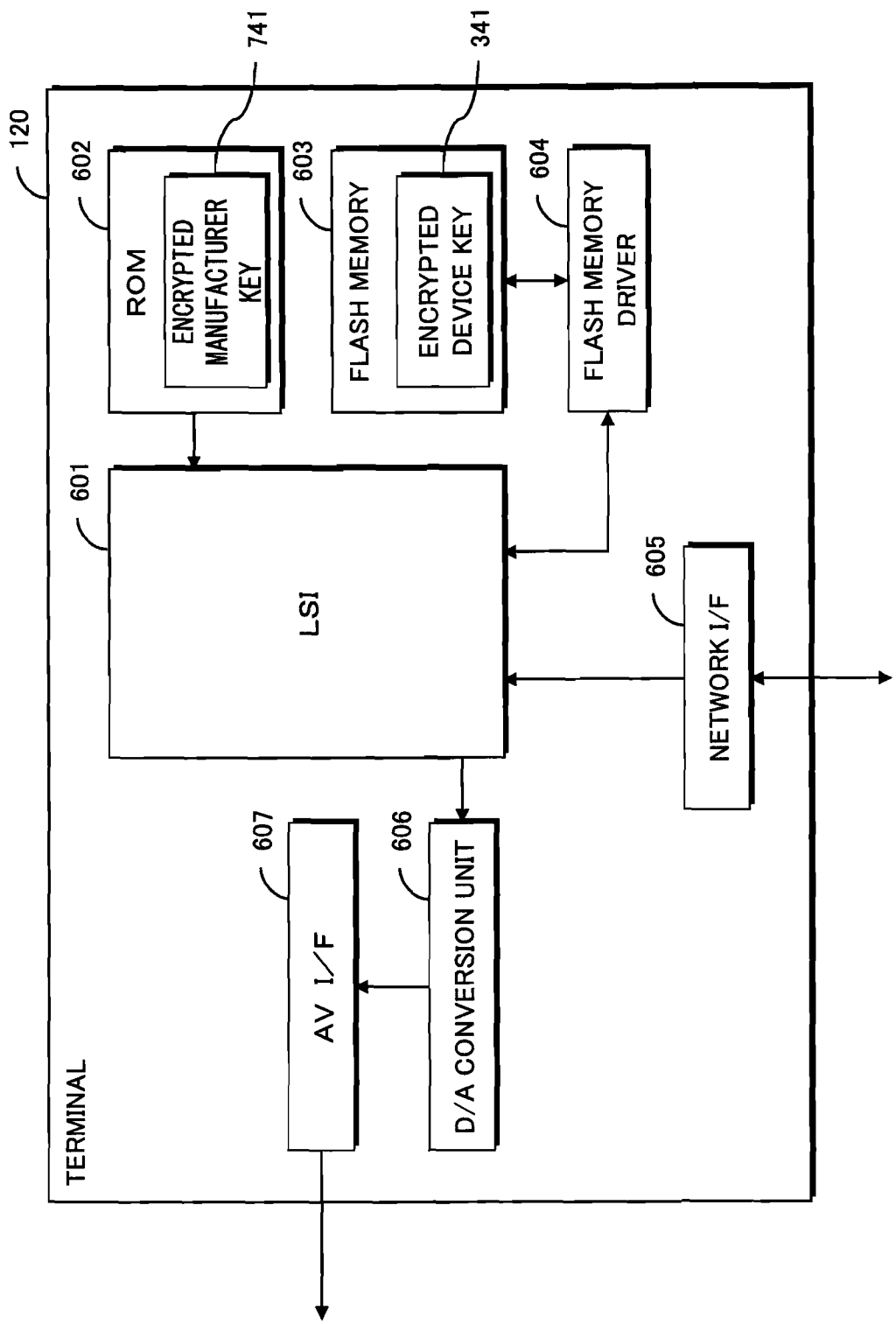
FIG. 6 is a physical structural diagram of the terminal 120 in the first embodiment.

FIG. 6 shows one embodiment of the structure of the terminal 120. In FIG. 6, the terminal 120 is composed of an LSI 601, a ROM 602 that is a read-only storage area, a flash memory 603 that is a readable and writable storage area, a flash memory driver 604 that controls reading and writing from and to the flash memory 603, a network interface (I/F) 605, a D/A conversion unit 606 that converts a digital signal output from the LSI 601 into an analog signal, and an AV I/F 607 that outputs the analog signal output from the D/A conversion unit 606 to a display device (not illustrated).

The crypto-processing unit 401 performs encryption processing in a manner that the encryption processing is difficult to monitor from outside, and has embedded therein crypto-processing unit unique data that is unique to the crypto-processing unit 401. The crypto-processing unit 401 is typically implemented as the LSI 601 of FIG. 6.

The manufacturer key storage unit 402 stores the encrypted manufacturer key 741 generated by the terminal manufacturing system 110 encrypting the manufacturer key with use of the crypto-processing unit public key. The encrypted manufacturer public key 741 is a value shared by a plurality of terminals 120 having identical specifications. Since the encrypted manufacturer public key 741 is set in the terminals 120 at the stage of manufacturing of the terminals 120 in the terminal manufacturing system 110, the manufacturer key storage unit 402 is typically implemented as the ROM 602 of FIG. 6.

The device key storage unit 403 stores the encrypted device key sent from the device key encryption server 140 which generated the encrypted device key by encrypting the device key. Since the device key storage unit 403 is set in the terminal 120 after the terminal 120 is sold to the service user, the device key storage unit 403 is typically implemented as the flash memory 603 FIG. 6.

The encryption device key writing unit 404 receives the encrypted device key 341 from the encrypted device key reception unit 405, and writes the received encrypted device key 341 to the device key storage unit 403. The encrypted device key writing unit 404 is typically implemented as the flash memory driver 604 controlled by the LSI 601 of FIG. 6.

The crypto-processing unit unique data transmission unit 406 acquires the crypto-processing unit unique data from the crypto-processing unit 401, and transmits the acquired crypto-processing unit unique data to the device key encryption server 140 via the Internet 9. The crypto-processing unit unique data transmission unit 406 is typically implemented as the network I/F 605 controlled by the LSI 601 of FIG. 6.

The device public key certificate transmission unit 407 reads the device public key certificate, which is part of the encrypted device key stored in the device key storage unit 403, and transmits the read device public key certificate 343 to the DRM server 150 via the Internet 9. The device public key certificate transmission unit 407 is typically implemented as the network I/F 605 controlled by the LSI 601 of FIG. 6.

The encrypted content key reception unit 408 receives the encrypted content key 1332 from the DRM server 150, and outputs the received encrypted content key 1332 to the crypto-processing unit 401. The encrypted content key reception unit 408 is typically implemented as the network I/F 605 controlled by the LSI 601 of FIG. 6.

The encrypted content reception unit 409 receives encrypted content 1342 from the content server 160, and outputs the received encrypted content 1342 to the crypto-processing unit 401. The encrypted content reception unit 409 is typically implemented as the network I/F 605 controlled by the LSI 601 of FIG. 6.

The content display unit 410 receives content from the crypto-processing unit 401, and displays a digital signal representing the received content on a display device (not illustrated). The content display unit 410 is typically implemented as shown in FIG. 6 as the D/A conversion unit 606 that converts a digital signal output from the LSI 601 into an analog signal, and the AV I/F 607 that outputs the analog signal resulting from the conversion by the D/A conversion unit 606 to the display device (not illustrated).

1.6 Device Key Generation Apparatus 130

Figure 7:
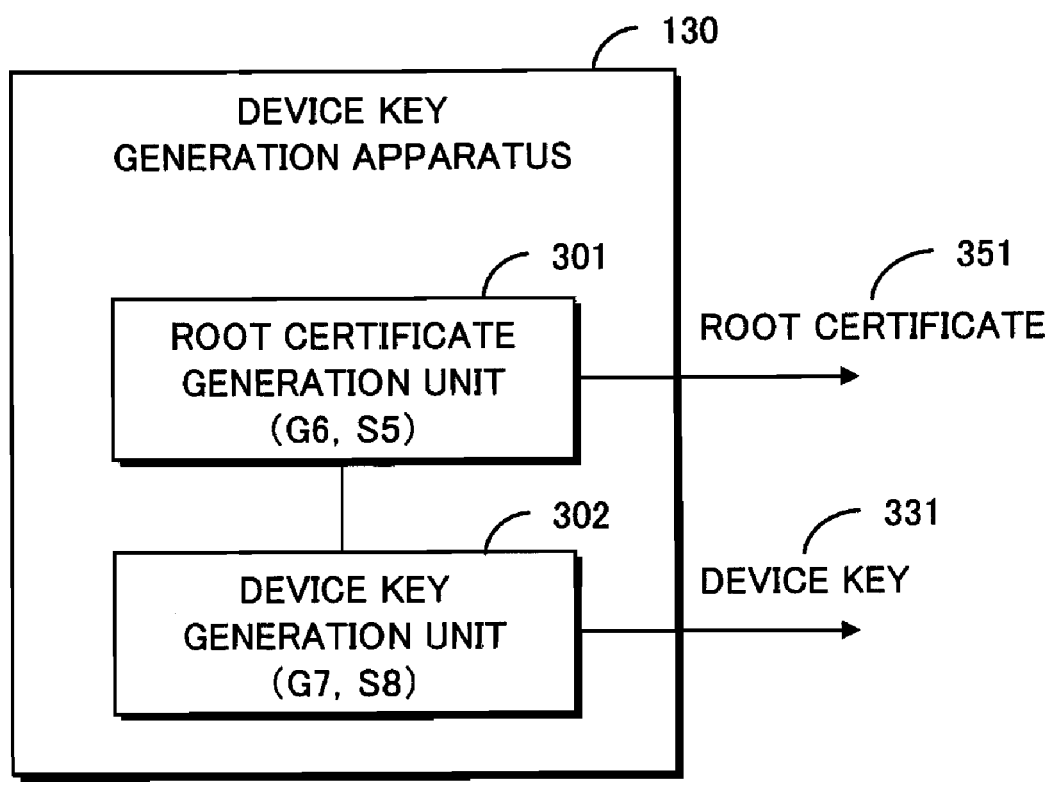
FIG. 7 is a structural diagram of a device key generation apparatus 130 in the first embodiment.

The device key generation apparatus 130, as shown in FIG. 7, is composed of a root certificate generation unit 301 and a device key generation unit 302.

The device key generation apparatus 130 is, specifically, a computer system composed of a microprocessor, a ROM, a RAM, a hard disk unit and the like. Computer programs are stored in the RAM or the hard disk unit. The device key generation apparatus 130 achieves its functions by the microprocessor operating according to the computer programs.

The root certificate generation unit 301 generates a root private key and a root public key 352 according to a key generation algorithm G6 of a digital signature in a public key encryption method. The root private key is a private key, and the root public key 352 is a public key. Furthermore, the root certificate generation unit 301 generates signature data 353 with respect to the root public key 352, with use of the root private key, according to a digital signature generation algorithm S5 of the public key encryption scheme. Next, the root certificate generation unit 301 generates the root certificate 351 composed of the root public key 352 and the signature data 353, and writes the generated root certificate 351 to the recording medium 24.

Figure 9:
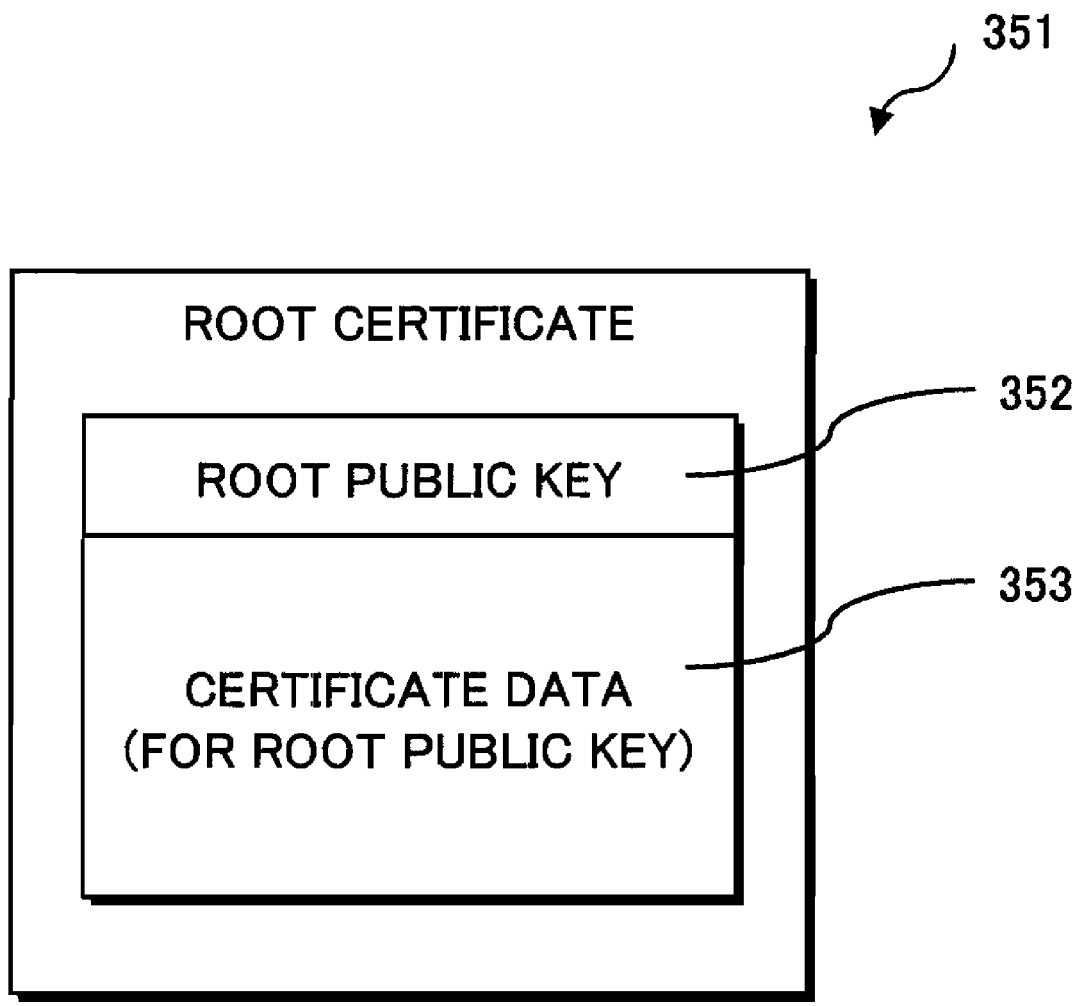
FIG. 9 shows the data structure of the root certificate 351 in the first embodiment.

FIG. 9 shows the structure of the root certificate 351. As shown in FIG. 9, the root certificate 351 is composed of the root public key 352 and the signature data 353.

The device key generation unit 302 generates the device private key 332 and the device public key 334 according to a key generation algorithm G7 of the digital signature in the public key encryption scheme. The device private key 332 is a private key, and the device public key 334 is a public key. Furthermore, the device key generation unit 302 generates signature data 335 with respect to the device public key 334 with use of the root private key according to a digital signature generation algorithm S8 of a digital signature in a public key cryptosystem. Next, the device key generation unit 302 generates the device key public certificate 333 composed of the device public key 334 and the signature data 335, and generates the device key 331 composed of the device private key 332 and the device public key certificate 333.

The device key generation unit 302 generates a plurality of device keys 331x by repeating the above procedure. Each of the device keys includes a device private key and a device public key certificate, and each device public key certificate includes a device public key and signature data. The device public keys included in the generated device keys are all different to each other, and the device private keys are also all different to each other. The device key generation unit 302 writes the generated device keys 331x to the recording medium 23.

FIG. 8 shows the structure of the device key 331. The device key 331 includes the device private key 332 and the device public key certificate 333. The device public key certificate 333 includes the device signature key 334 and the signature data 335.

The device key issuer 2 sends the recording medium 24 storing the root certificate 351 to the service provider 5, in a state in which secrecy can be administered. The device key issuer 2 also sends the recording medium 23 storing the device keys 331x to the key setter 4 in a state in which secrecy can be administered.

Here, the key generation algorithms G6 and G7 of the digital signature in the public key cryptosystem are each, for example, a key generation algorithm according to an ElGamal signature on a finite field. Furthermore, the digital signature generation algorithms S5 and S8 in the public key encryption scheme are each, for example, signature generation algorithms according to an ElGamal signature on a finite field.

1.7 Device Key Encryption Server 140

Figure 10:
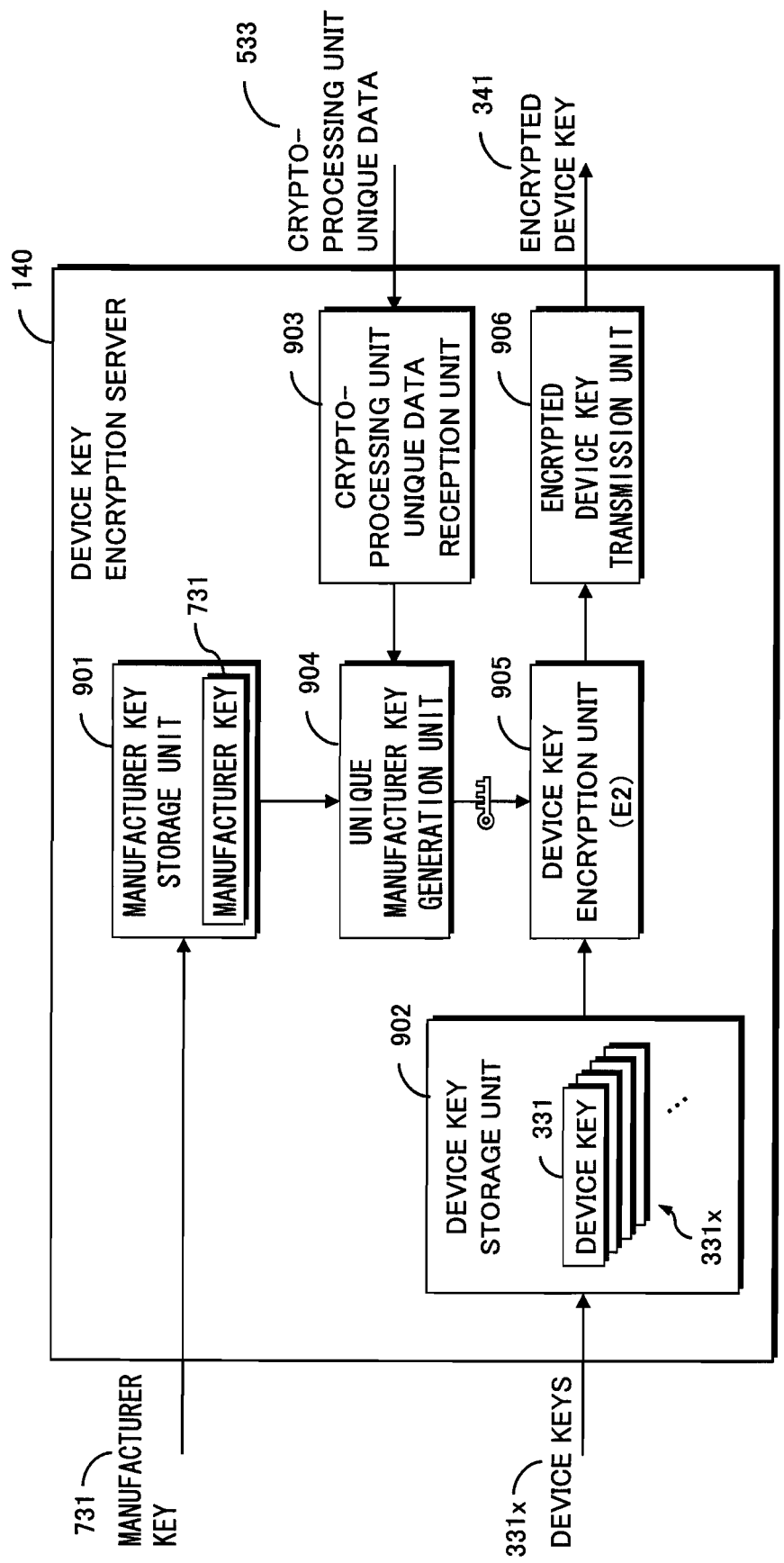
FIG. 10 is a structural diagram of a device key encryption server 140 in the first embodiment.

FIG. 10 is a structural diagram of the device key encryption server 140. The device key encryption server 140 is composed of a manufacturer key storage unit 901, a device key storage unit 902, a crypto-processing unit unique data reception unit 903, a unique manufacturer key generation unit 904, a device key encryption unit 905, and an encrypted device key transmission unit 906. The device key encryption server 140 is, specifically, a computer system composed of a microprocessor, a ROM, a RAM, a hard disk unit, and the like.

The manufacturer key storage unit 901 stores the manufacturer key 731 sent from the terminal manufacturer 3.

The device key storage unit 902 stores device keys 331x sent from the device key issuer 2.

The crypto-processing unit unique data reception unit 903 receives the crypto-processing unit unique data 533 from the crypto-processing unit unique data transmission unit 406, and outputs the received crypto-processing unit unique data 533 to the unique manufacturer key generation unit 904.

The unique manufacturer key generation unit 904 generates a unique manufacturer key by compositing the manufacturer key 731 stored by the manufacturer key storage unit 901 and the crypto-processing unit unique data 533 received by the crypto-processing unit unique data reception unit 903. The compositing of the manufacturer key and the crypto-processing unit unique data may be performed using a commonly known method such as a logical operation, an arithmetic operation or a combination of a logical operation and an arithmetic operation, or by encryption. The same method used for the compositing is used by the unique manufacturer key generation unit 505 of the crypto-processing unit 401. The unique manufacturing key generation unit 904 outputs the generated unique manufacturing key to the device key encryption unit 905.

The device key encryption unit 905 selects a currently unused device key from among the device keys 331x stored in the device key storage unit 902, and receives the unique manufacturer key from the unique manufacturer key generation unit 904. Next, the device key encryption unit 905 extracts the device private key and the device public key certificate from the selected device key. Next, using the received unique manufacturer key, the device key encryption unit 905 encrypts the extracted device private key according to the encryption algorithm E2 of the secret key cryptosystem, thereby generating the encrypted device private key 342. The device key encryption unit 905 then generates the encrypted device key 341 composed of the encrypted device private key 342 and the extracted device public key certificate, and outputs the generated encrypted device key 341 to the encrypted device key transmission unit 906.

The encrypted device key transmission unit 906 receives the encrypted device key 341 from the device key encryption unit 905, and transmits the received encrypted device key 341 to the terminal 120.

As shown in FIG. 11, the encryption device key 341 includes the encryption device private key 342 and the device public key certificate 343, and the device public key certificate 343 includes the device public key 344 and the signature data 345. Here, the device public key certificate 343 shown in FIG. 11 is identical to the device public key certificate shown in FIG. 8.

1.8 DRM Server 150

Figure 12:
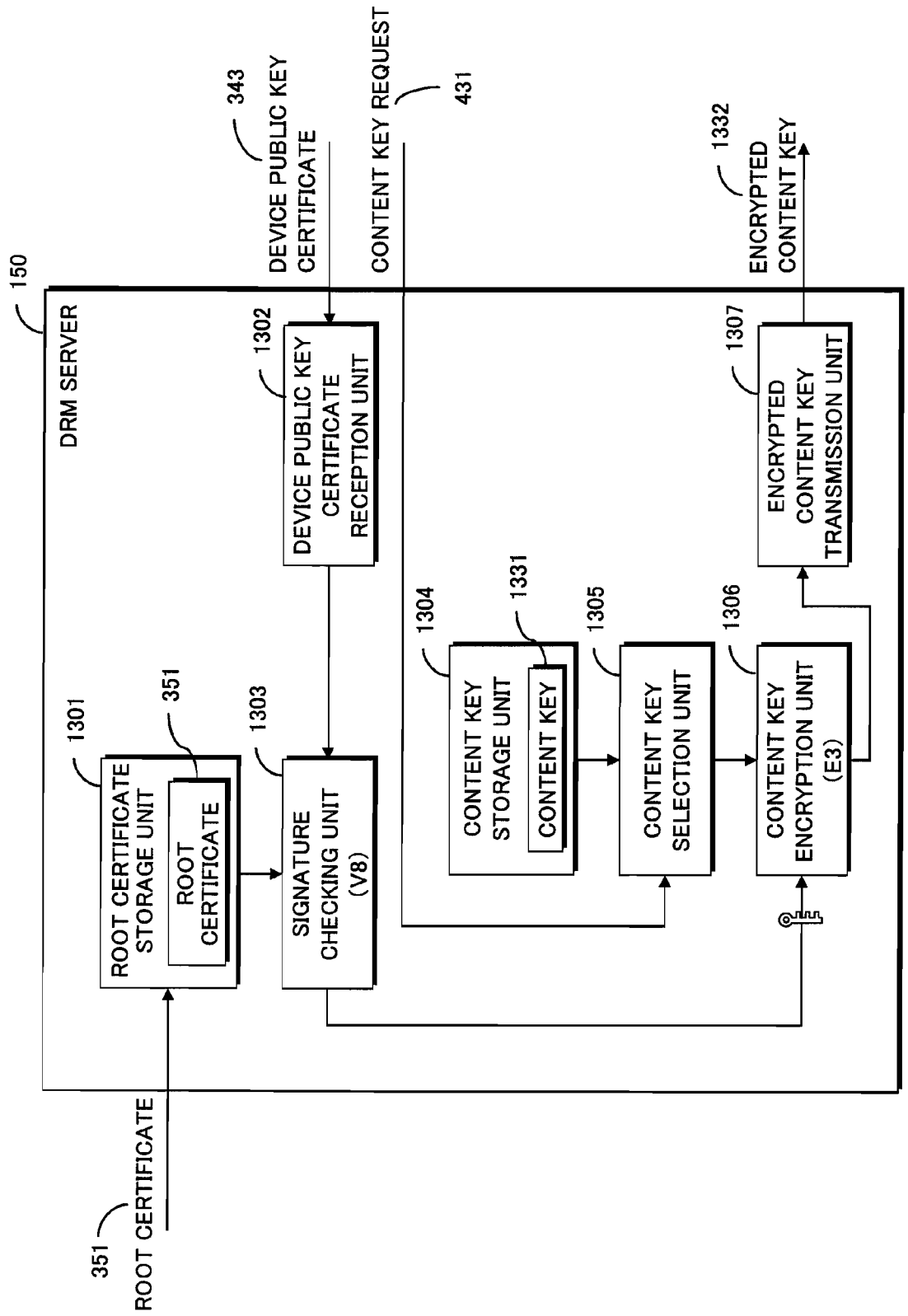
FIG. 12 is a structural diagram of a DRM server 150 in the first embodiment.

FIG. 12 is a structural diagram of the DRM server 150. The DRM server 150 is composed of a root certificate storage unit 1301, a device public key certificate reception unit 1302, a signature checking unit 1303, a content key storage unit 1304, content key selection unit 1305, content key encryption unit 1306, and an encrypted content key transmission unit 1307. The DRM server is, specifically, a computer system composed of a microprocessor, a ROM, a RAM, a hard disk unit, and the like.

The root certificate storage unit 1301 stores the root certificate 351 sent from the device key issuer 2.

The device public key certificate reception unit 1302 receives the device public key certificate 343 from the device public key certificate transmission unit 407 of the terminal 120.

With use of the root certificate 351 stored in the root certificate storage unit 1301, the signature checking unit 1303 checks the legitimacy of the device public key certificate 343 received from the device public key certificate reception unit 1302. More specifically, according to a verification algorithm V8 of a digital signature in a public key encryption scheme, the signature checking unit 1303 verifies the signature data 335 included in the device public key certificate 343, with use of the root public key certificate 352 included in the root certificate 351. Here, the verification algorithm V8 is a verification algorithm that corresponds to the digital signature generation algorithm S8 and is for verifying signature data generated according to the digital signature generation algorithm S8. When the verification is successful, the signature checking unit 1303 outputs the received device public key signature 343 to the content key encryption unit 1306.

The content key storage unit 1304 stores the content key 1331 for decrypting one or more encrypted content held in the content server 160.

The content key selection unit 1305 selects a corresponding content key from the content key storage unit 1304 based on a content request 431 transmitted from the terminal 120, and outputs the selected content key to the content key encryption unit 1306.

The content key encryption unit 1306 receives the content key from the content key selection unit 1305, and receives the device public key certificate 343 from the signature checking unit 1303. Next, the content key encryption unit 1306 encrypts the received content key with use of the device public key included in the received device public key certificate 343, according to the encryption algorithm E3 in the public key encryption scheme, thereby generating an encrypted content key 1332. The content key encryption unit 1306 then outputs the generated encrypted content key 1332 to the encrypted content key transmission unit 1307.

The encrypted content key transmission unit 1307 receives the encrypted content key 1332 from the content key encryption unit 1306, and transmits the received encrypted content key 1332 to the terminal 120 via the Internet 9.

1.9 Content Server 160

Figure 13:
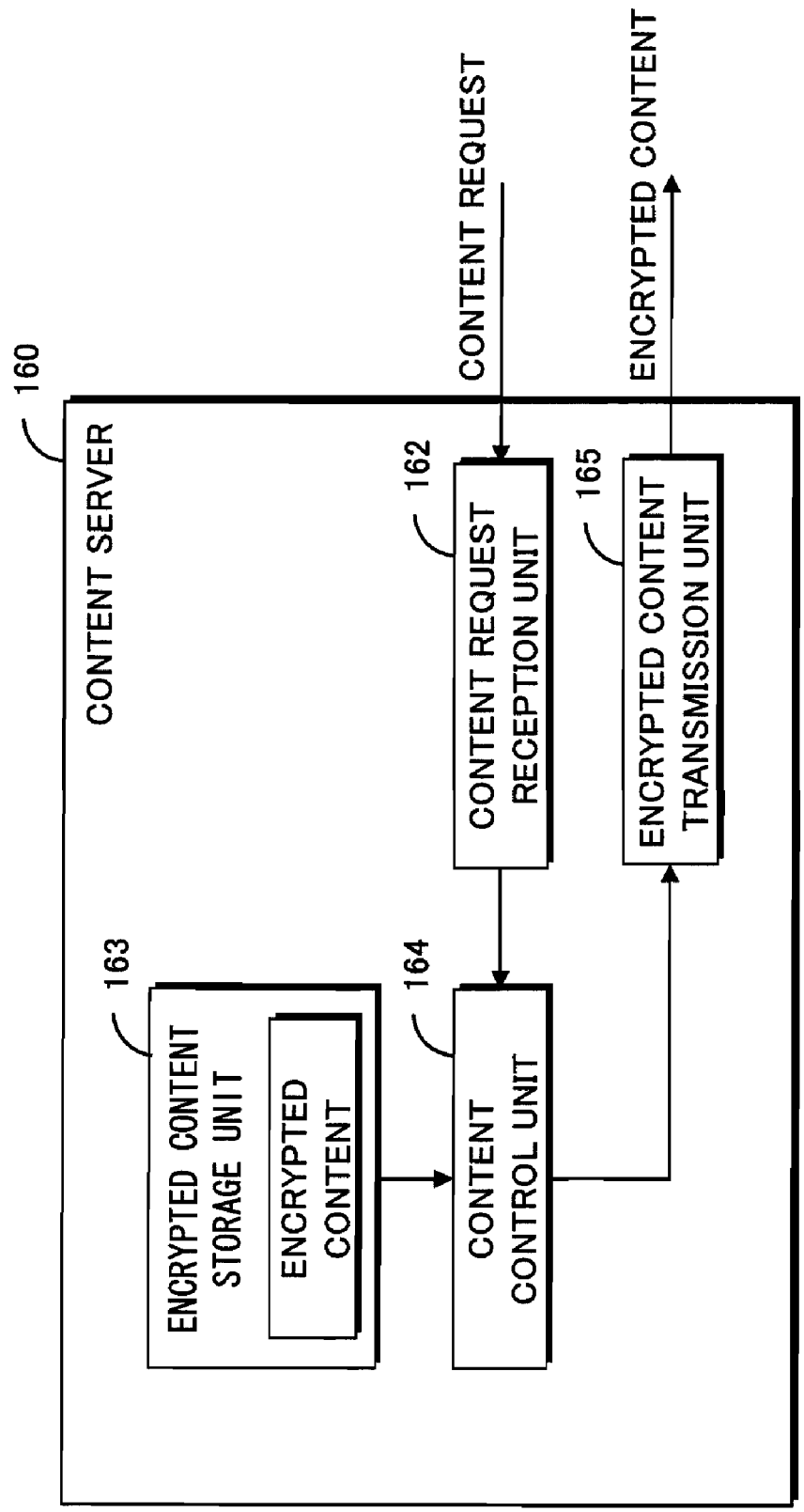
FIG. 13 is a structural diagram of the content server 160 in the first embodiment.

FIG. 13 is a structural diagram of the content server 160. The content server 160 is composed of a content request reception unit 162, an encrypted content storage unit 163, a content control unit 164, and an encrypted content transmission unit 165. The content server 160 is, specifically, a computer system composed of a microprocessor, a ROM, a RAM, a hard disk unit, and the like.

The encrypted content storage unit 163 stores a plurality of encrypted contents in advance. Each encrypted content has been generated by encrypting content with use of a pre-allocated content key according to an encryption algorithm E4 in a secret key cryptosystem. The encryption algorithm E4 corresponds to the decryption algorithm D4, and a cipher text generated by encrypting according to the encryption algorithm E4 is decrypted according to the decryption algorithm D4. Here, each content is data that has been digitized and compression encoded. Examples of the data are data representing a still image, data representing music, and data representing a movie composed of audio and a moving image.

The content request reception unit 162 receives, from the terminal 120 via the Internet 9, a content request requesting content desired by the service user 6 of the terminal 120, and outputs the received content request to the content control unit 164.

The content control unit 164 receives the content request from the content request reception unit 162, reads the encrypted content corresponding to the content shown by the received content request, from the encrypted content storage unit 163, and outputs the read encrypted content to the encrypted content transmission unit 165.

The encrypted content transmission unit 165 receives the encrypted content from the content control unit 164, and transmits the received encrypted content to the terminal 120 via the Internet 9. 1.10 Operations of the Terminal Data Setting System 10

Figure 14:
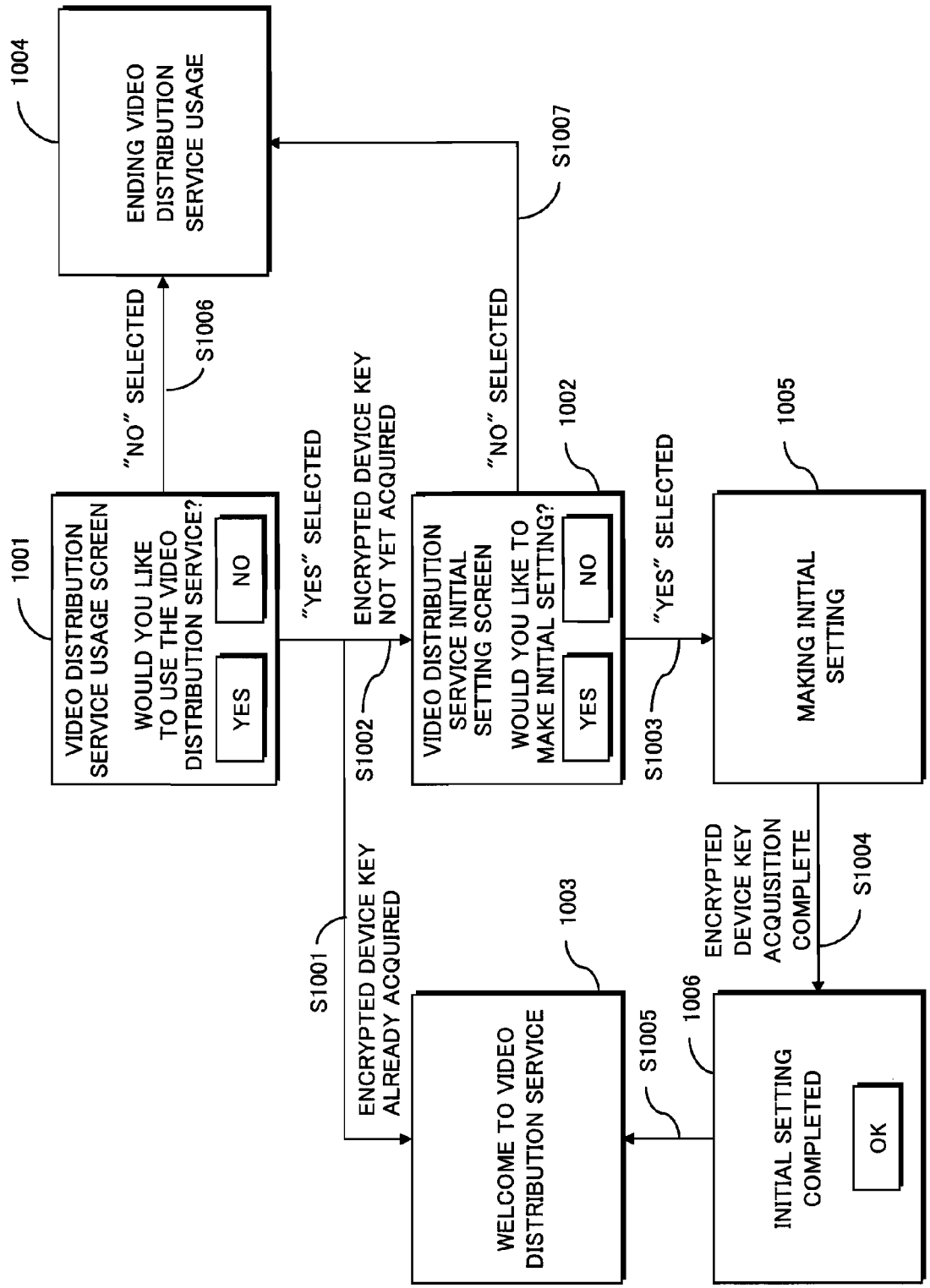
FIG. 14 is a transitional drawing of a terminal user interface when setting terminal data in the first embodiment.

Operations performed by the terminal 120 to acquire a device key are described with use of the terminal user interface transition diagram shown in FIG. 14.

Upon the terminal 120 being booted by an operation by the service user, a control unit (not illustrated) of the terminal 120 displays a screen 1001 on a display unit (not illustrated) of the terminal 120. The screen 1001 is for inquiring as to whether or not the service user wishes to use the content distribution service.

Here, if using an input device such a remote control (not illustrated) of the terminal 120, the service user selects "NO" (step S1006), the control unit of the terminal 120 displays a screen 1004 showing the end of service usage on the display unit, and ends service usage. When the service user selects "YES", if an encrypted device key is currently stored in the device key storage unit 403 (step S1001), the control unit displays a screen 1003 showing the start of service on the display unit. If an encrypted device key is not currently stored in the device key storage unit 403 (step S1002), the control unit displays a screen 1002 inquiring as to whether or not to start initial setting of the service on the display unit.

When the service user selects "NO" when the screen 1002 is being displayed (step S1007), the control unit of the terminal 120 displays the screen 1004 showing the end of service usage on the display unit, and ends service usage. When the service user selects "YES" (step S1003), the control unit displays a screen 1005 showing that processing for the initial setting of the content distribution service is in progress on the display unit, while in the background the control unit is acquiring an encrypted device key from the device key encryption server 140.

Upon acquiring the encrypted device key from the terminal 120 (step S1004), the control unit of the terminal 120 displays a screen 1006 showing completion of initial settings of the content distribution service, and asks for the user's acknowledgement ("OK") of the completion. When the user presses "OK" (step S1005), the control unit displays the screen 1003 showing the start of service on the display unit.

Figure 15:
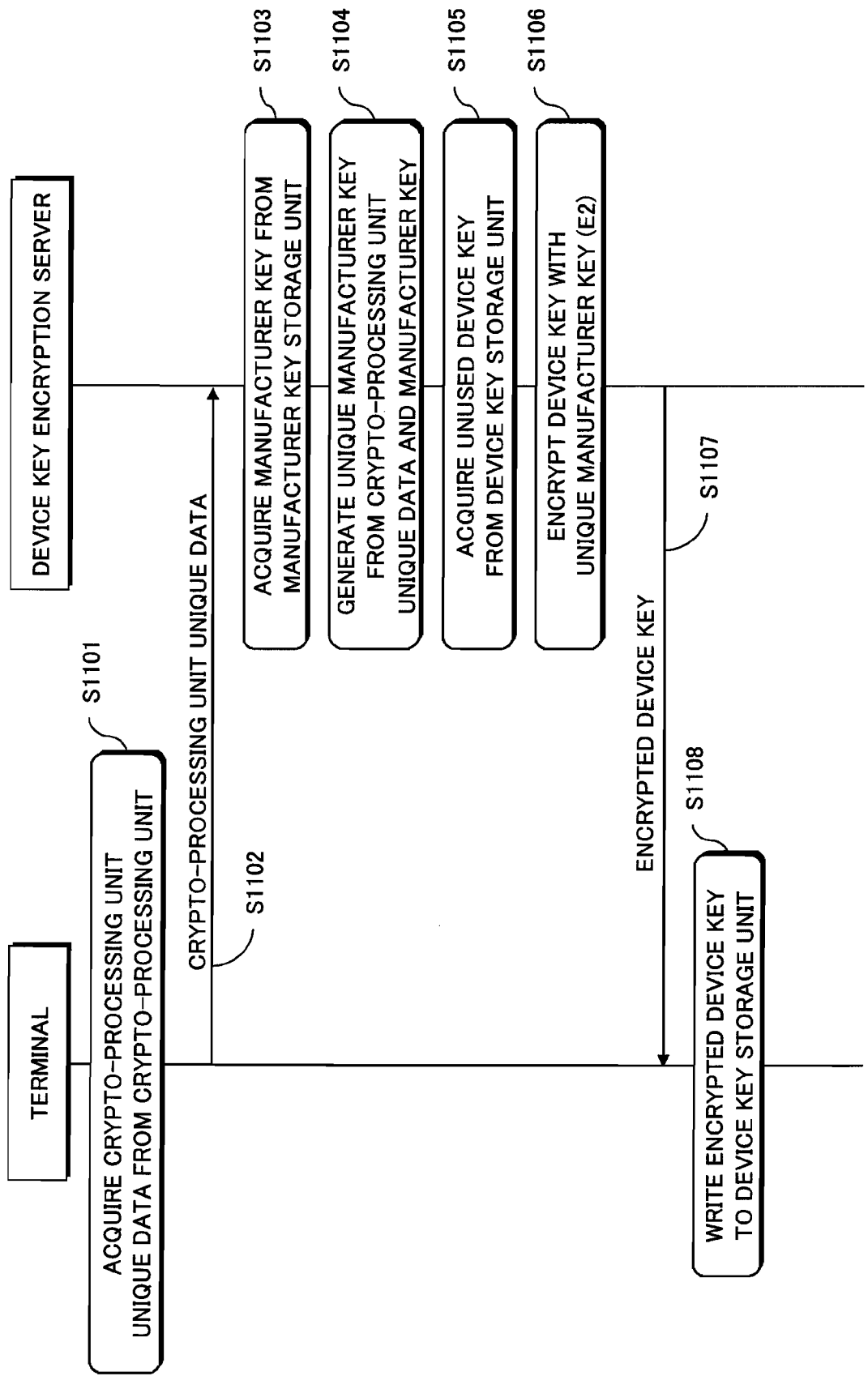
FIG. 15 is a flowchart showing processing between the terminal 120 and the device key encrypted server 140 when setting an encrypted device key in the first embodiment.

Referring to FIG. 15, a description is now given of operations in the terminal data setting system 10 when the screen 1005 is being displayed showing that processing for initial setting for the content distribution system is in progress. The description of operations focuses on the terminal 120 and the device key encryption server 140.

First, the crypto-processing unit unique data transmission unit 406 of the terminal 120 acquires the crypto-processing unit unique data from the crypto-processing unit 104 (S1101), and transmits the acquired crypto-processing unit unique data to the device key encryption server 140 (step S1102).

The crypto-processing unit unique data reception unit 903 of the device key encryption server 140 receives the crypto-processing unit unique data from the terminal 120 (S1102). The unique manufacturer key generation unit 904 extracts the manufacturer key from the manufacturer key storage unit 901 (S1103), and generates a unique manufacturer key from the crypto-processing unit unique data and the manufacturer key (S1104). Next, the device key encryption unit 905 acquires a currently unused device key from the device key storage unit 902 (S1105), and encrypts the device key acquired at S1105 with use of the unique manufacturer key generated at S1104, thereby generating an encrypted device key (S1106). The encrypted device key transmission unit 906 transmits the encrypted device key to the terminal 120 (step S1107).

The encrypted device key reception unit 405 of the terminal 120 receives the encrypted device key transmitted from the device key encryption server 140 (S1107), the encrypted device key writing unit 404 writes the received encrypted device key to the device key storage unit 403 (step S1108).

1.11 Operations when Service is Used

Figure 16:
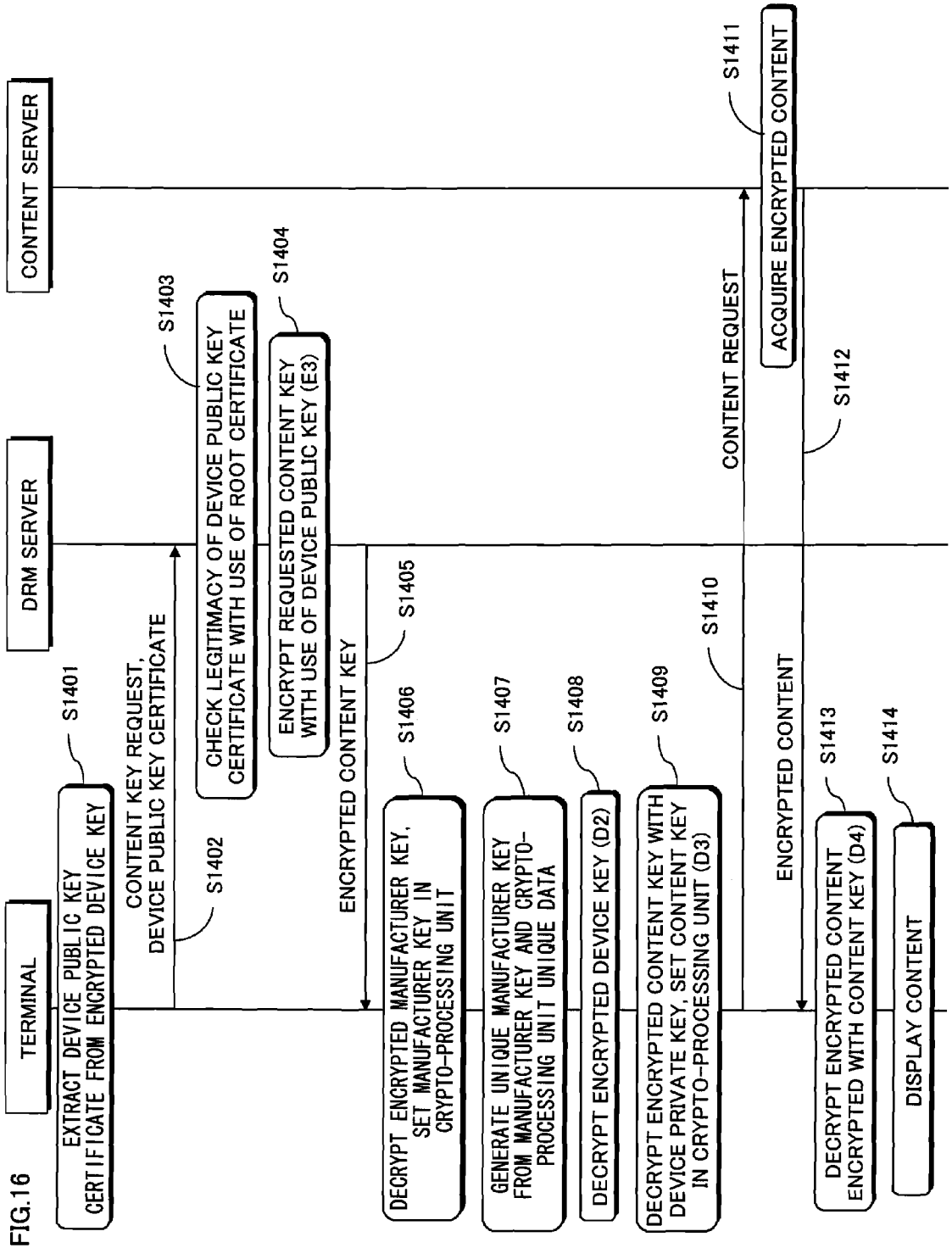
FIG. 16 flowchart showing processing between the terminal 120, the DRM server 150 and the content server 160 during service usage in the first embodiment.

Referring to FIG. 16, a description is now given of operations for when the terminal 120 in which a device key has been set uses the service. The following description focuses on the DRM server 150 and the content server 160.

First, the device public key certificate transmission unit 407 of the terminal 120 extracts the device public key certificate from the device key storage unit (S1401), and transmits the device public key certificate together with a content key request to the DRM server 150 (S1402).

The device public key certificate reception unit 1302 of the DRM server 150 receives the device public key certificate transmitted from the terminal 120 (S1402), and the signature checking unit 1303 checks the legitimacy of the device public key certificate with use of the root certificate extracted from the root certificate storage unit 1301 (S1403). When the device public key certificate is found to be legitimate, the content key selection unit 1305 selects the requested content key from the content key storage unit 1304, and the content key encryption unit 1306 encrypts the content key with use of the device public key included in the device public key certificate, thereby generating an encrypted content key (S1404). The encrypted content key transmission unit 1307 transmits the encrypted content key to the terminal 120 (S1405).

The encrypted content key reception unit 408 of the terminal 120 receives the encrypted content key from the DRM server 150 (S1405). The crypto-processing unit 401 acquires the encrypted manufacturer key from the manufacturer key storage unit 402, and decrypts the acquired manufacturer key, thereby generating a manufacturer key (S1406). The crypto-processing unit 401 generates a unique manufacturer key from the manufacturer key generated by decryption at S1406 and the crypto-processing unit unique data contained in the crypto-processing unit 401 (S1407), and, with use of the unique manufacturer key generated at step S1407, decrypts the encrypted device key acquired from the device key storage unit 403 (S1408). Next, with use of the device private key contained in the device key generated by the decryption at S1408, the crypto-processing unit 401 decrypts the encrypted content key received by the encrypted content key reception unit 408 (S1409). The terminal 120 then transmits a content request to the content server 160 (S1410).

The content server 160 receives the content request (S1410), acquires encrypted content corresponding to the received content request (S1411), and transmits, to the terminal 120, the encrypted content corresponding to the content request transmitted from the terminal 120 (S1412).

The encrypted content reception unit 409 of the terminal 120 receives the encrypted content (S1412), and the crypto-processing unit 401 decrypts the received encrypted content with use of the content key generated by the decryption at S1409 (S1413). The content generated as a result of the decryption is displayed on a content display unit (S1414).

It should be noted that the DRM method described here is simply one example, and another method such as an authentication method or a key sharing method may be used.

As had been described, according to the present embodiment, a different device key can be set for each terminal by the service user performing the setting via a network. This eliminates the need for the terminal manufacturing system to set different information in each terminal, and enables terminals to be manufactured efficiently.

Furthermore, by using manufacturer keys generated by respective manufacturers, manufacturer's secrets can be maintained without differing the design of the crypto-processing unit between manufacturers.

Furthermore, due to the structure whereby the manufacturer key and the encryption processing unique data can be composited inside the crypto-processing unit, and the crypto-processing unit unique data can be sent to the key setting server that shares the manufacturer keys, there is no need for information regarding each individual terminal to be administered in the key setting server. This reduces the load for running the key setting server.

Furthermore, since it is sufficient for the crypto-processing unit unique data to be tamper-resistant and unique, administration information or the like used in administering production of the crypto-processing unit may double as the crypto-processing unit data. Therefore, the crypto-processing unit can be obtained even more cost-effectively.

It should be noted that although the terminal manufacturing system 110 and the device key encryption server 140 are recited as separate structures in the present embodiment, if the terminal manufacturer and the key setter are the same entity, an alternative structure shown in FIG. 1 may be employed. In this alternative structure, a device key encryption system 7 (enclosed with a broken line in FIG. 1) is composed of the terminal manufacturing system 110 and the device key encryption server 140.

2. Second Embodiment

The following describes a terminal data setting system 10a (not illustrated) as a second embodiment of the present invention with reference to the drawings.

The terminal data setting system 10a has a similar structure to the terminal data setting system 10 of the first embodiment, but has a terminal 1500 and a terminal manufacturing system 1800 instead of the terminal 120 and the terminal manufacturing system 110. The following description focuses on aspects of the terminal data setting system 10a that differ from the terminal data setting system 10.

2.1 Terminal Manufacturing System 1800

The terminal data setting system 10a has the terminal manufacturing system 1800 instead of the terminal manufacturing system 110. The terminal manufacturing system 1800 is an example of a modification of the terminal manufacturing system 110.

Figure 17:
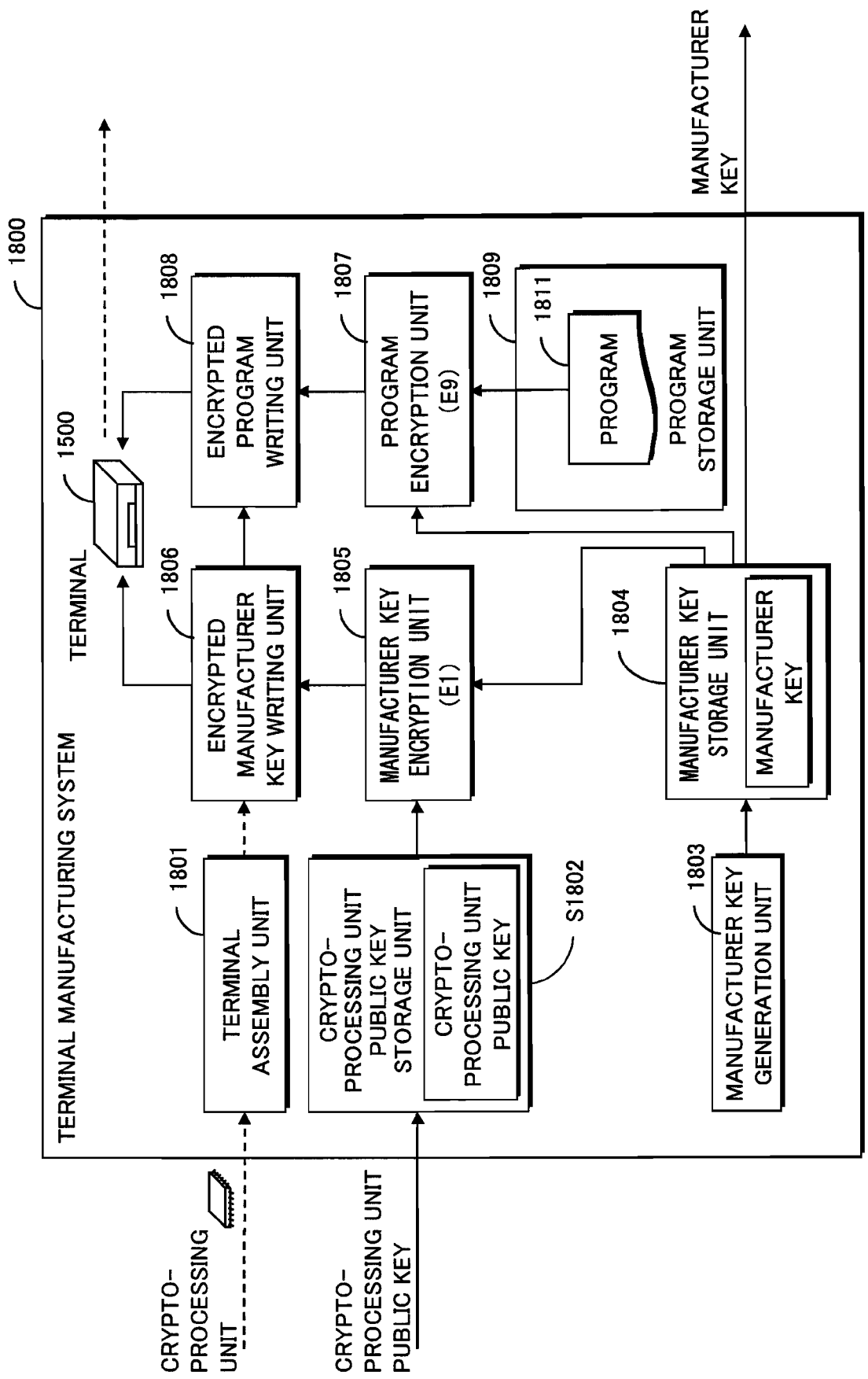
FIG. 17 is a structural diagram of a terminal manufacturing system 1800 in a second embodiment.

FIG. 17 is a structural diagram of the terminal manufacturing system 1800 that manufactures the terminal 1500. The terminal manufacturing system 1800 is composed of a terminal assembly unit 1801, a crypto-processing unit public key storage unit 1802, a manufacturer key generation unit 1803, a manufacturer key storage unit 1804, a manufacturer key encryption unit 1805, manufacturer key writing unit 1806, a program encryption unit 1807, an encrypted program writing unit 1808, and a program storage unit 1809.

The terminal assembly unit 1801, in the same manner as the terminal assembly unit 701, installs a crypto-processing unit 1501 (described later) acquired from the semiconductor manufacturer 1, to assemble the terminal 1500.

The crypto-processing unit public key storage unit 1802, in the same manner as the crypto-processing unit public key storage unit 702, stores a crypto-processing unit public key acquired from the semiconductor manufacturer 1.

The manufacturer key generation unit 1803, in the same manner as the manufacturer key generation unit 703, generates a manufacturer key that is known only to the terminal manufacturer 3 and the key setter. The method used to generate the manufacturer key may be a publicly known method, such as generating a random number.

The manufacturer key storage unit 1804, in the same manner as the manufacturer key storage unit 704, stores the manufacturer key generated by the manufacturer key generation unit 1803.

The manufacturer key encryption unit 1805, in the same manner as the manufacturer key encryption unit 705, encrypts the manufacturer key stored in the manufacturer key storage unit 1804, with use of the crypto-processing unit public key stored by the crypto-processing unit public key storage unit 1802, thereby generating an encrypted manufacturer key.

The manufacturer key writing unit 1806, in the same manner as the encrypted manufacturer key writing unit 706, writes the encrypted manufacturer key generated by the manufacturer key encryption unit 1805 to the manufacturer key storage unit 402 of the terminal 1500. It should be noted that since the encrypted manufacturer key is common to the plurality of terminals 1500 assembled by the terminal assembly unit 1801, it is suitable to prepare a plurality of manufacturer key storage units 402 in which the encrypted manufacturer key has been written in advance, and then the terminal assembly unit 1801 may install a manufacturer key storage unit 402 to assemble each terminal 1500.

Figure 18:
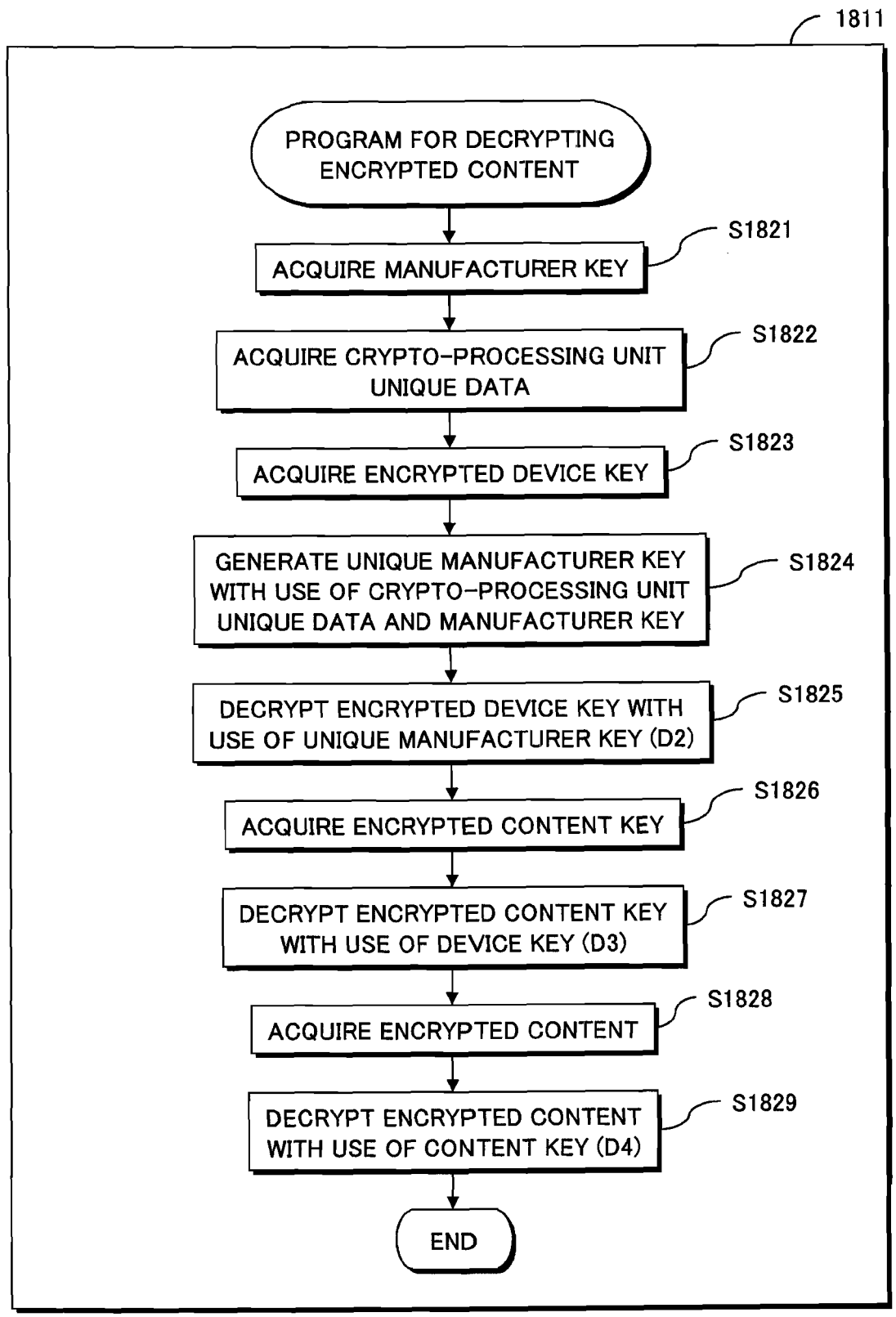
FIG. 18 is a structural diagram of a program for decrypting encrypted content in the second embodiment.

The program storage unit 1809 stores therein in advance a program 1811 reciting operations expected by a program processing unit 1618 of the crypto-processing unit 1501. The contents of the program 1811 are described with use of the flowchart in FIG. 18. The program 1811, as shown in FIG. 18, is composed of instructions S1812 to S1829. The program 1811 is for decrypting encrypted content, and is composed of the following instructions: an instruction for acquiring a manufacturer key (S1821), an instruction for acquiring a crypto-processing unit unique data (S1822), an instruction for acquiring an encrypted device key (S1823), an instruction for generating a unique manufacturer key with use of the crypto-processing unit unique data and the manufacturer key (S1824), an instruction for decrypting an encrypted device key with use of a unique manufacturer key according to a decryption algorithm D2 (S1825), an instruction for acquiring an encrypted content key (S1826), an instruction for decrypting the encrypted content key with use of the device key, according to the decryption algorithm D3 (S1827), an instruction for acquiring encrypted content (S1828), and an instruction for decrypting the encrypted content key with use of the content key in accordance with the decryption algorithm D4 (S1829).

The program encryption unit 1807 reads the program 1811 from the program storage unit 1809, and encrypts read program 1811 with use of the manufacturer key generated by the manufacturer key generation unit 1803, according to an encryption algorithm E9 of a secret key cryptosystem, thereby generating an encrypted program, and outputs the generated encrypted program to the encrypted program writing unit 1808.

The encrypted program writing unit 1808 receives the encrypted program from the program encryption unit 1807, and writes the received encrypted program to a program storage unit 1511 of the terminal 1500. It should be noted that since the encrypted program is common to the plurality of terminals 1500 assembled by the terminal assembly unit 1801, it is suitable to prepare a plurality of program storage units 1511 in which the encrypted program has been written in advance, and then the terminal assembly unit 1801 may install a program storage unit 1511, to assemble each terminal 1500. The effort required by the terminal assembly unit 1801 to assemble the terminal 1500 can be further reduced if the manufacturer key storage unit 402 of the terminal 1500 described later and the program storage unit 1511 are the same, single storage device.

2.2 Terminal 1500

The terminal data setting system 10a has the terminal 1500 instead of the terminal 120, the terminal 1500 being an example of a modification corresponding to the terminal 120.

Figure 19:
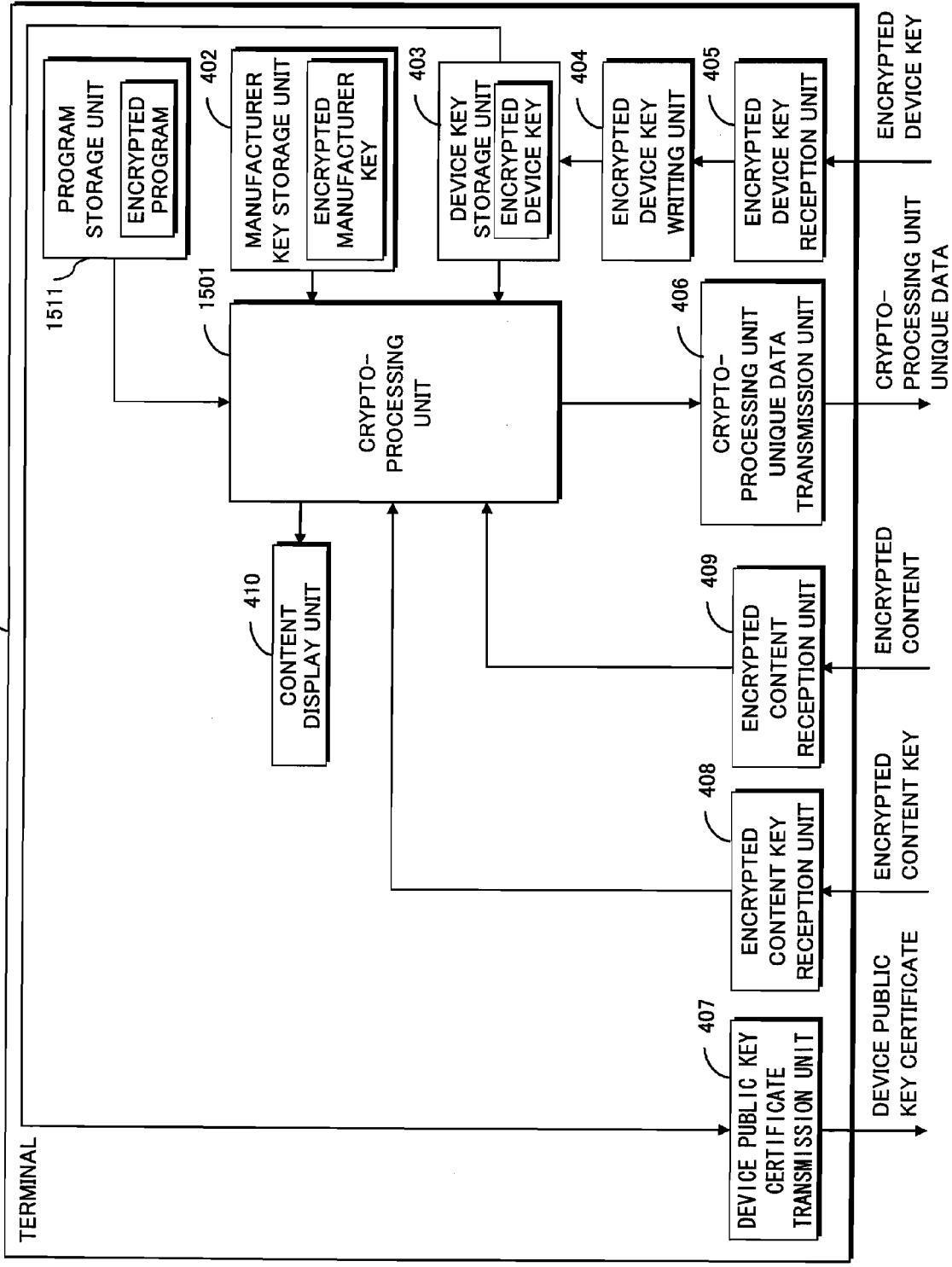
FIG. 19 is a structural diagram of a terminal 1500 in the second embodiment.

FIG. 19 is a structural diagram of the terminal 1500. The terminal 1500 is composed of the crypto-processing unit 1501, the manufacturer key storage unit 402, the device key storage unit 403, the encrypted device key writing unit 404, the encrypted device key reception unit 405, the crypto-processing unit unique data transmission unit 406, the device public key certificate transmission unit 407, the encrypted content key reception unit 408, the encrypted content reception unit 409, the content display unit 410, and the program storage unit 1511.

Figure 20:
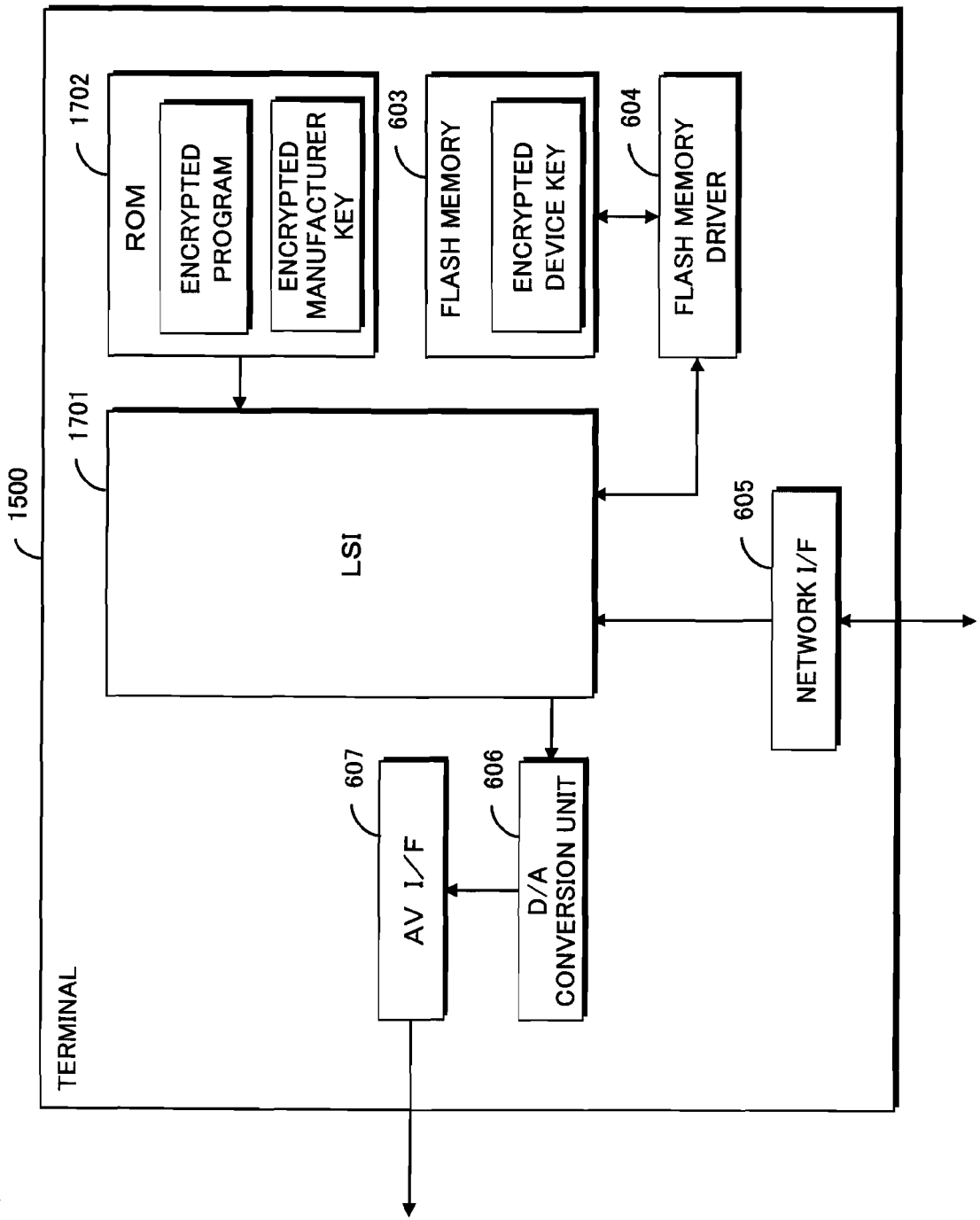
FIG. 20 is a physical structural diagram of the terminal 1500 in the second embodiment.

FIG. 20 shows one embodiment of the structure of the terminal 1500. In FIG. 20, the terminal 1500 is composed of an LSI 1701, the ROM 602 that is a read-only storage area, the flash memory 603 that is a readable and writable storage area, the flash memory driver 604 that controls reading and writing from and to the flash memory 603, the network I/F 605, the D/A conversion unit 606 that converts a digital signal output from the LSI 601 into an analog signal, and the AV I/F 607 that outputs the analog signal output from the D/A conversion unit 606 to a display device (not illustrated).

The following describes the compositional elements of the terminal 1500, with the exception of those that are the same as compositional elements of the terminal 120.

The crypto-processing unit 1501 performs encryption processing in a manner that the encryption processing is difficult to monitor from outside, and has embedded therein crypto-processing unit unique data that is unique to the crypto-processing unit 1501. The crypto-processing unit 1501 is typically implemented as the LSI 1701 of FIG. 20.

The program storage unit 1511 stores an encrypted program generated by the terminal manufacturing system 1800 described later encrypting the program with use of the manufacturer key. The encrypted program is data shared by a plurality of terminal 1500. Since the encrypted program is set in the terminals 1500 at the stage of manufacturing the terminals 1500 in the terminal manufacturing system 1800, the program storage unit 1511 is typically implemented as the ROM 1702 of FIG. 20.

2.3 Crypto-Processing Unit 1501

Figure 21:
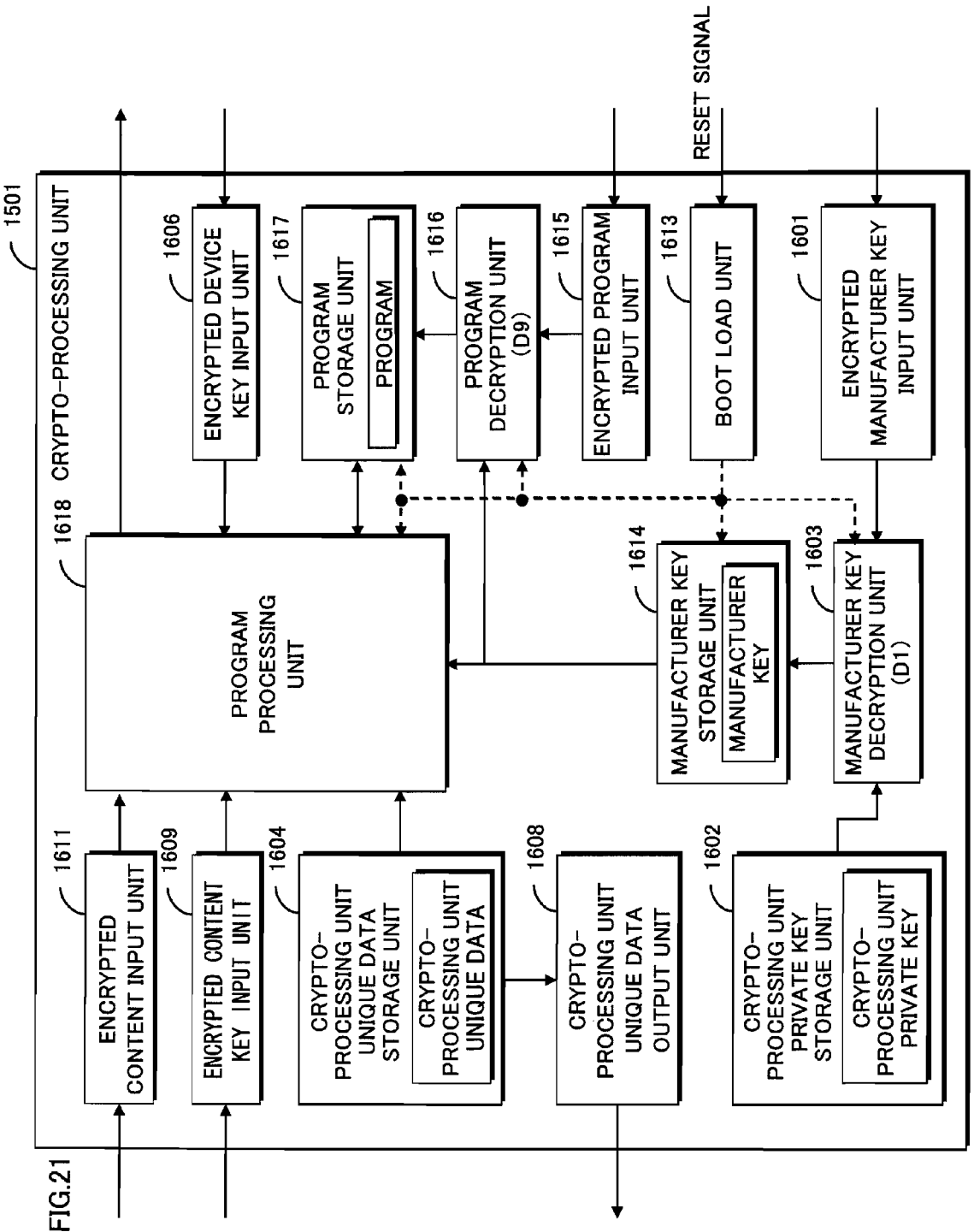
FIG. 21 is a structural diagram of a crypto-processing unit 1501 in the second embodiment.

FIG. 21 is a structural diagram of the crypto-processing unit 1501. The crypto-processing unit 1501 is an example of a modification corresponding to the crypto-processing unit 401. The crypto-processing unit 1501 is composed of an encryption manufacturer key input unit 1601, a crypto-processing unit private key storage unit 1602, a manufacturer key decryption unit 1603, a crypto-processing unit unique data storage unit 1604, an encryption device key input unit 1606, a crypto-processing unit unique data output unit 1608, an encrypted content key input unit 1609, an encrypted content input unit 1611, a boot load unit 1613, a manufacturer key storage unit 1614, an encrypted program input unit 1615, a program decryption unit 1616, a program storage unit 1617, and a program processing unit 1618.

The encrypted manufacturer key input unit 1601 reads the encrypted manufacturer key from the manufacturer key storage unit 402, and outputs the read encrypted manufacturer key to the manufacturer key decryption unit 1603.

The crypto-processing unit private key storage unit 1602 stores the crypto-processing unit private key known only to the semiconductor manufacturer 1, in a state in which it is difficult to observe the crypto-processing unit private key from outside. Since the crypto-processing unit private key does not have to be changed and does not have to be unique, the crypto-processing unit private key is stored in a write-only ROM.

The manufacturer key decryption unit 1603 operates according to an instruction from the boot load unit 1613. The manufacturing key decryption unit 1603 receives the encrypted manufacturer key from the encrypted manufacturer key input unit 1601, and decrypts the received encrypted manufacturer key with use of the crypto-processing unit private key stored in the crypto-processing unit private key storage unit 1602, thereby generating a manufacturer key, and sets the generated manufacturer key in the manufacturer key storage unit 1614.

The crypto-processing unit unique data storage unit 1604 stores the crypto-processing unit unique data unique to the crypto-processing unit 1501, in a manner that the crypto-processing unit unique data is difficult to tamper with. The crypto-processing unit unique data is stored using a commonly known method, such as being written to a non-volatile storage area in the crypto-processing unit 1501, or as a chip-ID automatically generated based on a physical individual difference. Alternatively, an ID or the like given to the crypto-processing unit 1501 for the purpose of yield management in the semiconductor manufacturing process may be used to double as the crypto-processing unit unique data, as long as this ID or the like is unique to the crypto-processing unit 1501.

The encrypted device key input unit 1606 reads the encrypted device key from the device key storage unit 403, and outputs the read encrypted device key to the program processing unit 618.

The crypto-processing unit unique data output unit 1608 outputs the crypto-processing unit unique data stored in the crypto-processing unit unique data storage unit 1604 to a destination external to the crypto-processing unit 1501.

The encrypted content key input unit 1609 receives the encrypted content key from the encrypted content key reception unit 408, and outputs the received encrypted content key to the program processing unit 1618.

The encrypted content input unit 1611 receives the encrypted content from the encrypted content reception unit 409, and outputs the received encrypted content to the program processing unit 1618.

The boot load unit 1613 operates in accordance with a reset signal input into the crypto-processing unit 1501 by the terminal 1500. Upon receiving the reset signal, the boot load unit 1613 deletes the storage content of the manufacturer key storage unit 1614 and the program storage unit 1617, then instructs the manufacturer key decryption unit 1503 to decrypt the encrypted manufacturer key, then instructs the program decryption unit 1616 to decrypt the encrypted program, and finally, instructs the program processing unit 1618 to start processing from the start address of the program stored in the program storage unit 1617.

The manufacturer key storage unit 1614 stores the manufacturer key generated as a result of the decryption by the manufacturer key decryption unit 1603, in a state in which it is difficult to monitor the manufacturer key from outside.

The encrypted program input unit 1615 reads the encrypted program from the program storage unit 1511, and outputs the read encrypted program to the program decryption unit 1616.

The program decryption unit 1616 operates in accordance with an instruction from the boot load unit 1613. The program decryption unit 1616 receives an encrypted program from the encrypted program input unit 1615, decrypts the received encrypted program according to a decryption algorithm D9, with use of the manufacturer key stored in the manufacturer key storage unit 1614, and writes the generated program to the program storage unit 1617.

The program storage unit 1617 stores therein the program generated by the decrypting by the program decryption unit 1616, in a state in which it is difficult to monitor the program from outside.

The program processing unit 1618 operates in accordance with the program stored in the program storage unit 1617. Functions equivalent to those of the first embodiment are achieved by the following processing being recited in the program. (1) The manufacturer key stored in the manufacturer key storage unit 1614 and the crypto-processing unit unique data stored in the crypto-processing unit unique data storage unit 1604 are composited, thereby generating a unique manufacturer key. (2) The encrypted device key input from the encrypted device key input unit 1606 is decrypted with use of the unique manufacturer key generated at (1). (3) The encrypted content key input from the encrypted content key input unit 1609 is decrypted with use of the device key generated at (2), thereby generating a content key. (4) The encrypted content input from the encrypted content input unit 1611 is decrypted with use of the content key generated at (3), thereby generating content, and the generated content is output to a destination external of the crypto-processing unit 1501.

2.4 Operations of the Terminal 1500 During Booting

Figure 22:
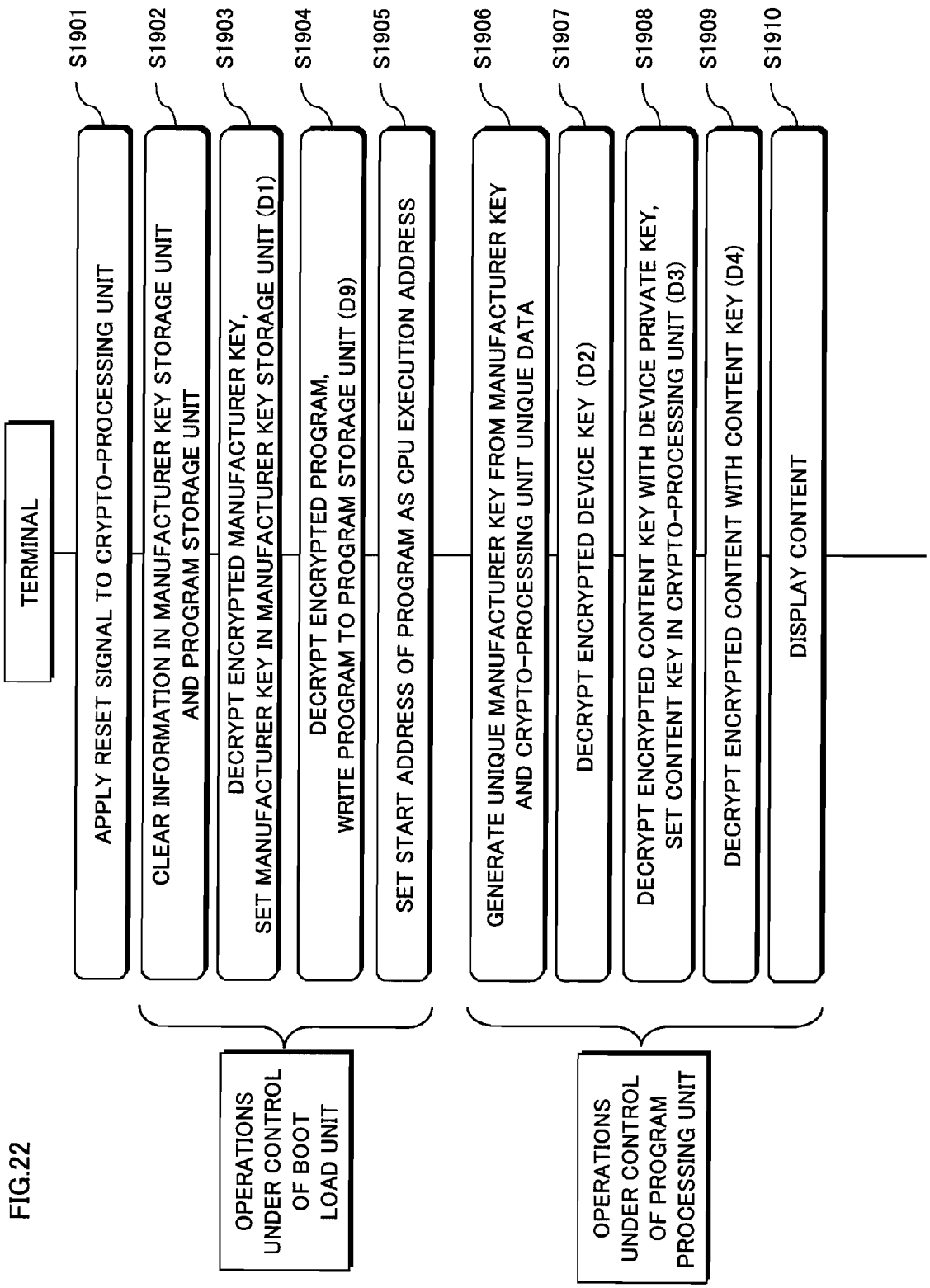
FIG. 22 is a flowchart showing processing from terminal booting through to content display in the second embodiment.

Operations for when the terminal 1500 in which the device key has been set uses a service are now described with reference to the flowchart shown in FIG. 22.

Upon the terminal 1500 being activated by the user, the terminal 1500 outputs a reset signal to the crypto-processing unit 1501 (S1901).

Upon receiving the reset signal, the boot load unit 1613 deletes the storage contents of the manufacturer key storage unit 1614 and the program storage unit 1617 (S1902).

Next, the boot load unit 1613 instructs the manufacturer key decryption unit 1503 to decrypt the encrypted manufacturer key. The manufacturer key decryption unit 1603 decrypts the encrypted manufacturer key received from the encrypted manufacturer key input unit 1601, with use of the crypto-processing unit private key storage unit 1602, according to the decryption algorithm D1, thereby generating a manufacturer key. The manufacturer key decryption unit 1603 writes the generated manufacturer key to the manufacturer key storage unit 1614 (S1903).

Next, the boot load unit 1613 instructs the program decryption unit 1616 to decrypt the encrypted program. The program decryption unit 1616 decrypts the encrypted program received from the encrypted program input unit 1615, with use of the manufacturer key stored in the manufacturer key storage unit 1614, according to the decryption algorithm D9, thereby generating a program. The program decryption unit 1616 writes the generated program to the program storage unit 1617 (S1904).

The boot load unit 1613 instructs the program processing unit 1618 to start processing from the start address of the program stored in the program storage unit 1617 (S1905).

The program processing unit 1618 composites the manufacturer key stored in the manufacturer key storage unit 1614 and the crypto-processing unit unique data stored in the crypto-processing unit unique data storage unit 1604 (S1906).

The program processing unit 1618 decrypts the encrypted device key input from the encrypted device key input unit 1606, with use of the unique manufacturer key generated at S1906, thereby generating a device key (S1907).

The program processing unit 1618 decrypts the content key received from the encrypted content key input unit 1609, according to the decryption algorithm D3, with use of the device key generated at S1907, thereby generating a content key (S1908).

The program processing unit 1618 decrypts the encrypted content received from the encrypted content input unit 1611, according to the decryption algorithm D4, with use of the content key generated at S1908, thereby generating content, and outputs the generated content to a destination external to the crypto-processing unit 1501 (S1909).

Lastly, the content display unit 410 displays, on a display device (not illustrated), a digital signal expressing the content output by the crypto-processing unit 1501 (S1910).

2.5 Conclusion

In addition to the effects obtained in the first embodiment, the present embodiment enables a program to be decrypted inside the crypto-processing unit by only the manufacturer key used in encrypting the device key. Since the device key cannot be used by another terminal manufacturer's program, the processing content of the crypto-processing unit can be realized securely with a rewritable program. As a result, the crypto-processing unit can be achieved at even lower cost, without the crypto-processing unit being limited to a specific purpose.

3. Third Embodiment

The following describes a terminal data setting system 10b (not illustrated) as a third embodiment of the present invention with reference to the drawings.

Figure 23:
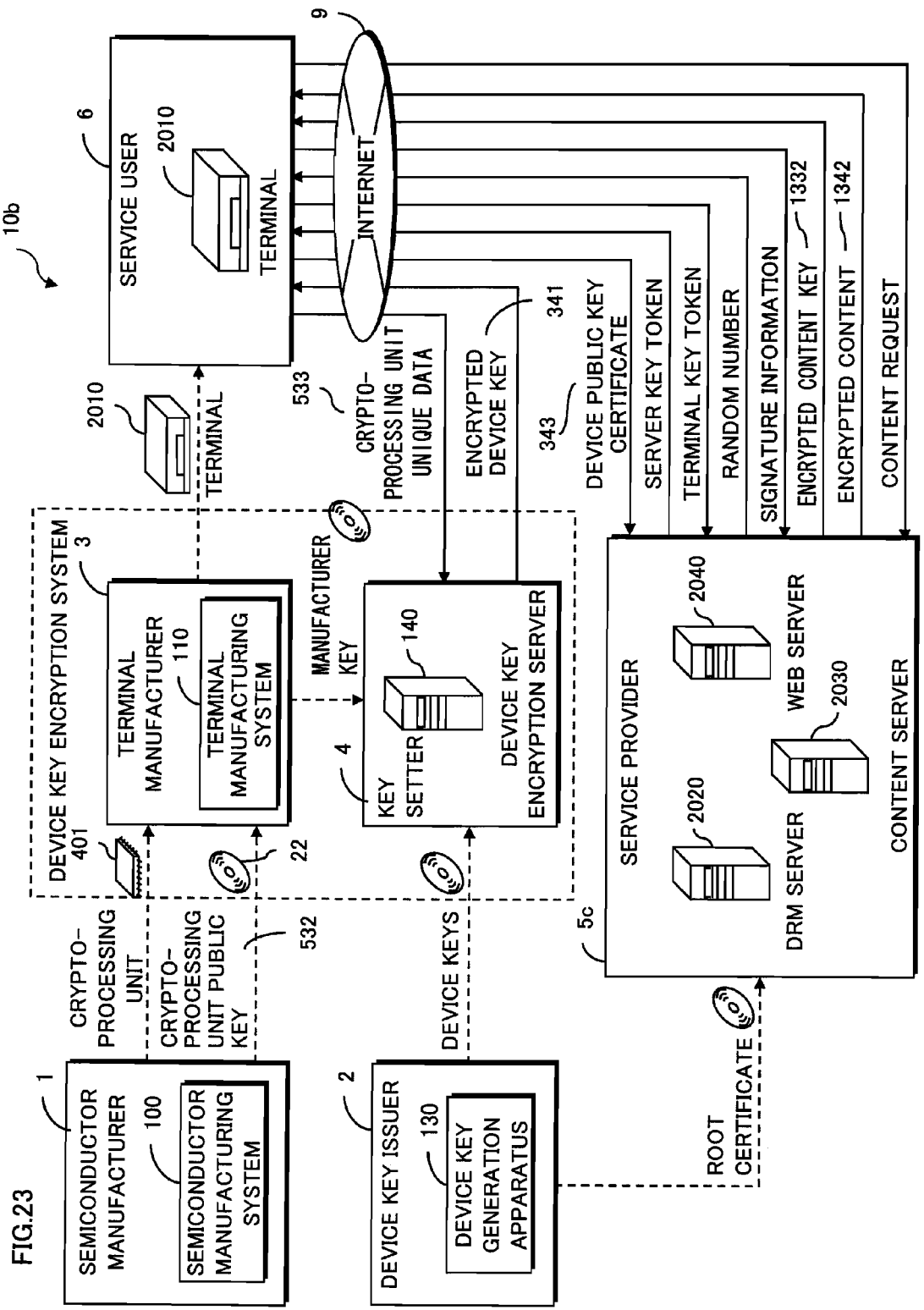
FIG. 23 is an overall structural diagram of a terminal data setting system 10b in a third embodiment.

The terminal data setting system 10b, as shown in FIG. 23, has a similar structure to the terminal data setting system 10, but the terminal data setting system 10b has a terminal 2010, a DRM server 2020, a content server 2030 and a web server 2040 instead of the terminal 120, the DRM server 150 and the content server 160. The following description focuses on aspects of the terminal data setting system 10b that differ from the terminal data setting system 10.

Figure 24:
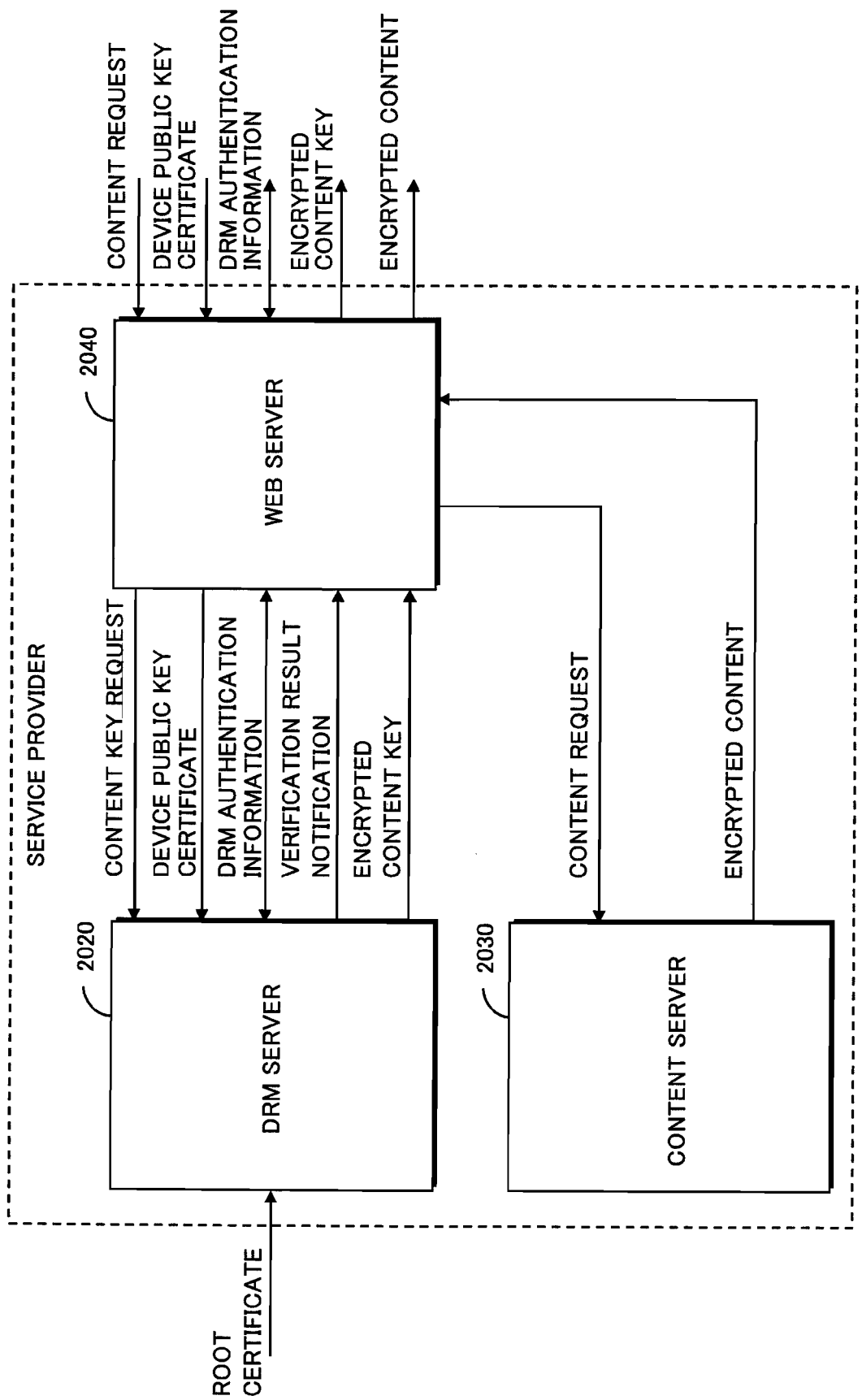
FIG. 24 is a structural diagram of service provider server in the third embodiment.

As shown in FIG. 24, the DRM server 2020 is connected to the web server 2040, and the content server 2030 is also connected to the web server 2040. The web server 2040 is also connected to the terminal 2010 via the Internet 9.

3.1 Terminal 2010

Figure 25:
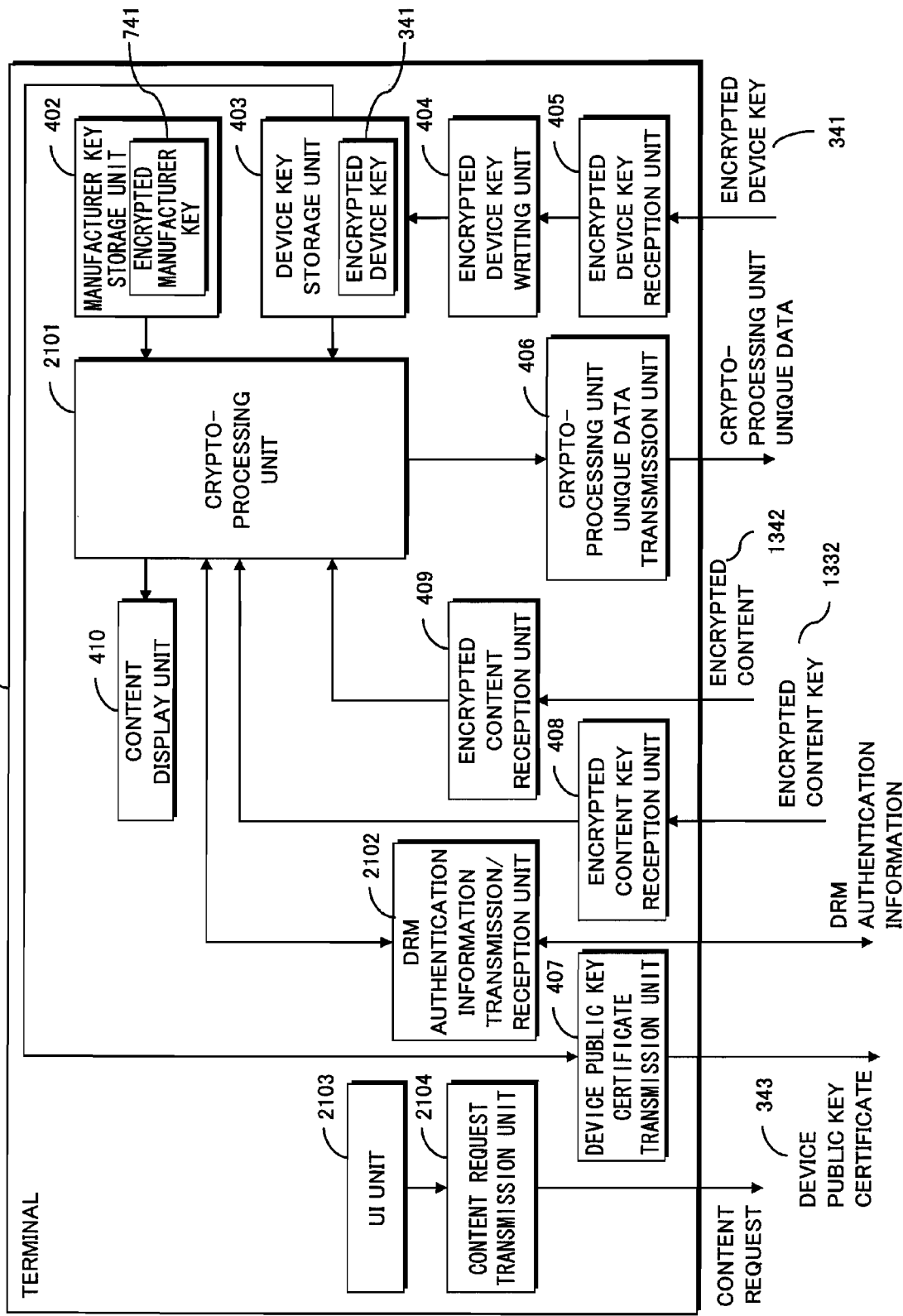
FIG. 25 is a structural diagram of a terminal 2010 in the third embodiment.

FIG. 25 is a structural diagram of the terminal 2010. The terminal 2010 is composed of a crypto-processing unit 2101, the manufacturer key storage unit 402, the device key storage unit 403, the encrypted device key writing unit 404, the encrypted device key reception unit 405, the crypto-processing unit unique data transmission unit 406, the device public key certificate transmission unit 407, the encrypted content key reception unit 408, the encrypted content reception unit 409, the content display unit 410, a DRM authentication information transmission/reception unit 2102, a UI unit 2103, and a content request transmission unit 2104.

Of the stated compositional elements of the terminal 2010, the manufacturer key storage unit 402, the device key storage unit 403, the encrypted device key writing unit 404, the encrypted device key reception unit 405, the crypto-processing unit unique data transmission unit 406, the device public key certificate transmission unit 407, the encrypted content key reception unit 408, the encrypted content reception unit 409, and the content display unit 410 are the same as in the terminal 120 of the terminal data setting system 10 of the first embodiment, and therefore descriptions thereof are omitted here.

The UI unit 2103 receives an operation from a user to designate content, and outputs an acquisition request for the designated content to the content request transmission unit 2104.

The content request transmission unit 2104 receives the acquisition request for the content from the UI unit 2103, and transmits the content request to the web server 2040 via the Internet 9.

The DRM authentication information transmission/reception unit 2102 transmits and receives DRM authentication information between the web server 2040 and the crypto-processing unit 2101 via the Internet 9.

The following described details of the crypto-processing unit 2101.

3.2 Crypto-Processing Unit 2101

Figure 26:
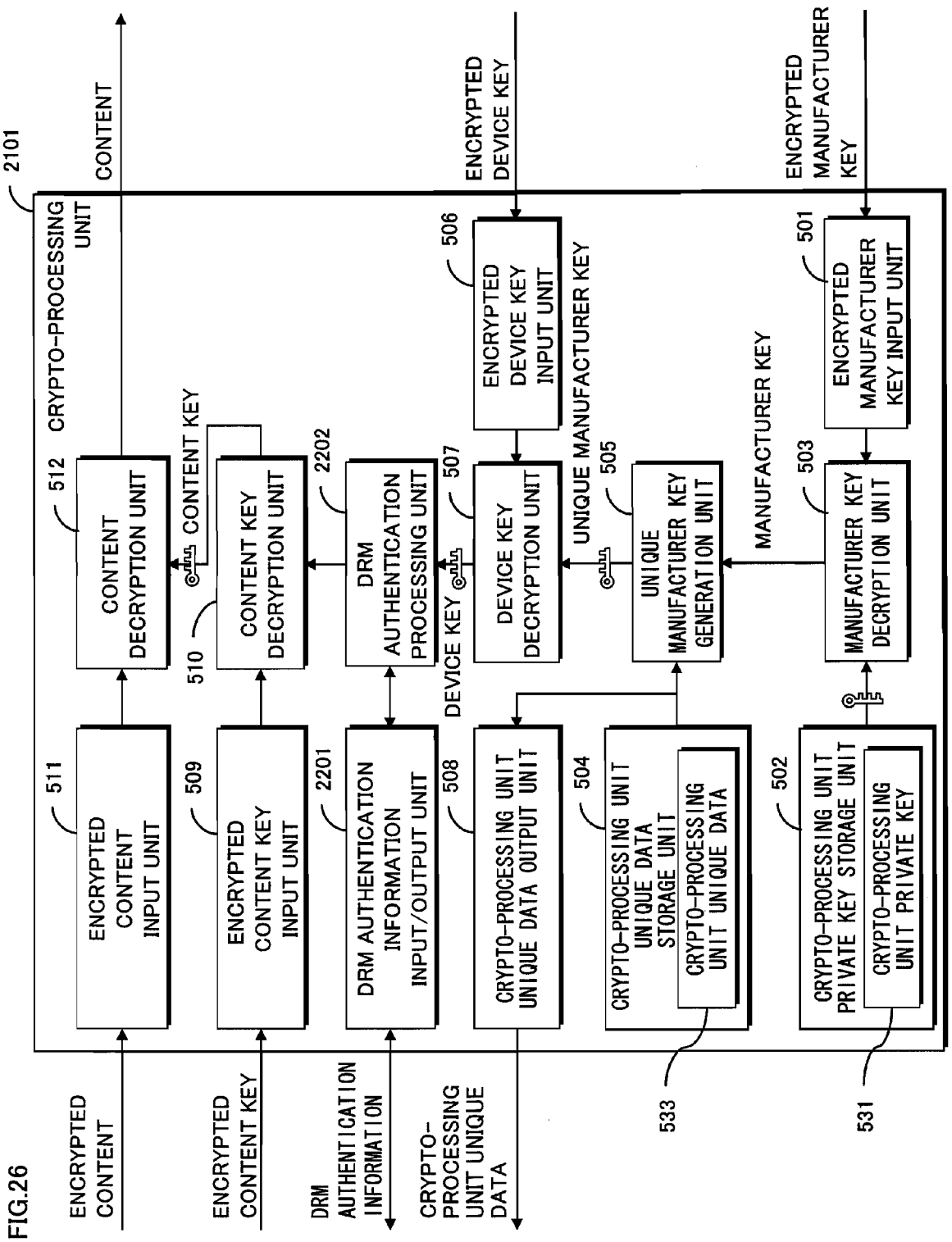
FIG. 26 is a structural diagram of a crypto-processing unit 2101 in the third embodiment.

The crypto-processing unit 2101, as shown in FIG. 26, is composed of the encryption manufacturer key input unit 501, the crypto-processing unit private key storage unit 502, the manufacturer key decryption unit 503, the crypto-processing unit unique data storage unit 504, the unique manufacturer key generation unit 505, the encrypted device key input unit 506, the device key decryption unit 507, the crypto-processing unit unique data output unit 508, the encrypted content key input unit 509, the content key decryption unit 510, an encrypted content input unit 511, the content decryption unit 512, a DRM authentication information input/output unit 2201, and a DRM authentication processing unit 2202.

Of the compositional elements of the crypto-processing unit 2101, the encryption manufacturer key input unit 501, the crypto-processing unit private key storage unit 502, the manufacturer key decryption unit 503, the crypto-processing unit unique data storage unit 504, the unique manufacturer key generation unit 505, the encrypted device key input unit 506, the device key decryption unit 507, the crypto-processing unit unique data output unit 508, the encrypted content key input unit 509, the content key decryption unit 510, the encrypted content input unit 511, and the content decryption unit 512 are the same as in the crypto-processing unit 401, and therefore a description thereof is omitted here.

The DRM authentication information input/output unit 2201 receives/transmits DRM authentication information between the DRM authentication processing unit 2202 and the DRM server 2020 via the DRM authentication information transmission/reception unit 2102, the Internet 9, and the web server 2040.

Details of the DRM authentication processing unit 2202 are as follows.

When authentication by the DRM authentication processing unit succeeds, the content key decryption unit 510 receives a session key from the DRM authentication processing unit. The content key decryption unit 510 decrypts the encrypted content key with use of the received session key, instead of a device private key, thereby generating a content key.

3.3 DRM Authentication Processing Unit 2202

Figure 27:
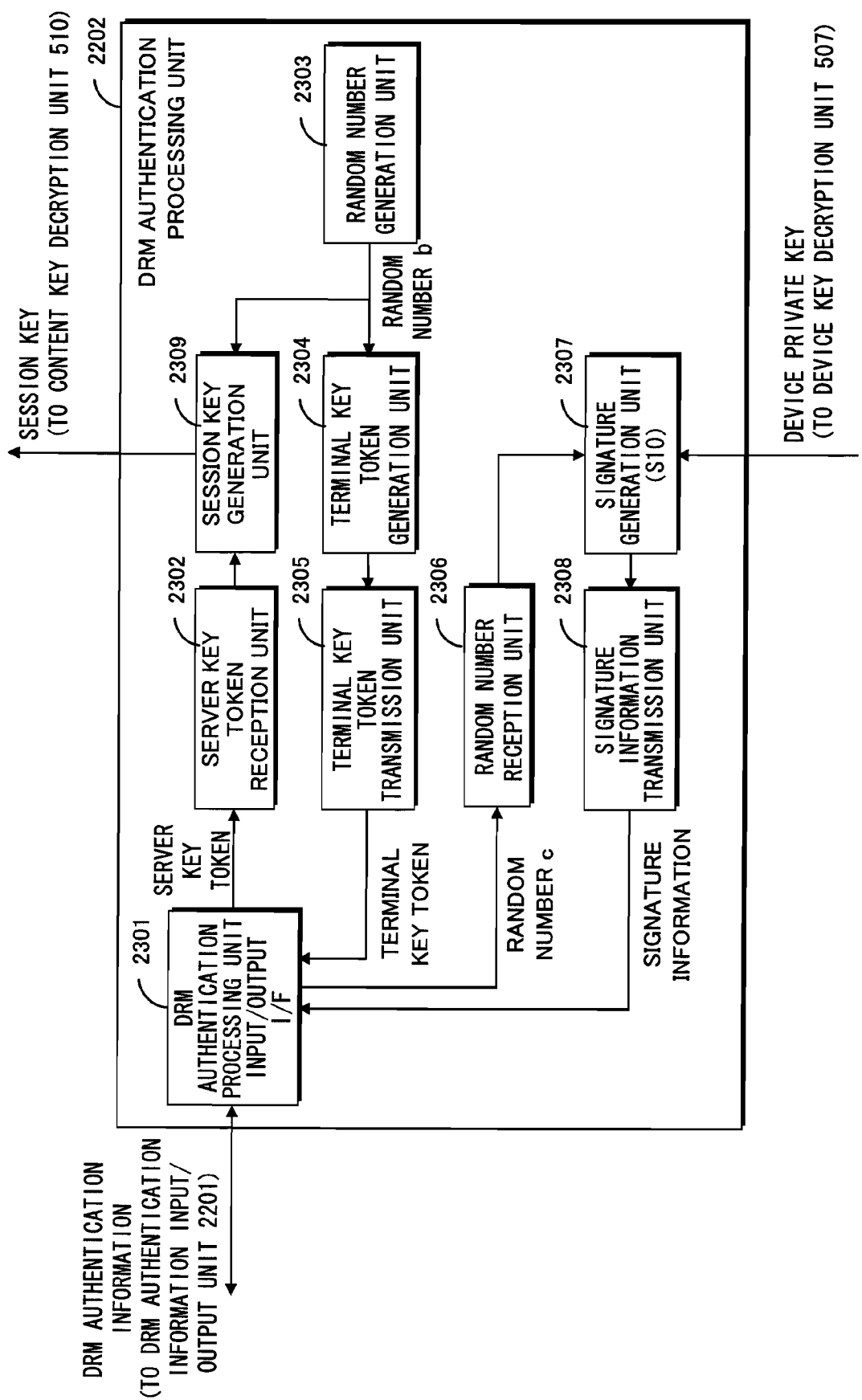
FIG. 27 is a structural diagram of a DRM authentication processing unit 2202 in the third embodiment.

The DRM authentication processing unit 2202, as shown in FIG. 27, is composed of a DRM authentication processing unit input/output I/F 2301, a server key token reception unit 2303, a random number generation unit 2303, a terminal key token generation unit 2304, a terminal key token transmission unit 2305, a random number reception unit 2306, a signature generation unit 2307, a signature information transmission unit 2308, and a session key generation unit 2309.

The random number generation unit 2303 generates a random number b, and outputs the generated random number b to the terminal key token generation unit 2304. The random number generation unit 2303 also outputs the generated random number b to the session key generation unit 2309. The random number b is a large integer.

The terminal key token generation unit 2304 receives the random number b from the random number generation unit 2303, and using the received random number b, calculates terminal key token Y=g^b mod n.

Here, n is a large prime, and g is an integer.

Furthermore, g^b shows an operation of raising g to the b-th power. As one example, g^3 denotes raising g to the third power.

The terminal key token generation unit 2304 transmits the calculated terminal key token Y to the DRM server 2020 via the terminal key token transmission unit 2305, the DRM authentication processing unit input/output I/F 2301, the DRM authentication information input/output unit 2201, the DRM authentication information transmission/reception unit 2102, the Internet 9, and the web server 2040.

The signature generation unit 2307 receives a random number c from the DRM server 2020 via the Internet 9, the DRM authentication information transmission/reception unit 2102, the DRM authentication information input/output unit 2201, the DRM authentication processing unit input/output I/F 2301, and the random number reception unit 2306. The signature generation unit 2307 also receives the device key from the device key decryption unit 507. The signature generation unit 2307 then generates signature information for the received random number c, according to a digital signature generation algorithm S10 with use of the device key. The signature generation unit 2307 transmits the generated signature information to the DRM server 2020 via the signature information transmission unit 2308, the DRM authentication processing input/output I/F 2301, the DRM authentication information input/output unit 2201, the DRM authentication information transmission/reception unit 2102, the Internet 9, and the web server 2040.

The session key generation unit 2309 receives the random number b from the random number generation unit 2303, and receives a server token X (described later) from the DRM server 2020, via the web server 2040, the Internet 9, the DRM authentication information transmission/reception unit 2102, the DRM authentication information input/output unit 2201, the DRM authentication processing unit input/output I/F 2301, and the server key token reception unit 2302. Using the received random number b and server key token X, the session key generation unit 2309 calculates session key k'=X^b mod n.

The session key generation unit 2309 then outputs the calculated session key k' to the content key decryption unit 510.

The server key token reception unit 2302 receives the server key token X.

The terminal key token transmission unit 2305 transmits the terminal key token Y.

The random number reception unit 2306 receives the random number c.

The signature information transmission unit 2308 transmits the signature information.

The DRM authentication processing unit input/output I/F 2301 transmits and receives DRM authentication information. The DRM authentication information is the server key token X, the terminal key token Y, the random number c, and the signature information.

3.4 DRM Server 2020

Figure 28:
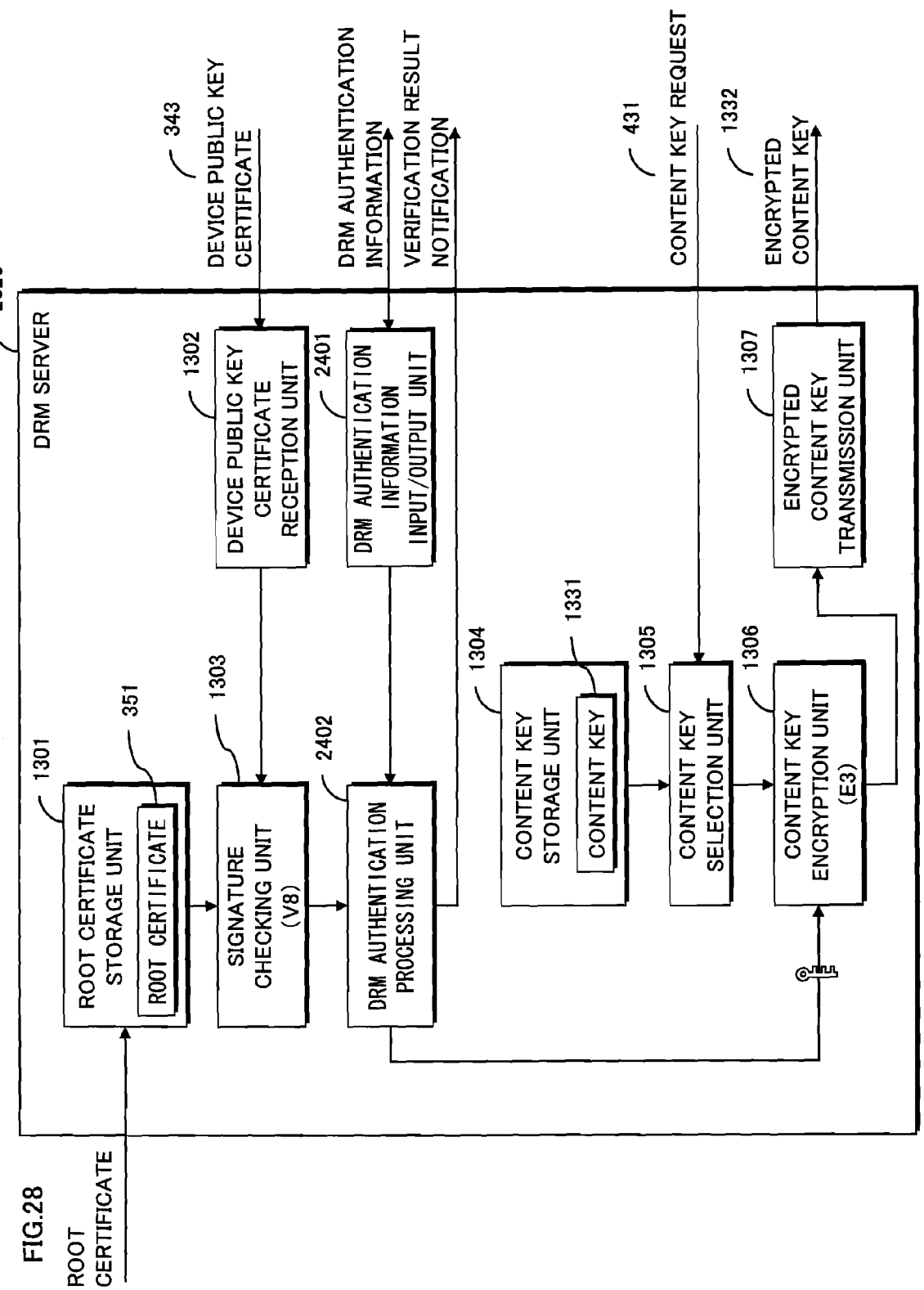
FIG. 28 is a structural diagram of a DRM server 2020 in the third embodiment.

FIG. 28 is a structural diagram of the DRM server 2020. The DRM server 2020 has a similar structure to the DRM server 150, and, as shown in FIG. 28, is composed of the root certificate storage unit 1301, the device public key certificate reception unit 1302, the signature checking unit 1303, the content key storage unit 1304, the content key selection unit 1305, the content key encryption unit 1306, the encrypted content key transmission unit 1307, a DRM authentication processing unit 2402, and a DRM authentication information input/output unit 2401. The DRM server 2020 is, specifically, a computer system composed of a microprocessor, a ROM, a RAM, a hard disk unit, and the like.

Of the compositional elements of the DRM server 2020, the root certificate storage unit 1301, the device public key certificate reception unit 1302, the signature checking unit 1303, the content key storage unit 1304, the content key selection unit 1305, the content key encryption unit 1306, and the encrypted content key transmission unit 1307 are the same as in the DRM server 150, and therefore descriptions of these are omitted here. The following description focuses on aspects of the DRM server 2020 that differ from the DRM server 150.

The content key encryption unit 1306 receives a session key from the DRM authentication processing unit 2402, and encrypts the content key received from the content key selection unit 1305, according to the encryption algorithm E3 with use of the received session key, thereby generating an encrypted content key. The content key encryption unit 1306 outputs the generated encrypted content key to the encrypted content key transmission unit 1307.

The DRM authentication information input/output unit 2401 transmits and receives DRM authentication information between the terminal 2010 and the DRM authentication processing unit 2402, via the Internet 9 and the web server 2040.

Figure 29:
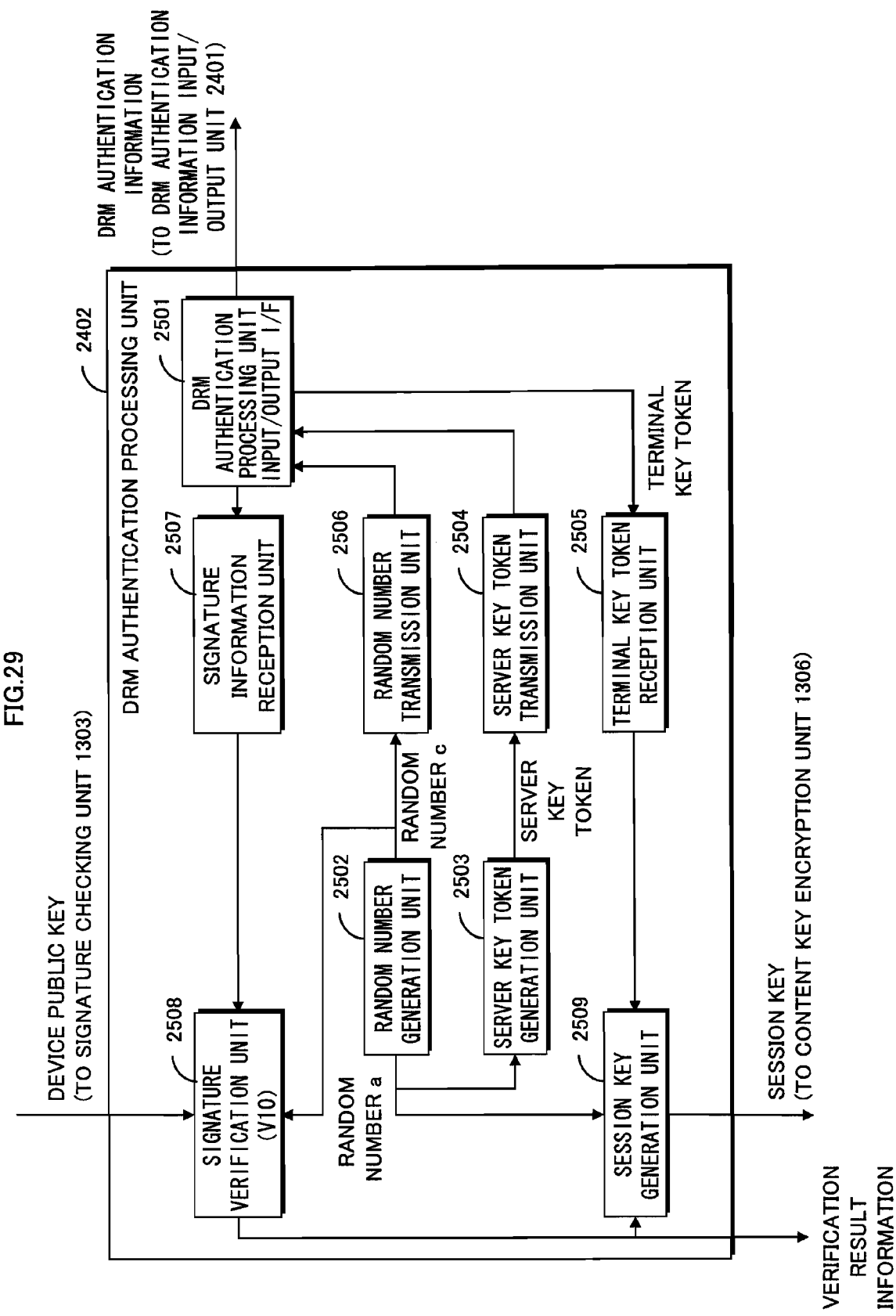
FIG. 29 is a structural diagram of a DRM authentication processing unit 2402 in the third embodiment.

The DRM authentication processing unit 2402, as shown in FIG. 29, is composed of a DRM authentication processing unit input/output I/F 2501, a random number generation unit 2502, a server key token generation unit 2503, a sever key token transmission unit 2504, a terminal key token reception unit 2505, a random number transmission unit 2506, a signature information reception unit 2507, a signature verification unit 2508, and a session key generation unit 2509.

The random number generation unit 2502 generates a random number a, and outputs the generated random number a to server key token generation unit 2503. Here, the random number generation unit 2502 also outputs the generated random number a to the session key generation unit 2509. The random number a is a large integer. The random number generation unit 2502 generates a random number c, and outputs the generated random number c to the signature verification unit 2508. The random number generation unit 2502 also outputs the generated random number c to the terminal 2010 via the random number transmission unit 2506, the DRM authentication processing unit input/output I/F 2501, the DRM authentication information input/output unit 2401, the web server 2040, and the Internet 9.

The server key token generation unit 2503 receives the random number a from the random number generation unit 2502, and using the received random number a, calculates server key token X=g^a mod n.

Here, n is a large prime, and g is an integer.

Next, the server key token generation unit 2503 transmits the calculated server key token X to the terminal 2010, via the server key token transmission unit 2504, the DRM authentication processing unit input/output I/F 2501, the DRM authentication information input/output unit 2401, the web server 2040, and the Internet 9.

The signature verification unit 2508 receives the device public key from the signature checking unit 1303, receives the random number c from the random number generation unit 2502, and receives the signature information from the terminal 2010 via the Internet 9, the web server 2040, the DRM authentication information input/output unit 2401, and the DRM authentication processing unit input/output I/F 2501. The signature verification unit 2508 attempts to verify the received signature information with use of the device public key and random number c, according to the digital signature verification algorithm V10. If the verification is successful, the signature verification unit 2508 outputs success information showing that the verification was successful, to the session key generation unit 2509, and sends the success information to the web server 2040. If the verification fails, the signature verification unit 2508 sends failure information showing failure to the web server 2040, and stops subsequent processing.

The session key generation unit 2309 receives the random number a from the random number generation unit 2502, and receives the terminal key token Y from the terminal 2010 via the Internet 9, the web server 2040, the DRM authentication information input/output unit 2401, the DRM authentication processing input/output I/F 2501, and the terminal key token reception unit 2505. Upon receiving the success information from the signature verification unit 2508, the session key generation unit 2309 calculates, with use of the random number a and the server key token Y, $$\text{session key } k = Y\verb|^|a \bmod n.$$

The signature verification unit 2508 outputs the calculated session key k to the content key encryption unit 1306.

The terminal token reception unit 2505 receives the terminal key token Y.

The server key token transmission unit 2504 transmits the server key token X.

The random number transmission unit 2506 transmits the random number c.

The signature information reception unit 2507 receives the signature information.

The DRM authentication processing input/output I/F 2501 transmits and receives DRM authentication information. The DEM authentication information is the server key token X, the terminal key token Y, the random number c and the signature information.

It should be noted that $$\begin{aligned} \text{session key } k &= Y^\wedge a \bmod n \\ &= (g^\wedge b)^\wedge a \bmod n \\ &= g^\wedge(a\cdot b) \bmod n, \text{ and} \end{aligned}$$

$$\begin{aligned} \text{session key } k' &= X^\wedge b \bmod n \\ &= (g^\wedge a)^\wedge b \bmod n \\ &= g^\wedge(a\cdot b) \bmod n. \end{aligned}$$

Therefore, session key $k$ = session key $k'$.

3.5 Content Server 2030

Figure 30:
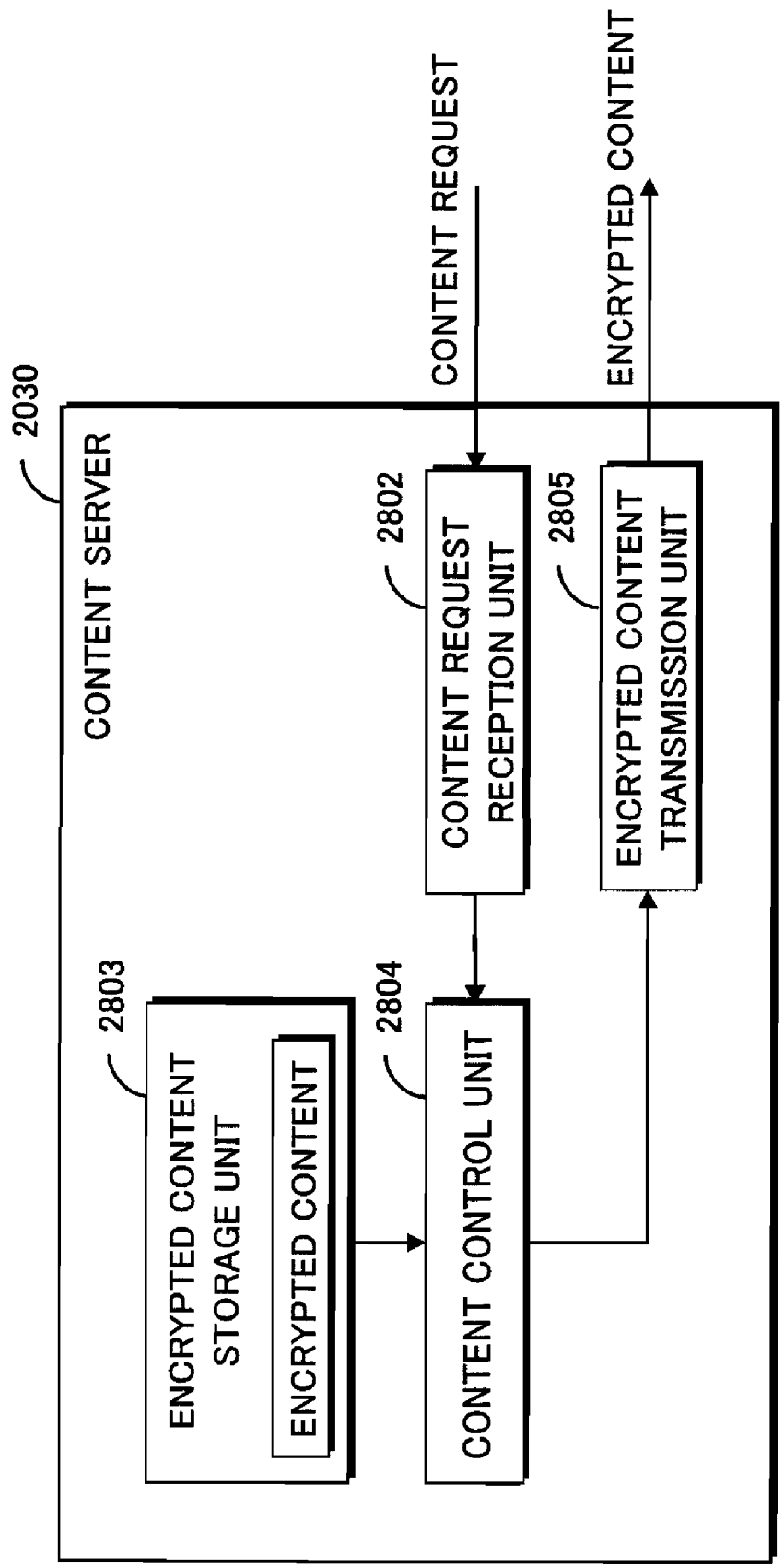
FIG. 30 is a structural diagram of content server 2030 in the third embodiment.

FIG. 30 is a structural diagram of a content server 2030. The content server 2030 has a similar structure to the content server 160. As shown in FIG. 30, the content server 2030 is composed of a content request reception unit 2802, an encrypted content storage unit 2803, a content control unit 2804, and an encrypted content transmission unit 2805. The content server 2030 is, specifically, a computer system composed of a microprocessor, a ROM, a RAM, a hard disk unit, and the like.

Please note, that a description of the compositional elements of the content server 2030 is omitted.

3.6 Web Server 2040

Figure 31:
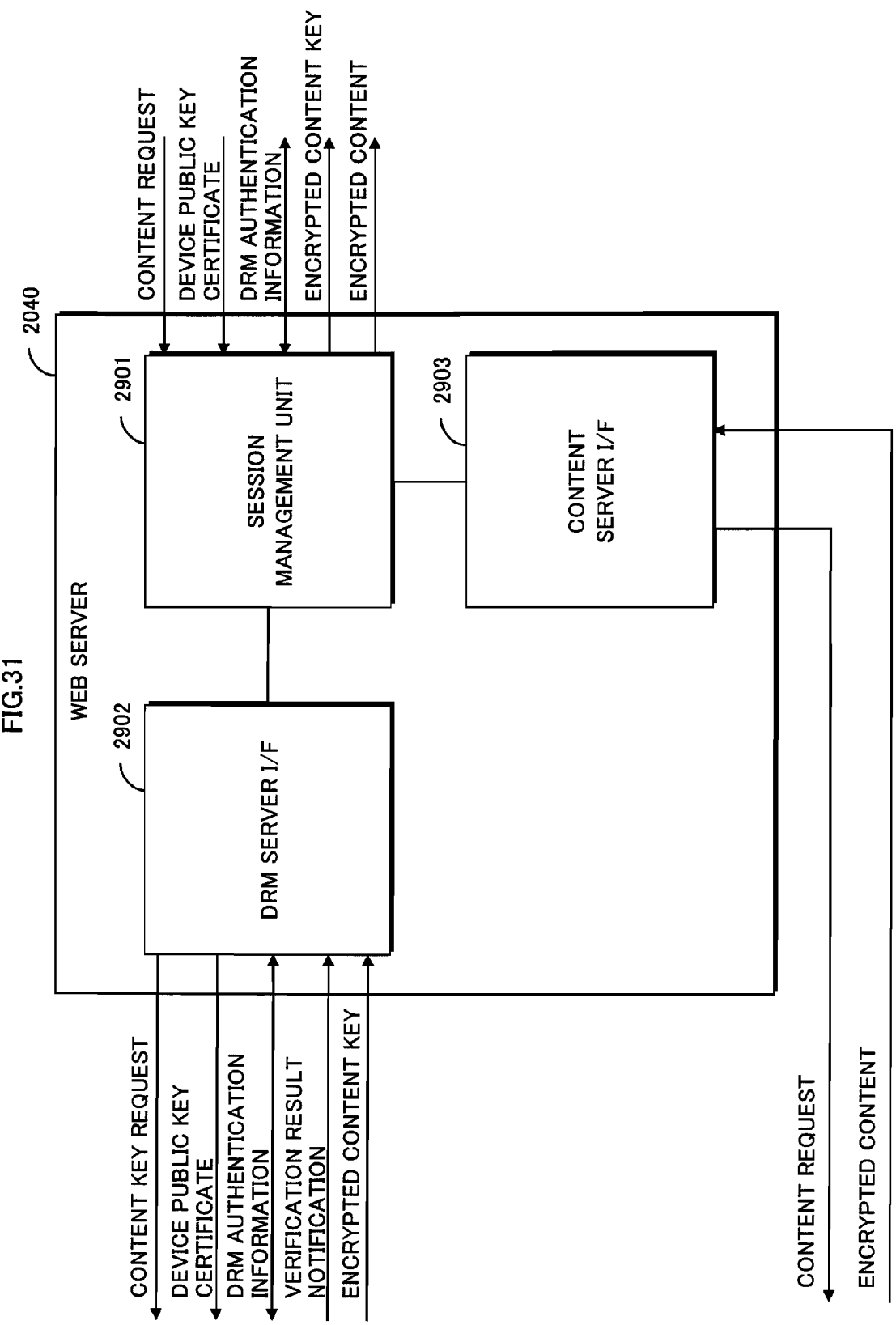
FIG. 31 is a structural diagram of a web server 2040 in the third embodiment.

FIG. 31 is a structural diagram of the web server 2040. The web server 2040 is, as shown in FIG. 31, composed of a session management unit 2901, a content server I/F 2903, and a DRM server I/F 2902. The session management unit 2901 is connected to the content server I/F 2903 and the DRM server I/F 2902, and is also connected to the terminal 2010 via the Internet 9. The content server I/F 2903 is connected to the content server 2030, and the DRM server I/F 2902 is connected to the DRM server 2020. The web server 2040 is, specifically, a computer system composed of a microprocessor, a ROM, a RAM, a hard disk unit, and the like.

The session management unit 2901 receives a content request from the terminal 2010, and transmits the received content request to the content server 2030 via the content server I/F 2903. Upon receiving the content request, the session management unit 2901 further generates a content key request, and transmits the generated content key request to the DRM server 2020 via the DRM server I/F 2902. Furthermore, the session management unit 2901 receives a device public key certificate from the terminal 2010, and transmits the received device public key certificate to the DRM server 2020 via the DRM server I/F 2902.

Furthermore, the session management unit 2901 receives the DRM authentication information from the terminal 201, and transmits the received DRM authentication information to the DRM server 2020 via the DRM server 2902. Furthermore, the session management unit 2901 receives the DRM authentication information from the DRM server 2020 via the DRM I/F 2902, and transmits the received DRM authentication information to the terminal 2010 via the Internet 9.

In addition, the session management unit 2901 receives the encrypted session key from the DRM server 2020 via the DRM server I/F 2902, and transmits the received encrypted content key to the terminal 2010 via the Internet 9. The session management unit 2901 also receives the encrypted content from the content server 2030 via the content server I/F 2903, and transmits the received encrypted content to the terminal 2010 via the Internet 9.

The DRM server I/F 2902 relays the transmission and reception of information between the DRM server 2020 and the session management unit 2901.

The content server I/F 2903 relays the transmission and reception of information between the content server 2030 and the session management unit 2901.

3.7 Operations in the Terminal Data Setting System 10*b*

Figure 32:
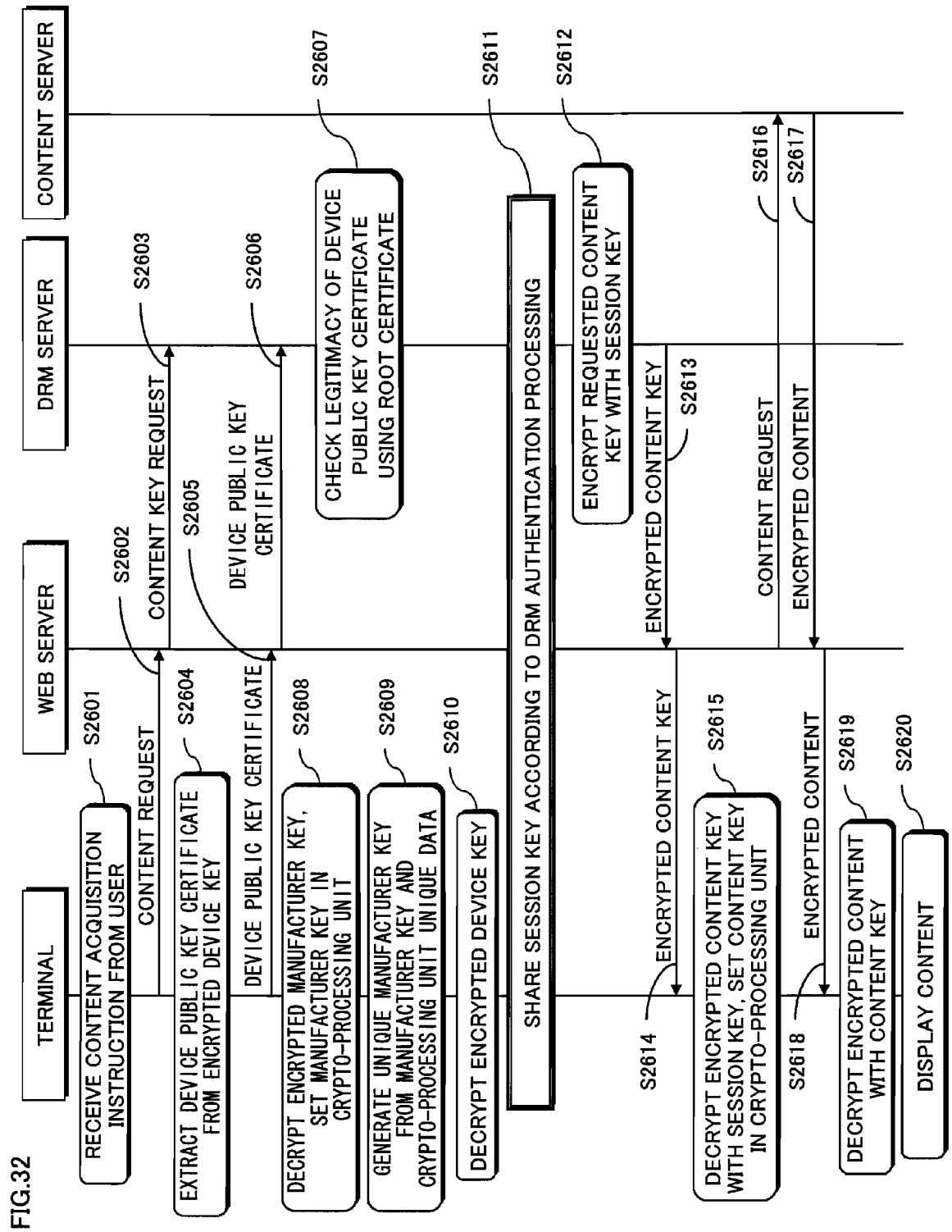
FIG. 32 is a flowchart showing processing between a terminal and a server during service usage in the third embodiment.

The following describes the operations in the terminal data setting system 10*b* with reference to the flowchart shown in FIG. 32.

Upon receiving a content acquisition instruction from the user (step S2601), the terminal 2010 transmits a content request to the web server 2040 (step S2602), and the web server 2040 transmits the content key request to the DRM server 2020 (step S2603).

The terminal 2010 extracts the device public key certificate from the encrypted device key (step S2604), and transmits the extracted device public key certificate to the web server 2040 (step S2605). The web server 2040 transmits the device public key certificate to the DRM server 2020 (step S2606). The DRM server 2020 checks the legitimacy of the received device public key certificate with use of the root certificate (step S2607). When the device public key certificate is found to not be authentic, the web server 2040 stops subsequent processing.

The terminal 2010 decrypts the encrypted manufacturer key and sets the resultant manufacturer key in the crypto-processing unit 2011 (step S2608), generates a unique manufacturer key from the manufacturer key and the crypto-processing unit unique data (step S2609), and decrypts the encrypted device key with use of the unique manufacturer key (step S2610).

The terminal 2010 and the DRM server 2020 share a session key according to DRM authentication processing (step S2611). Details of the session key sharing are given later.

The DRM server 2020 encrypts the requested content key with use of the session key (step S2612), and returns the encrypted content key to the web server 2040 (step S2613). The web server 2040 transmits the encrypted content key to the terminal 2010 (step S2614).

The terminal 2010 decrypts the encrypted content key with use of the session key, and sets the generated content key in the crypto-processing unit 2101 (step S2615).

The web server 2040 transmits the content request to the content server 2030 (step S2616). The content server 2030 transmits encrypted content request according to the content request to the web server 2040 (step S2617). The web server 2040 transmits the encrypted content to the terminal 2010 (step S2618).

The terminal 2010 decrypts the encrypted content with use of the encrypted content key (step S2619); and displays the content (step S2620).

(Session Key Sharing According to DRM Authentication Processing)

Session key sharing according to DRM authentication processing between the terminal 2010 and the DRM server 2020 is described with reference to the flowchart shown in FIG. 33.

The DRM server 2020 generates a random number a, generates a server key token from the generated random number a (step S2701), and transmits the generated server key token to the terminal 2010 via the web server 2040 (step S2702).

The terminal 2010 generates a random number b, generates a terminal key token from the generated random number b (step S2703), and transmits the generated terminal key token to the DRM server 2020 via the web sever 2040 (step S2704).

The DRM server 2020 generates a random number c (step S2705), and transmits the generated random number c to the terminal 2010 via the web server 2040 (step S2706).

The terminal 2010 generates signature information for the received random number c with use of the device private key (step S2707), and transmits the generated signature information to the DRM server 2020 via the web server 2040 (step S2708).

The DRM server 2020 attempts to verify the received signature information with use of the device public key and the random number c (step S2709). If the verification fails (NO at step S2710), the DRM server 2020 sends notification to that effect to the web server 2040, and stops subsequent processing. If verification succeeds (YES at step S2710), the DRM server 2020 generates a session key with use of the random number a and the terminal key token (step S2712).

The terminal 2010 generates a session key with use of the random number b and the server key token (step S2713).

4. Modification Examples

Although the present invention has been described based on the above embodiments, the present invention is not limited to the above embodiments. Cases such as the following are included in the present invention.

Figure 34:
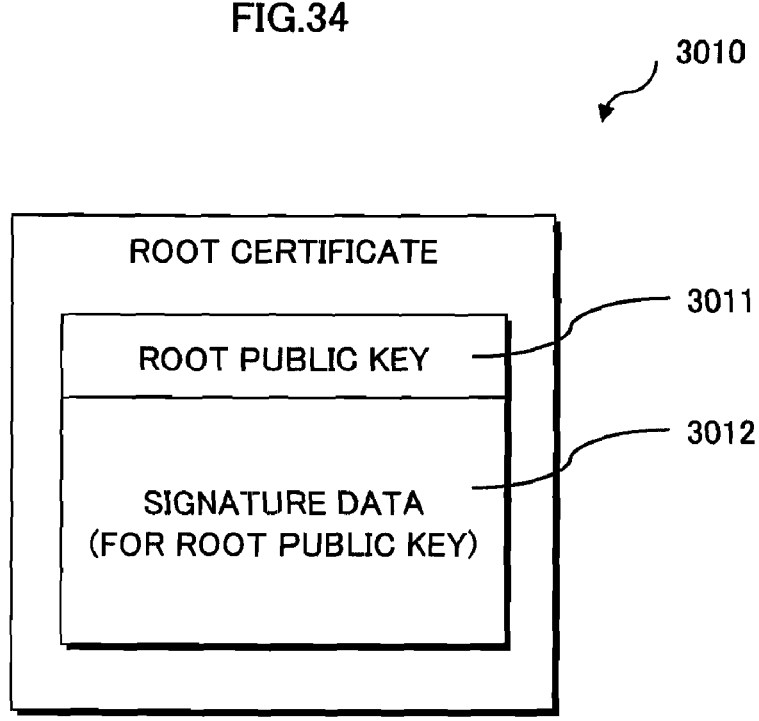
FIG. 34 shows the data structure of a root certificate 3010 as a modification example.
Figure 35:
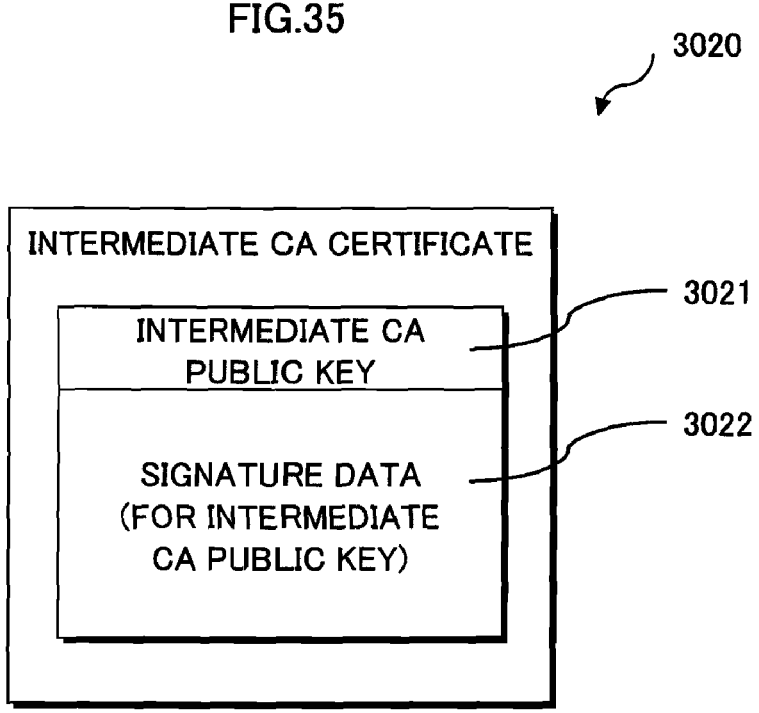
FIG. 35 shows the data structure of an intermediate CA certificate 3020 as a modification example.
Figure 36:
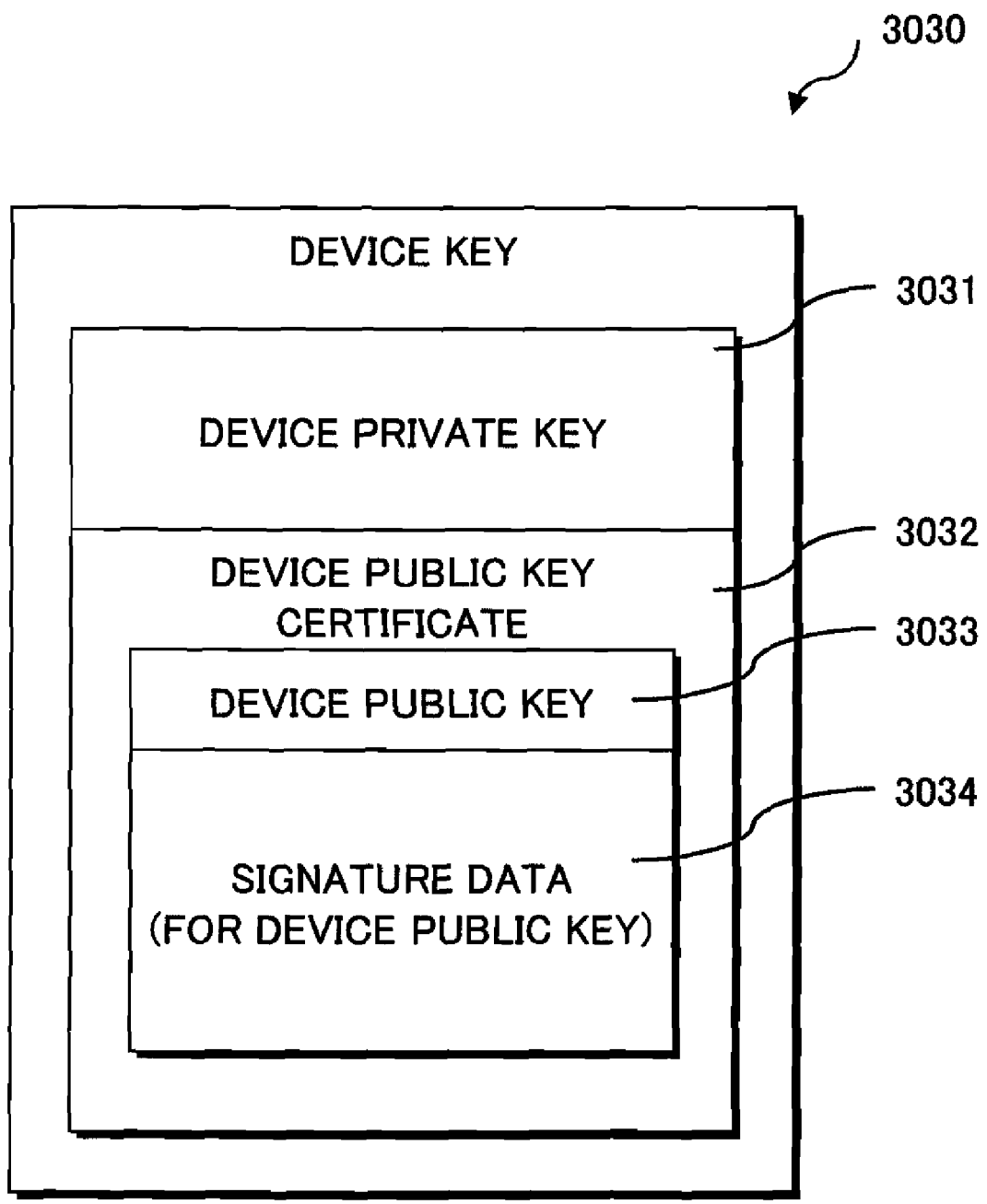
FIG. 36 shows the data structure of a device key 3030 as a modification example.
Figure 37:
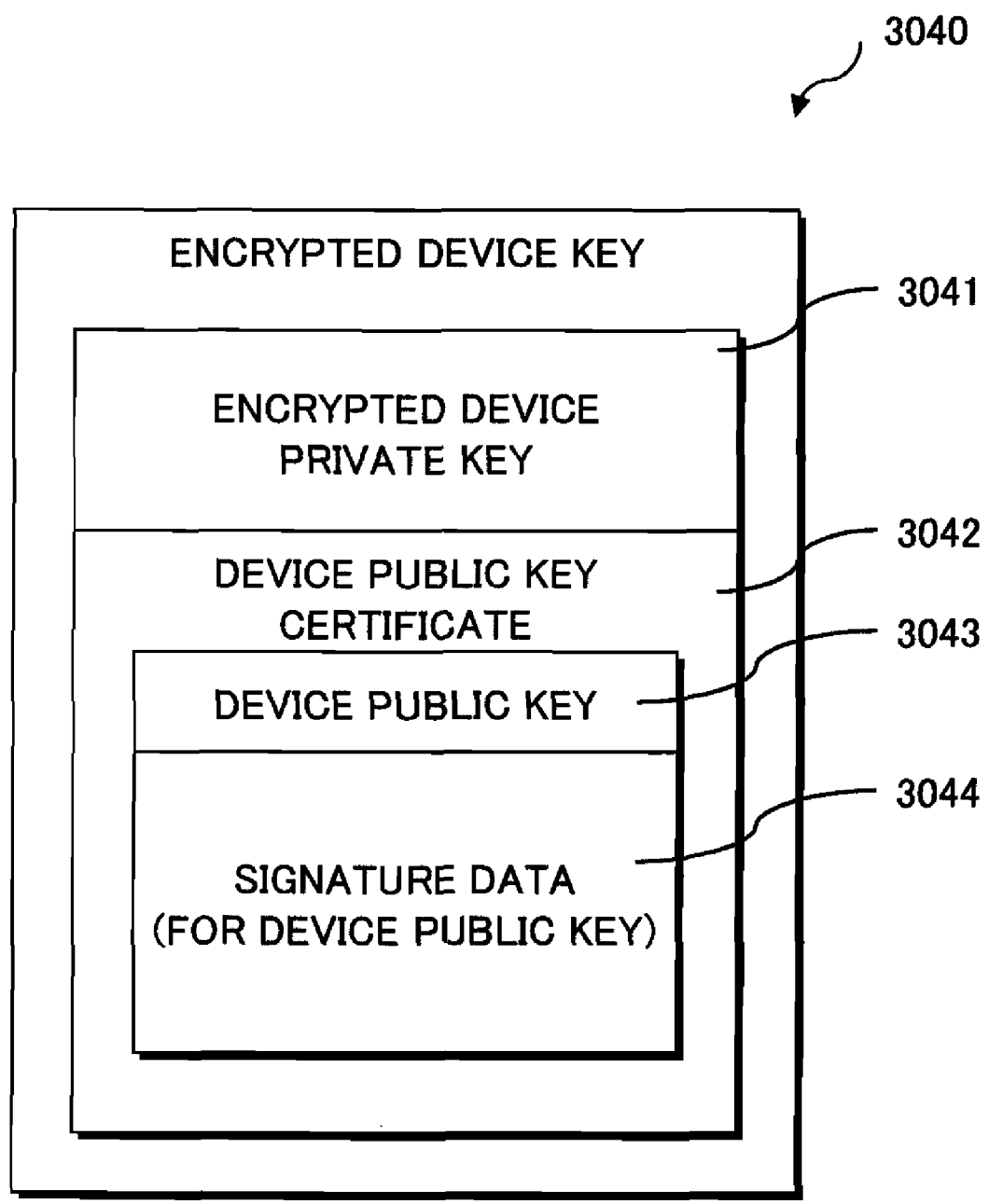
FIG. 37 shows the data structure of an encrypted device key 3040 as modification example.

(1) Modification Example of the Structure of the Device Key, the Root Certificate, and the Encrypted Device Key A root certificate 3010 shown in FIG. 34, an intermediate CA certificate 3020 shown in FIG. 35, a device key 3030 shown in FIG. 36, and an encrypted device key 3040 shown in FIG. 37 may be used instead of the root certificate 351 shown in FIG. 9 and the encrypted device key 341 shown in FIG. 11.

As shown in FIG. 34, the root certificate 3010 is composed of a root certificate public key 3011 and signature data 3012. The root public key 3011 is a public key of a CA (certificate authority). A root private key is generated to correspond to the root public key 3011. The signature data 3012 is generated by applying a digital signature to the root public key 3011 with use of the root private key corresponding to the root public key 3011. The root certificate 3010 is generated by the CA (certificate authority).

As shown in FIG. 35, the intermediate CA certificate 3020 is composed of an intermediate CA public key 3021 and signature data 3022. The intermediate CA public key 3021 is the public key of an intermediate CA. An intermediate CA private key is generated to correspond to the intermediate CA public certificate key 3021. The signature data 3022 is generated by applying a digital signature to the intermediate CA public key 3021 with use of the root private key.

As shown in FIG. 36, the device key 3030 is composed of a device private key 3031 and a device public key certificate 3032, and the device public key certificate 3032 is composed of a device public key 3033 and signature data 3034. The device private key 3031 is the same as the device private key 332 shown in FIG. 8, and the device public key 3033 is the same as the device public key 334 shown in FIG. 8. The signature data 3034 is generated by applying a digital signature to the device public key 3033 with use of the intermediate CA private key.

As shown in FIG. 37, the encrypted device key 3040 is composed of an encrypted device private key 3041 and a device public key certificate 3042, and the device public key certificate 3042 is composed of a device public key 3043 and signature data 3044. The encrypted device private key 3041 is the same as the encrypted device private key 342 shown in FIG. 11. The device public key certificate 3042 is the same as the device public key certificate 3032 shown in FIG. 36.

(2) Modification Example of Mutual Authentication

Figure 33:
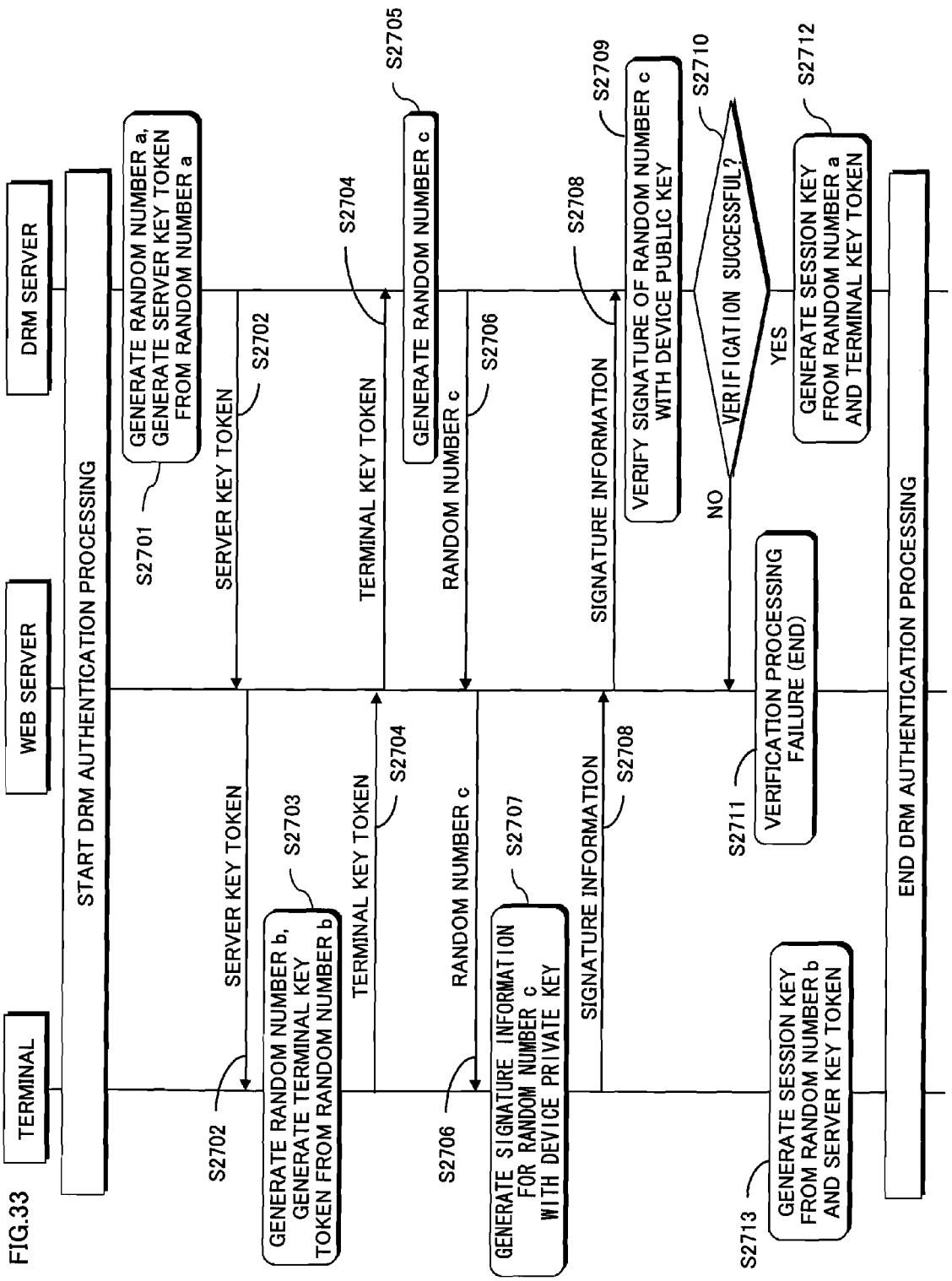
FIG. 33 is a flowchart showing DRM authentication processing between the terminal 2010 and the DRM server 2020 in the third embodiment.

In step S2705 to step S2711 in the DRM authentication processing shown in FIG. 33, the DRM server 2020 attempts the authenticate the legitimacy of the terminal 2010, continues with subsequent processing when the authentication succeeds, and immediately stops at that point when the authentication fails.

The DRM authentication processing shown in FIG. 33 may further include authentication of the legitimacy of the DRM server 202 by the terminal 2010, in addition to the authentication of the legitimacy of the terminal 2010 by the DRM server 2020.

In order to have the terminal 2010 authenticate the legitimacy of the DRM server 2020, it is suitable to switch which of the terminal 2010 and the DRM server 2020 performs the processing of each the steps 2705 through to S2711. In other words, steps S2705, S2709 and S2710 are performed by the terminal 2010, and step S2704 is performed by the DRM server 2020.

In this way, both authentication of the legitimacy of the terminal 2010 by the DRM server 2020 and authentication of the legitimacy of the DRM server 2020 by the terminal 2010 are performed. Subsequent processing is continued as long as both authentications succeed, and processing is stopped immediately when one or both of the authentications fails.

(3) The present invention may be structured as follows.

A terminal that is connectable to a communication network, the terminal comprising: a crypto-processing unit having a function of decrypting encrypted data received via the communication network; a manufacturer key storage unit operable to store a manufacturer key unique to a terminal manufacturer that manufactures the terminal; a crypto-processing unit unique data transmission unit operable to transmit the crypto-processing unit unique data held by the crypto-processing unit, to a device key encryption server via the communication network; an encrypted device key reception unit operable to receive an encrypted device key generated by the device key encryption server encrypting a device key with a unique manufacturer key composed of the manufacturer key and the crypto-processing unit unique data; and a device key storage unit operable to stored the encrypted device key received by the encrypted device key reception unit.

Here, the manufacturer key stored in the manufacturer key storage unit may be an encrypted manufacturer key generated by encrypting the manufacturer key with a crypto-processing unit public key corresponding to a crypto-processing unit private key common to the crypto-processing unit, the terminal may further comprise, in the crypto-processing unit: a crypto-processing unit unique data storage unit operable to store crypto-processing unit unique data unique to the crypto-processing unit; a crypto-processing unit unique data output unit operable to output the crypto-processing unit unique data; a crypto-processing unit private key storage unit operable to store the crypto-processing unit private key; a manufacturer key decryption unit operable to decrypt the encrypted manufacturer key with the crypto-processing unit private key; a unique manufacturer key generation unit operable to composite the unique manufacturer key from the manufacturer key generated by the decrypting by the manufacturing key decrypting unit and the crypto-processing unit unique data; and a device key decryption unit operable to decrypt the encrypted device key with the unique manufacturer key output by the unique manufacturer key generation unit.

Here, the terminal may further comprise: a program storage unit operable to store an encrypted program that has been generated by encrypting, with the manufacturer key, a program for controlling the crypto-processing unit.

Furthermore, an LSI mounted in a terminal, the LSI comprising: a crypto-processing unit unique data storage unit operable to store LSI unique data that is unique to the LSI; a crypto-processing unit unique data output unit operable to output the LSI unique data; a crypto-processing unit private key storage unit operable to store an LSI private key common with the LSI; a manufacturer key decryption unit operable to decrypt, with the LSI private key, an encrypted manufacturer key that has been generated by encrypting, with an LSI public key corresponding to the LSI private key, a manufacturer key unique to a terminal manufacturer that manufactures the terminal; a unique manufacturer key generation unit operable to composite a unique manufacturer key from the LSI unique data and the manufacturer key generated by the decryption by the manufacturer key decryption unit; and a device key decryption unit operable to decrypt, with the unique manufacturer key output by the unique manufacturer key generation unit, an encrypted device key generated by encrypting a device key with the unique manufacturer key.

Here, the LSI may further comprise: a manufacturer key storage unit operable to store the manufacturer key generated by the decrypting by the manufacturer key decryption unit; a program decryption unit operable to decrypt, with the manufacturer key stored in the manufacturer key storage unit, an encrypted program that has been generated by encrypting a program with the manufacturer key; a program storage unit operable to store a program generated by the decrypting by the program decryption unit; a program processing unit operable to perform processing in accordance with the program stored in the program storage unit; and a boot load unit operable to, upon receiving a reset signal for resetting the LSI, perform successive processing to first decrypt the manufacturer key in the manufacturer key decryption unit, then decrypt the program in the program decryption unit, and then set a program counter of the program processing unit to a predetermined address in the program storage unit.

A data setting method for a terminal that has a crypto-processing unit having a function of decrypting encrypted data received via a communication network, the data setting method comprising: a step of generating a manufacturer key unique to a terminal manufacturer that manufactures the terminal; a step of generating an encrypted manufacturer key by encrypting the manufacturer key with a crypto-processing unit public key corresponding to an encrypted processing unit private key common to the crypto-processing unit; a step of writing the encrypted manufacturer key to a manufacturer key storage unit of the terminal apparatus; a step of obtaining crypto-processing unit unique data unique to the crypto-processing unit from the terminal; a step of compositing the a unique manufacturer key from the manufacturer key and the crypto-processing unit unique data; a step of encrypting a device key with the unique manufacturer key to generate an encrypted device key; and a step of writing the encrypted device key to a device key storage unit of the terminal.

Furthermore, a device key encryption system including a terminal manufacturing unit that manufactures a terminal having a crypto-processing unit having a function of decrypting encrypted data received via a communication network, and a device key encryption server that encrypts a device key set in the terminal, wherein the terminal manufacturing unit includes: a manufacturer key generation unit operable to generate a manufacturer key that is unique to a terminal manufacturer that manufactures the terminal; a manufacturer key encryption unit operable to generate an encrypted manufacturer key by encrypting the manufacturer key with a crypto-processing unit public key corresponding to a crypto-processing unit private key common with the crypto-processing unit; and an encrypted manufacturer key writing unit operable to write the encrypted manufacturer key to the manufacturer key storage unit of the terminal, and the device key encryption server comprises: a crypto-processing unit unique data reception unit operable to obtain, from the terminal, crypto-processing unit unique data unique to the crypto-processing unit; a unique manufacturer key generation unit operable to composite a unique manufacturer key from the manufacturer key and the crypto-processing unit unique data; a device key encryption unit operable to encrypt a device key with the unique manufacturer key, thereby generating an encrypted device key; and an encrypted device key transmission unit operable to send the encrypted device key to the terminal.

Furthermore, a terminal data setting system including terminal that is connectable to a communication network, and a device key encryption system that sets data in the terminal, the terminal comprising: a crypto-processing unit having a function of decrypting encrypted data received via the communication network; a manufacturer key storage unit operable to store an encrypted manufacturer key generated by encrypting a manufacturer key unique to a terminal manufacturer that manufactures the terminal, with a crypto-processing unit public key corresponding to a crypto-processing unit private key common with the crypto-processing unit; a crypto-processing unit unique data transmission unit operable to transmit crypto-processing unit unique data held by the crypto-processing unit, to the device key encryption server via the communication network; an encrypted device key reception unit operable to receive an encrypted device key generated by the device key encryption server encrypting a device key with a unique manufacturer key composed of the manufacturer key and the crypto-processing unit unique data; and a device key storage unit operable to store the encrypted device key received by the encrypted device key reception unit.

The crypto-processing unit comprises: a crypto-processing unit unique data storage unit operable to store crypto-processing unit unique data unique to the crypto-processing unit; a crypto-processing unit unique data output unit operable to output the crypto-processing unit unique data; a crypto-processing unit private key storage unit operable to store the crypto-processing unit private key; a manufacturer key decryption unit operable to decrypt the encrypted manufacturer key with the crypto-processing unit private key; a unique manufacturer key generation unit operable to composite a unique manufacturer key from the crypto-processing unit unique data and the manufacturer key generated by the decryption by the manufacturer key decryption unit; and a device key decryption unit operable to decrypt the encrypted device key with the unique manufacturer key output by the unique manufacturer key generation unit.

The device key encryption system is composed of a terminal manufacturing unit that manufactures the terminal, and a device key encryption server that encrypts a device key set in the terminal.

The terminal manufacturing unit comprises: a manufacturer key generation unit operable to generate a manufacturer key that is unique to a terminal manufacturer that manufactures the terminal; a manufacturer key encryption unit operable to generate an encrypted manufacturer key by encrypting the manufacturer key with a crypto-processing unit public key corresponding to a crypto-processing unit private key common with the crypto-processing unit; and an encrypted manufacturer key writing unit operable to write the encrypted manufacturer key to the manufacturer key storage unit of the terminal.

The device key encryption server comprises: a crypto-processing unit unique data reception unit operable to obtain, from the terminal, crypto-processing unit unique data unique to the crypto-processing unit; a unique manufacturer key generation unit operable to composite a unique manufacturer key from the manufacturer key and the crypto-processing unit unique data; a device key encryption unit operable to encrypt a device key with the unique manufacturer key, thereby generating an encrypted device key; and an encrypted device key transmission unit operable to send the encrypted device key to the terminal.

(4) Each described apparatus is, specifically, a computer system composed of a microprocessor, a ROM, a RAM, a hard disk unit, and the like. A computer program is stored in the RAM or the hard disk unit. The computer program is composed of a plurality of instruction codes showing instructions with respect to a computer in order to have predetermined functions achieved. Each apparatus achieves predetermined functions by the microprocessor operating according to the computer programs. In other words, the microprocessor reads one of the instructions included in the computer program at a time, decodes the read instruction, and operates in accordance with the result of the decoding.

It should be noted, however, that each apparatus is not limited to being a computer system that includes each of a microprocessor, a ROM, a RAM, a hard disk unit, a display unit, a keyboard, a mouse and the like, and may be a computer system composed of only some of the stated components.

(5) All or part of the compositional elements of each apparatus may be composed of one system LSI (Large Scale Integrated circuit). The system LSI is a super-multifunctional LSI on which a plurality of compositional units are manufactured integrated on one chip, and is specifically a computer system that includes a microprocessor, a ROM, a RAM, or the like. A computer program is stored in the RAM. The system LSI achieves its functions by the microprocessor operating according to the computer program.

The units that are the compositional elements of each of the apparatuses may be realized separately with individual chips, or part or all may be included on one chip. Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of an FPGA (field programmable gate array) that is programmable after manufacturing of the LSI, or a re-configurable processor that enables re-configuration of the connection and settings of circuit cells in the LSI.

Furthermore, if technology for an integrated circuit that replaces LSIs appears due to advances in or derivations from semiconductor technology, that technology may be used for integration of the functional blocks. Bio-technology is one possible application.

(6) Part or all of the compositional elements of each apparatus may be composed of a removable IC card or a single module. The IC card or the module is a computer system composed of a microprocessor, a ROM, a RAM, or the like. The IC card or the module may be included the aforementioned super-multifunctional LSI. The IC card or the module achieves its functions by the microprocessor operating according to computer program. The IC card or the module may be tamper-resistant.

(7) The present invention may be methods shown by the above. Furthermore, the methods may be a computer program realized by a computer, and may be a digital signal representing the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(8) The present invention may be any combination of the above-described embodiment and modifications.

Industrial Applicability

The present invention can be used managerially, repeatedly and continuously, in an industry in which a service is generated, provided and used via a network, and in an industry that manufactures and sells devices that generate a service via a network, devices that provide a service via a network, and various household devices that use a service via a network.

The invention claimed is:

1. A key terminal apparatus, comprising:
a crypto-processing Large Scale Integrated circuit (LSI) operable to perform predetermined crypto-processing, unique information identifying the crypto-processing LSI being embedded in the crypto-processing LSI;
a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined key;
an interface unit connected to a device key encryption server, the device key encryption server generating an encrypted device key by encrypting a predetermined device key using a predetermined unique manufacturer key, the predetermined unique manufacturer key being generated based on the unique information and the manufacturer key; and
a control unit operable to transmit the unique information to the device key encryption server, and to receive the encrypted device key corresponding to the unique information from the device key encryption server,
wherein a predetermined master key corresponding to the predetermined key is embedded in the crypto-processing LSI,
wherein the crypto-processing LSI (a) receives the encrypted manufacturer key from the manufacturer key storage unit, (b) decrypts the encrypted manufacturer key using the predetermined master key to generate a manufacturer key, (c) generates a unique manufacturer key identical to the predetermined unique manufacturer key, based on the unique information embedded in the crypto-processing LSI and the generated manufacturer key, and (d) decrypts the received encrypted device key using the generated identical unique manufacturer key to generate the predetermined device key.

2. The key terminal apparatus of claim 1,
wherein the predetermined key is a public key.

3. The key terminal apparatus of claim 1, wherein
the crypto-processing LSI has a program storage unit, the program storage unit storing a program for performing the predetermined crypto-processing, the program being encrypted using the manufacturer key, and
the crypto-processing LSI decrypts, using the master key, the encrypted manufacturer key stored in the manufacturer key storage unit to obtain a manufacturer key, and decrypts the encrypted program using the obtained manufacturer key.

4. The key terminal apparatus of claim 1, wherein the unique information that identifies the crypto-processing LSI comprises a serial number of the crypto-processing LSI.

5. A key terminal apparatus, comprising:
a crypto-processing LSI operable to perform predetermined crypto-processing, unique information identifying the crypto-processing LSI being embedded in the crypto-processing LSI;
a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined first key;
an interface unit connected to a service providing server and a device key encryption server, the service providing server providing (i) content encrypted using a predetermined content key, and (ii) an encrypted content key generated by encrypting the predetermined content key using a predetermined second key, and the device key encryption server generating an encrypted device key by encrypting a predetermined device key using a predetermined unique manufacturer key, the predetermined unique manufacturer key being generated based on the unique information and the manufacturer key; and
a control unit operable to, when a setting is made at the key terminal apparatus for receiving the encrypted content from the service providing server, transmit the unique information to the device key encryption server, and receive the encrypted device key corresponding to the unique information from the device key encryption server,
wherein a predetermined master key corresponding to the predetermined key is embedded in the crypto-processing LSI,
wherein the crypto-processing LSI (a) receives the encrypted manufacturer key from the manufacturer key storage unit, (b) decrypts the encrypted manufacturer key using the predetermined master key to generate a manufacturer key, (c) generates a unique manufacturer key identical to the predetermined unique manufacturer key, based on the unique information embedded in the crypto-processing LSI and the generated manufacturer key, and (d) decrypts the received encrypted device key using the generated identical unique manufacturer key to generate the predetermined device key.

6. The key terminal apparatus of claim 5,
wherein the predetermined first key is a first public key.

7. The key terminal apparatus of claim 5,
the predetermined device key includes a device public key and a device private key,
the control unit (a) obtains the predetermined device key from the crypto-processing LSI, (b) transmits the device public key included in the predetermined device key to the service providing server, (c) transmits information relating to the device private key included in the predetermined device key to the service providing server, and the control unit,(d) when the service providing server authenticates correspondence between the transmitted device public key and the device private key of the key terminal apparatus, shares a session key with the service providing server, and
the predetermined second key is the session key, and the encrypted content key is generated by encrypting using the session key.

8. The key terminal apparatus of claim 7, wherein
the service providing server includes (1) a content server and (2) a key management server, the content server providing the content encrypted using the predetermined content key, and the key management server providing the encrypted content key generated by encrypting the predetermined content key using the predetermined second key, the control unit (a) obtains the predetermined device key from the crypto-processing LSI, (b) transmits the device public key included in the predetermined device key to the key management server, (c) transmits information relating to the device private key included in the predetermined device key to the key management server, and the control unit, (d) when the service providing server authenticates correspondence between the transmitted device public key and the device private key of the key terminal apparatus, shares a session key with the key management server.

9. The key terminal apparatus of claim 8, wherein
the control unit receives the encrypted content from the content server, and receives the encrypted content key from the key management server corresponding to the content server, and the crypto-processing LSI decrypts the encrypted content key using the session key, decrypts the encrypted content using the decrypted content key to obtain the content, and outputs the obtained content to the control unit.

10. The key terminal apparatus of claim 5, wherein
the crypto-processing LSI has a program storage unit, the program storage unit storing a program for performing the predetermined crypto-processing, the program being encrypted using the manufacturer key, and
the crypto-processing LSI decrypts, using the master key, the encrypted manufacturer key stored in the manufacturer key storage unit to obtain a manufacturer key, and decrypts the encrypted program using the obtained manufacturer key.

11. The key terminal apparatus of claim 5, wherein the unique information that identifies the crypto-processing LSI comprises a serial number of the crypto-processing LSI.

12. A crypto-processing LSI included in a key terminal apparatus, the key terminal apparatus including: a manufacturer key storage unit provided external of the crypto-processing LSI, and storing an encrypted manufacturer key, the encrypted manufacturer key being generated by encrypting a manufacturer key unique to a manufacturer of the key terminal apparatus using a predetermined key; an interface unit connected to a device key encryption server, the device key encryption server generating an encrypted device key by encrypting a predetermined device key using a predetermined unique manufacturer key, the predetermined unique manufacturer key being generated based on unique information and the manufacturer key; and a control unit operable to transmit the unique information to the device key encryption server, and to receive an encrypted device key corresponding to the unique information from the device key encryption server,
the crypto-processing LSI comprising:
a first storage unit having unique information that identifies the crypto-processing LSI, the unique information being embedded in the crypto-processing LSI;
a second storage unit having a predetermined master key corresponding to the predetermined key, within the crypto-processing LSI;
a first decryption unit operable to input the encrypted manufacturer key from the manufacturer key storage unit of the key terminal apparatus, and decrypt the encrypted manufacturer key using the predetermined master key to generate a manufacturer key;
a generation unit operable to generate a unique manufacturer key identical to the predetermined unique manufacturer key based on the unique information embedded in the crypto-processing LSI and the generated manufacturer key; and
a second decryption unit operable to decrypt the received encrypted device key using the generated identical unique manufacturer key to obtain the predetermined device key.

13. The crypto-processing LSI of claim 12, further comprising:
a program storage unit operable to store a program for performing processing by the first decryption unit, the generation unit, and the second decryption unit, the program being encrypted using the manufacturer key; and
a third decryption unit operable to decrypt, using the embedded master key, the encrypted manufacturer key stored in the manufacturer key storage unit to obtain a manufacturer key, and decrypt the program using the obtained manufacturer key.

14. A unique key generation method used in a key terminal apparatus, the key terminal apparatus including: a crypto-processing LSI operable to perform predetermined crypto-processing, unique information identifying the crypto-processing LSI being embedded in the crypto-processing LSI; a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined key; an interface unit connected to a device key encryption server, the device key encryption server generating an encrypted device key by encrypting a predetermined device key using a predetermined unique manufacturer key, the predetermined unique manufacturer key being generated based on the unique information and the manufacturer key; and a control unit operable to transmit the unique information to the device key encryption server, and to receive the encrypted device key corresponding to the unique information from the device key encryption server, a predetermined master key corresponding to the predetermined key being embedded in the crypto-processing LSI,
the unique key generation method comprising:
receiving the encrypted manufacturer key from the manufacturer key storage unit;
decrypting the encrypted manufacturer key using the predetermined master key to generate a manufacturer key;
generating a unique manufacturer key identical to the predetermined unique manufacturer key, based on the unique information embedded in the crypto-processing LSI and the generated manufacturer key;
decrypting the received encrypted device key using the generated identical manufacturer key to generate the predetermined device key.

15. A content distribution system including (1) a service providing server that provides (i) content encrypted using a predetermined content key, and (ii) an encrypted content key generated by encrypting the predetermined content key using a predetermined first key, (2) a device key encryption server that generates an encrypted device key by encrypting a device key corresponding to the predetermined first key, (3) a key terminal apparatus that decrypts the encrypted content key using the predetermined first key to obtain the predetermined content key, and decrypts the encrypted content using the obtained predetermined content key,
the key terminal apparatus comprising:
a crypto-processing LSI operable to perform predetermined crypto-processing, unique information identifying the crypto-processing LSI being embedded in the crypto-processing LSI;
a manufacturer key storage unit provided external of the crypto-processing LSI, the manufacturer key storage unit storing an encrypted manufacturer key, the encrypted manufacturer key being generated by encrypting a manufacturer key unique to a manufacturer of the key terminal apparatus using a predetermined key;

an interface unit connected to the service providing server and the device key encryption server; and a control unit operable to, when a setting is made at the key terminal apparatus for receiving the encrypted content from the service providing server, transmit the unique information to the device key encryption server, the device key encryption server comprising:

a reception unit operable to receive the unique information from the key terminal apparatus;

a generation unit operable to generate a predetermined unique manufacturer key based on the received unique information and the manufacturer key;

an encryption unit operable to encrypt a device key corresponding to the first predetermined key using the generated predetermined unique manufacturer key to generate an encrypted device key; and a transmission unit operable to transmit the encrypted device key to the key terminal apparatus, wherein a master key corresponding to the second predetermined key is embedded in the crypto-processing LSI of the key terminal apparatus, the crypto-processing LSI of the key terminal apparatus (a) receives the encrypted manufacturer key from the manufacturer key storage unit, (b) decrypts the encrypted manufacturer key using the predetermined master key to generate a manufacturer key, (c) generates a unique manufacturer key identical to the predetermined unique manufacturer key based on the unique information embedded in the crypto-processing LSI and the generated manufacturer key, and (d) decrypts, using the generated identical unique manufacturer key, the encrypted device key received from the device key encryption server to obtain the device key.

16. The content distribution system of claim 15, wherein the device key includes a device public key and a device private key, the control unit of the key terminal apparatus (a) obtains the predetermined device key from the crypto-processing LSI, (b) transmits the device public key included in the predetermined device key to the service providing server, (c) transmits information relating to the device private key included in the predetermined device key to the service providing server, and the control unit, (d) when the service providing server authenticates correspondence between the transmitted device public key and the device private key of the key terminal apparatus, shares a session key with the service providing server, and the predetermined second key is the session key, and the encrypted content key is generated by encrypting using the session key.

17. The content distribution system of claim 15, wherein the service providing server includes (1) a content server and (2) a key management server, the content server providing the content encrypted using the predetermined content key, and the key management server providing the encrypted content key generated by encrypting the predetermined content key using the predetermined second key, the control unit (a) obtains the predetermined device key from the crypto-processing LSI, (b) transmits the device public key included in the predetermined device key to the key management server, (c) transmits information relating to the device private key included in the predetermined device key to the key management server, and the control unit, (d) when the service providing server authenticates correspondence between the transmitted device public key and the device private key of the key terminal apparatus, shares a session key with the key management server.

18. The content distribution system of claim 17, wherein the control unit receives the encrypted content from the content server, and receives the encrypted content key from the key management server corresponding to the content server, and the crypto-processing LSI decrypts the encrypted content key using the session key, decrypts the encrypted content using the decrypted content key to obtain the content, and outputs the obtained content to the control unit.

* * * * *